United States Patent [19]

Shinohara et al.

[11] Patent Number: 5,192,860
[45] Date of Patent: Mar. 9, 1993

[54] FOCUS STATE DETECTION DEVICE

[75] Inventors: Junichi Shinohara, Yokohama; Yoshimi Ohno, Kawasaki, both of Japan

[73] Assignee: Ricoh Company, Ltd., Tokyo, Japan

[21] Appl. No.: 758,694

[22] Filed: Sep. 12, 1991

[30] Foreign Application Priority Data

Sep. 18, 1990 [JP] Japan ................ 2-246211
Nov. 13, 1990 [JP] Japan ................ 2-304011
Nov. 15, 1990 [JP] Japan ................ 2-307242
Jun. 30, 1991 [JP] Japan ................ 3-185341

[51] Int. Cl.$^5$ .............................. G01J 1/20
[52] U.S. Cl. ........................ 250/201.8; 354/407
[58] Field of Search ........... 250/201.1, 201.2, 201.8; 354/406, 407, 408; 356/4

[56] References Cited

U.S. PATENT DOCUMENTS

| | | | |
|---|---|---|---|
| 4,716,434 | 12/1987 | Taniguchi et al. | 250/201.8 |
| 4,766,302 | 8/1988 | Ishida et al. | 250/201.8 |
| 4,960,986 | 10/1990 | Ohno et al. | 250/201.8 |
| 4,988,856 | 1/1991 | Hamada et al. | 250/201.8 |

FOREIGN PATENT DOCUMENTS

| | | |
|---|---|---|
| 60-4914 | 1/1985 | Japan . |
| 60-33522 | 2/1985 | Japan . |
| 62-102213 | 5/1987 | Japan . |
| 62-125311 | 6/1987 | Japan . |
| 62-192732 | 8/1987 | Japan . |
| 62-200310 | 9/1987 | Japan . |
| 62-200311 | 9/1987 | Japan . |

Primary Examiner—David C. Nelms
Assistant Examiner—John R. Lee
Attorney, Agent, or Firm—Oblon, Spivak, McClelland, Maier & Neustadt

[57] ABSTRACT

In a focusing state detector, a light beam transmitted through a photographing lens is divided into three light beams in three regions through a condenser lens and three converting optical systems. The three light beams are focused and formed as an image on three photoelectric converting portions and are photoelectrically converted to three kinds of electric signals. A correction calculator receives data of an integral time ratio provided by a charge coupled device at a plurality of time points from a correction coefficient calculator. The correction calculator corrects image data obtained by the three photoelectric converting portions by using a correction coefficient according to the integral time ratio. A phase difference calculator receives the corrected image data of the correction calculator and provides phase difference data. The focusing state of a lens system is accurately detected even when a photographed object is moved in a direction perpendicular to an optical axis of the lens system in a plurality of detections of the detecting state and a brightness distribution of the photographed object is changed.

8 Claims, 40 Drawing Sheets

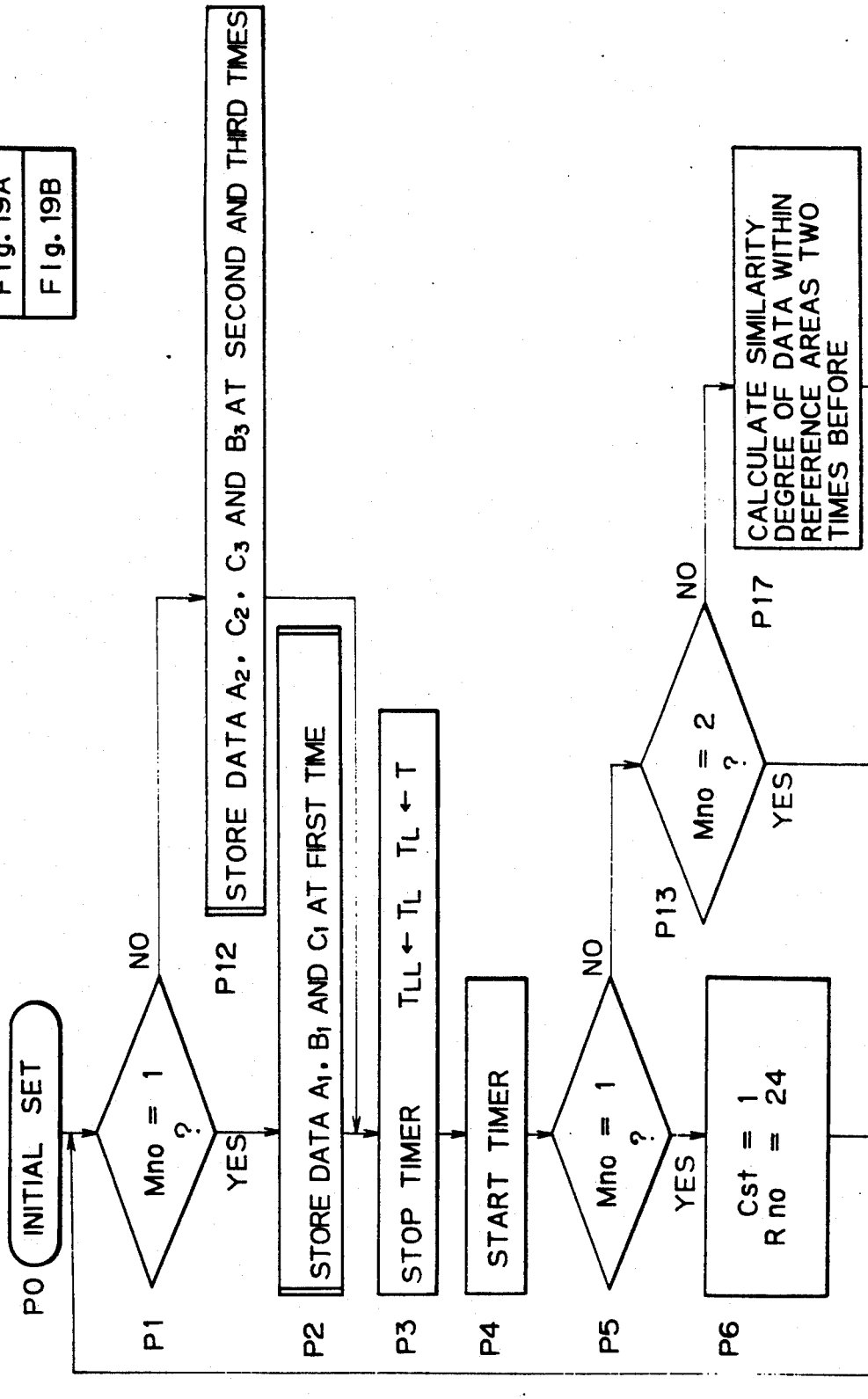

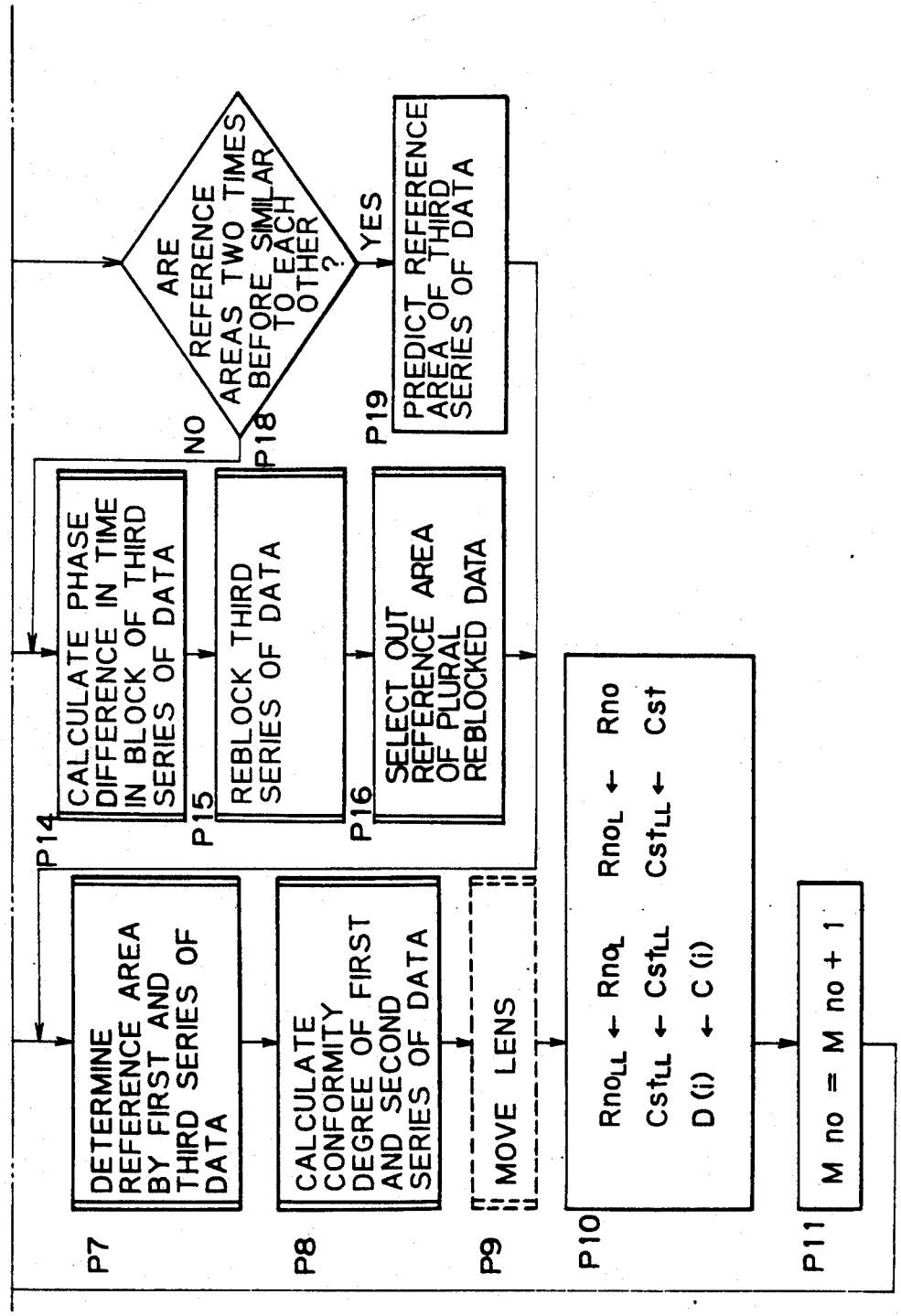

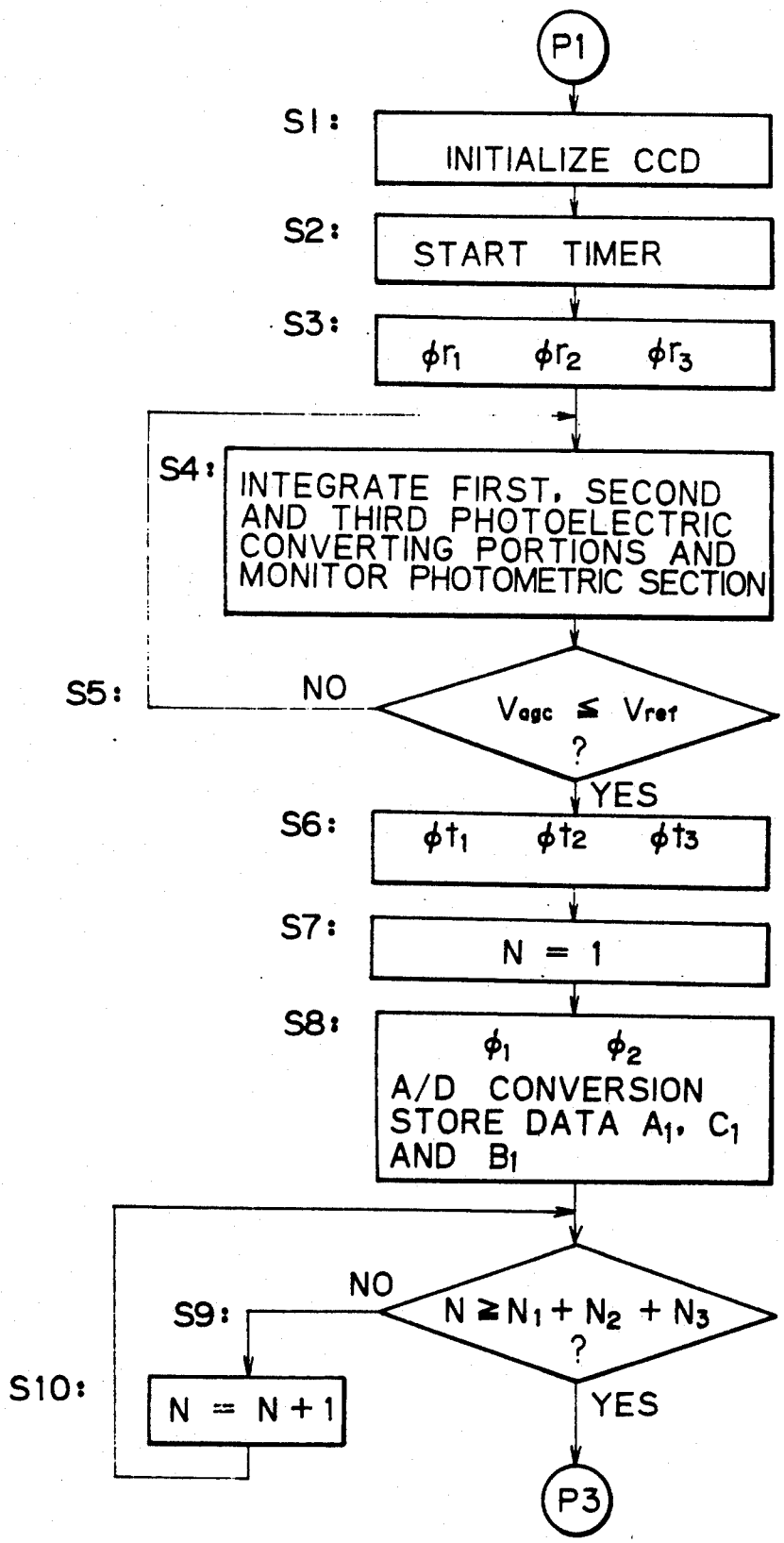

FOCUS STATE DETECTION DEVICE

BACKGROUND OF THE INVENTION

1. Field of the Invention

The present invention relates to a detector for detecting the focusing state of a light beam. More particularly, the present invention relates to a detector for detecting the focusing state of a light beam transmitted from a photographed object through a photographing lens optical system or a finder lens optical system and detecting this focusing state a plurality of times for a very short time.

2. Description of the Related Art

A so-called phase difference detecting system is mainly used in a focusing state detector at the present time.

In this phase difference detecting system, a light beam from a photographed object is divided into two light beams in two regions symmetrically arranged with respect to a photographing optical axis. Two images are formed by again focusing the light beams in the respective two regions. The mutual relation in position between these two images is then provided to judge a focusing state of the light beam from the photographed object in an image-forming position. Namely, it is judged whether this light beam from the photographed object is focused or not. Further, it is also judged whether the light beam from the photographed object is focused on a front or rear side of a normal focusing position of a lens system. Further, information of a defocusing amount can be obtained when the light beam from the photographed object is focused on the front or rear side of the normal focusing position.

In such a focusing state detector, the above mutual relation in position between the two images is detected by using a photoelectric converting element such as a charge coupled device (CCD). various kinds of operations of the focusing state detector are performed by only electrically processing an output of the photoelectric converting element. Accordingly, it is possible to detect whether there is a focusing state or not and calculate the defocusing amount at a high speed.

In the general focusing state detector, data of the defocusing amount are detected a plurality of times to improve an accuracy in distance measurement and fulfill an operation predicting function. In this case, a phase difference between images formed by light beams in the two regions symmetrically arranged with respect to the optical axis of the lens system about a light beam from the photographed object is calculated by using a photoelectric converting element such as a charge coupled device (CCD) in each of the plural distance measurements. A focus moving amount of a photographing lens is calculated from data of this phase difference. Accordingly, it takes much time to provide the focus moving amount of the photographing lens.

Namely, a first detecting time of the focusing state multiplied by the number of detections of the focusing state (i.e., the number of distance measurements) is required in total to provide the focus moving amount of the photographing lens.

Further, in the general focusing state detector, the phase difference data at the present time are provided on the basis of image data at the present time obtained at a time point of each of the plural distance measurements. Further, the phase difference data at the preceding time are provided on the basis of the image data at the preceding time. A difference between defocusing amounts at the preceding and present times is detected by comparing the phase difference data at the preceding and present times with each other. When there is no change in defocusing amount, it is judged that the photographed object is at rest.

In contrast to this, when the defocusing amount at the present time is changed from that at the preceding time, it is judged that the photographed object is moving in a direction of the optical axis. Thus, the movement of the photographed object is predicted on the basis of this change in defocusing amount.

However, the movement of the photographed object can be accurately predicted when image signals provided at two time points of distance measurement, i.e., at the present and preceding times are coincident with each other and brightness distributions of the light beams incident to the respective photoelectric converting portions are equal to each other. When these image signals are not sufficiently coincident with each other and these brightness distributions are greatly different from each other, it is impossible to accurately predict the movement of the photographed object since an error in operation of the focusing state detector is caused. Therefore, in a certain case, it is judged that the photographed object is moving although the photographed object is at rest.

Further, when the photographed object is moved in a direction perpendicular to the optical axis of the lens system, the two image data are greatly shifted from each other and are not in conformity with each other. Therefore, a great phase difference is caused even when a distance between the photographed object and the lens system is approximately constant, thereby providing data of an incorrect defocusing amount.

A light-receiving section for providing the image data is constructed by a charge coupled device (CCD) so that a dynamic range of a quantity of light incident to the light-receiving section is narrow. To prevent this dynamic range from being narrowed, a monitor photometric section is disposed in the vicinity of the photoelectric converting portions for detecting image data. A charge storing time is controlled in the light-receiving section for detecting image data on the basis of an output of the monitor photometric section to make constant an average charge storing amount of the image data from the light-receiving section. For example, such a structure is shown in Japanese Patent Application Laying Open (KOKAI) No. 62-192732.

In such a structure, there is no special problem when two image data corresponding to light beams in the two regions symmetrically arranged with respect to the optical axis of the lens system are obtained at only specified time points close to each other. However, there is a problem when image data are obtained at each of a plural of time points far from each other and are compared with each other to predict the movement of the photographed object.

Namely, when the movement of the photographed object is predicted by comparing the data of plural phase differences based on the image data obtained at the plural time points, it is necessary that general photoelectric converting characteristics including the electric characteristics of an amplifier are equal to each other at the plural time points. However, when the focusing state detector has a monitor control means, an apparent gain of the monitor control means is changed at the plural time points. Therefore, the image data are different from each other with respect to the same photographed object so that no image data are in conformity with each other at the plural time points, thereby detecting an incorrect defocusing amount.

Further, in the general focusing state detector, a reference area of data is set in advance on the basis of distance information of the photographing lens when the phase difference is calculated by providing a conformity degree of image outputs of two optical systems. Therefore, a means for detecting a position of the photographing lens is indispensable to the focusing state detector. Accordingly, the focusing state detector has a complicated structure and a mechanical means for detecting a position of the photographing lens must be used in this focusing state detector so that an accuracy in detection of the position of the photographing lens is limited. Therefore, it is difficult to accurately set the reference area.

SUMMARY OF THE INVENTION

It is therefore a first object of the present invention to provide a focusing state detector in which the focusing state of a light beam is accurately detected by using the merits of a phase difference detecting system and a time required to detect the focusing state a plurality of times can be reduced and an error in brightness distribution of a photographed object can be compensated when the photographed object is moved in a direction perpendicular to the optical axis of a lens system in the plural detections of the focusing state and the brightness distribution of the photographed object is changed.

A second object of the present invention is to provide a focusing state detector in which the focusing state of a light beam is accurately detected by using the merits of a phase difference detecting system and a time required to detect the focusing state a plurality of times can be reduced and phase difference data can be obtained at a high speed with high accuracy.

In accordance with a first structure of the present invention, the above first object can be achieved by a focusing state detector comprising first and second converting optical systems for respectively forming light beams in two regions symmetrically arranged with respect to an optical axis of the optical systems about a light beam from a photographed object; a third converting optical system for forming a light beam in a region including the optical axis about the light beam from the photographed object; first and second photoelectric converting portions for respectively receiving the two light beams formed by the first and second converting optical systems in a region in which a plurality of photoelectric converting elements of a change storing type are arranged in line; a third photoelectric converting portion for receiving the light beam formed by the third converting optical system in a region in which a plurality of photoelectric converting elements of a charge storing type are arranged in line; a charge clearing section for clearing a charge stored to each of the first, second and third photoelectric converting portions; a charge transfer section for transferring data indicative of an amount of the charge stored to each of the photoelectric converting elements in the first, second and third photoelectric converting portions to a data memory section; control means for selectively generating a clearing signal in the charge clearing section and a transfer signal in the charge transfer section to respectively obtain three or two image data by the first, second and third photoelectric converting portions at a plurality of time points; a monitor photometric section arranged in the vicinity of at least one of the first, second and third photoelectric converting portions; monitor control means for making an average of the stored charge amount in the photoelectric converting portions constant on the basis of an output of the monitor photometric section; integral time memory means for providing data of an integral time at a plurality of time points from the generation of the clearing signal in the charge clearing section of the generation of the transfer signal in the charge transfer section, the integral time memory means storing the integral time data thereto; correction coefficient calculating means for calculating a correction coefficient corresponding to a ratio of integral times at the preceding and present times with respect to the data of integral times obtained by the integral time memory means at the plural time points; correction calculating means for correcting image data at the present or preceding time with respect to the image data obtained by the first, second and third photoelectric converting portions at the plural time points, on the basis of data of the correction coefficient obtained by the correction coefficient calculating means; and phase difference calculating means for providing phase difference data based on the image data at the preceding or present time and phase difference data based on the image data corrected by the correction calculating means at the present or preceding time.

In accordance with a second structure of the present invention, the above first object can be achieved by a focusing state detector comprising first and second converting optical system for respectively forming light beams in two regions symmetrically arranged with respect to an optical axis of the optical systems about a light beam from a photographed object; a third converting optical system for forming a light beam in a region including the optical axis about the light beam from the photographed object; first and second photoelectric converting portions for respectively receiving the two light beams formed by the first and second converting optical systems in a region in which a plurality of photoelectric converting elements of a charge storing type are arranged in line; a third photoelectric converting portion for receiving the light beam formed by the third converting optical system in a region in which a plurality of photoelectric converting elements of a charge storing type are arranged in line; a charge cleaning section for clearing a charge stored to each of the first, second and third photoelectric converting portions; a charge transfer section for transferring data indicative of an amount of the charge stored to each of the photoelectric converting elements in the first, second and third photoelectric converting portions to a data memory section; control means for selectively generating a clearing signal in the charge clearing section and a transfer signal in the charge transfer section to respectively obtain three or two image data by the first, second and third photoelectric converting portions at a plurality of time points; a monitor photometric section arranged in the vicinity of at least one of the first, second and third photoelectric converting portions; monitor control means for making an average of the stored charge amount in the photoelectric converting portions constant on the basis of an output of the monitor photometric section; integral time memory means for providing data of an integral time at a plurality of time points from the generation of the clearing signal in the charge clearing section to the generation of the transfer signal in the charge transfer section, the integral time memory means storing the integral time data thereto; correction coefficient calculating means for calculating a correction coefficient corresponding to the integral time obtained by the integral time memory means at each of the time points; correction calculating means for correcting image data obtained by the first, second and third photoelectric converting portions at each of the plural time points, on the basis of data of the correction coefficient obtained by the correction coefficient calculating means at each of the plural time points; and phase difference calculating means for providing phase difference data based on the image data corrected by the correction calculating means.

In accordance with a third structure of the present invention, the monitor photometric section is arranged in the vicinity of the third photoelectric converting portion in the first or second structure of the present invention.

In accordance with a fourth structure of the present invention, the above second object can be achieved by a focusing state detector comprising first and second converting optical systems for respectively guiding light beams in two regions symmetrically arranged with respect to an optical axis of the optical system about a light beam from a photographed object, the first and second converting optical systems converting displacements of the light beams in a direction of the optical axis to displacements on a face perpendicular to the optical axis; a third converting optical system for guiding a light beam in a region including the optical axis about a light beam from the photographed object, the third converting optical system forming this light beam such that no light beam is displaced on a face perpendicular to the optical axis irrespective of a displacement of the light beam in the direction of the optical axis; first and second photoelectric converting means for respectively receiving the two light beams formed by the first and second converting optical systems in a region in which picture elements composed of a plurality of photoelectric converting elements are arranged in line, the first and second photoelectric converting means providing first and second image data as an electric signal corresponding to a light intensity distribution of an image of each of the received light beams; and third photoelectric converting means for receiving the light beam formed by the third converting optical system in a region in which picture elements composed of a plurality of photoelectric converting elements are arranged in line, the third photoelectric converting means providing third image data as an electric signal corresponding to a light intensity distribution of an image of the received light beam; the focusing state detector selectively detecting the first to third image data obtained by the first to third photoelectric converting means at a plurality of time points to detect a beam focusing state; the focusing state detector further comprising initial block memory means for storing the third image data corresponding to an address in a preset block of the plural picture elements in the third photoelectric converting means; time series phase difference calculating means for dividing the third image data obtained at the preceding or present time into a plurality of small blocks in which the number of picture elements is equal to or smaller than the number of picture elements forming the third image data; the time series phase difference calculating means shifting each of the plural small blocks in a picture element unit with respect to the third image data obtained at the present or preceding time, the time series phase difference calculating means comparing the shifted small blocks with each other to calculate a changing amount of a phase difference in data; area block forming means for reblocking the small blocks based on the changing amount of the phase difference obtained by the time series phase difference calculating means every small block; block determining means for selecting one of the small blocks reblocked by the area block forming means and used as phase difference data for detecting the focusing state; block predicting means for predicting a block at the next time based on the blocks determined by the block determining means at the preceding and present times; and block judging means for judging whether or not a reference block used at the present time is obtained from any one of the initial block memory means, the block determining means and the block predicting means.

In accordance with a fifth structure of the present invention, the above second object can be achieved by a focusing state detector comprising first and second converting optical systems for respectively guiding light beams in two regions symmetrically arranged with respect to an optical axis of the optical systems about a light beam from a photographed object, the first and second converting optical systems converting displacements of the light beams in a direction of the optical axis to displacements on a face perpendicular to the optical axis; a third converting optical system for guiding a light beam in a region including the optical axis about a light beam from the photographed object, the third converting optical system forming this light beam such that no light beam is displaced on a face perpendicular to the optical axis irrespective of a displacement of the light beam in the direction of the optical axis; first and second photoelectric converting means for respectively receiving the two light beams formed by the first and second converting optical systems in a region in which picture elements composed of a plurality of photoelectric converting elements are arranged in line, the first and second photoelectric converting means providing first and second image data as an electric signal corresponding to a light intensity distribution of an image of each of the received light beams; and third photoelectric converting means for receiving the light beam formed by the third converting optical system in a region in which picture elements composed of a plurality of photoelectric converting elements are arranged in line, the third photoelectric converting means providing third image data as an electric signal corresponding to a light intensity distribution of an image of the received light beam; the focusing state detector selectively detecting the first to third image data obtained by the first to third photoelectric converting means at a plurality of time points to detect a beam focusing state; the focusing state detector further comprising time series phase difference calculating means for dividing the third image data obtained at the preceding or present time into a plurality of small blocks in which the number of picture elements is equal to or smaller than the number of picture elements forming the third image data; the time series phase difference calculating means shifting each of the plural small blocks in a picture element unit with respect to the third image data obtained at the present or preceding time, the time series phase difference calculating means comparing the shifted small blocks with each other to calculate a changing amount of a phase difference in data; area block forming means for reblocking the small blocks based on the changing amount of the phase difference obtained by the time series phase difference calculating means every small block; block determining means for selecting one of the small blocks reblocked by the area block forming means and used as phase difference data for detecting the focusing state; first conformity degree evaluating means for shifting the first or second image data in a picture element unit with respect to the block selected by the block determining means at the present time, the first conformity degree evaluating means evaluating a conformity degree of the first or second image data with respect to this selected block; reference data area determining means for determining an area of the first or second image data evaluated as a highest conformity degree by the first conformity degree evaluating means, the reference data area determining means setting this determined area as a reference data area; and second conformity degree evaluating means for shifting reference data within the first or second image data in the reference data area determined by the reference data area determining means; the second conformity degree evaluating means shifting the reference data in a picture element unit with respect to the second or first image data and evaluating a conformity degree of the second or first image data with respect to the reference data.

In accordance with a sixth structure of the present invention, the block determining means comprises means for weighting each of the blocks and block judging means for judging one of the weighted blocks to be selected.

In the focusing state detectors constructed above, an electric signal is obtained by the photoelectric conversion of a light intensity distribution of an image formed by a light beam in a region including the optical axis of the optical systems with respect to a light beam from the photographed object. This electric signal is added to two electric signals obtained by the basic construction of a phase difference detecting system. Each of these three kinds of electric signals is not simultaneously detected in all of plural distance measurements. Namely, the plural distance measurements are performed by selectively outputting two kinds of electric signals with respect to these three kinds of electric signals. Accordingly, it is possible to accurately detect the focusing state of a light beam at a high speed.

When image data are detected in the plural distance measurements, an integral time for storing a charge to the photoelectric converting elements in the photoelectric converting portions is restricted by photometric data of the monitor photometric section arranged in the vicinity of the photoelectric converting portions. The image data are corrected on the basis of data of the integral time so that reliability of the image data can be greatly improved.

When phase difference data required to move and focus a photographing lens are provided, it is first necessary to provide data blocks in a area in which the number of data blocks approximately corresponds to the number of picture elements with respect to the third image data. In this case, data corresponding to an address in a present block of the picture elements with respect to the third image data are stored to a memory device. A time series phase difference between the third image data at the preceding and present times is calculated on the basis of these stored data. After the data blocks are reblocked on the basis of the above area. A reference area of data is finally provided. The data blocks within this reference area are shifted in a picture element unit with respect to the first or second image data so as to finally provide phase difference data. Accordingly, the phase difference data can be provided at a high speed with high accuracy.

Further objects and advantages of the present invention will be apparent from the following description of the preferred embodiments of the present invention as illustrated in the accompanying drawings.

BRIEF DESCRIPTION OF THE DRAWINGS

FIGS. 19A and 19B are flow charts for explaining an operation of the focusing state detector shown in FIG. 17;

FIG. 20 is a flow chart for explaining a step P2 in detail in the flow chart shown in FIG. 19;

DESCRIPTION OF THE PREFERRED EMBODIMENTS

The preferred embodiments of a focusing state detector in the present invention will next be described in detail with reference to the accompanying drawings.

Figure 1:
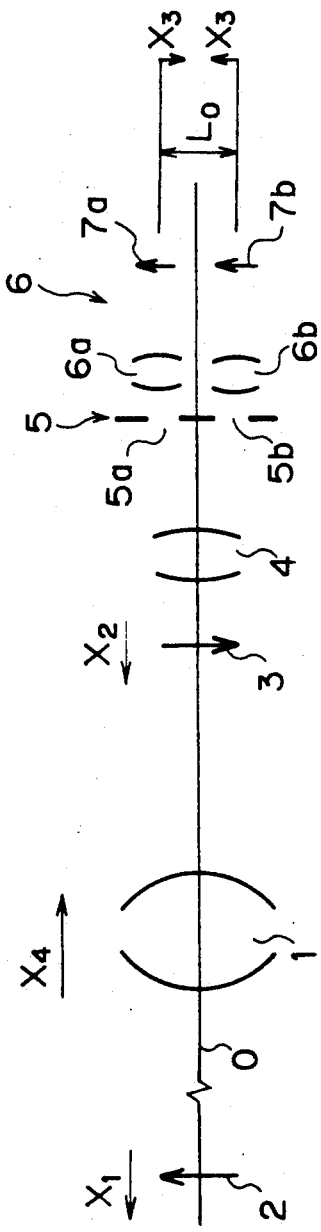
FIG. 1 is a schematic view showing the construction of a general focusing state detector as one example.

FIG. 1 shows a general focusing state detector. As shown in FIG. 1, a photographed object 2 is located in front of a photographing lens 1. The photographed object 2 is focused and formed by this photographing lens 1 as an image 3 on a firm equivalent face. This image 3 is again focused by a condenser lens 4 located backward from this image 3 and is again formed as an image on a rear side of this condenser lens 4.

An example of a concrete construction of this image-reforming optical system will next be described. A mask 5 has holes 5a and 5b for transmitting only light beams therethrough in regions symmetrically arranged with respect to the optical axis O of a lens system about a light beam from the photographed object. An image-reforming lens 6 is arranged backward from this mask 5 and is composed of a first lens 6a and a second lens 6b for again focusing and forming the respective light beams through the above holes 5a and 5b as images. The image-reforming optical system is constructed by the mask 5 and the image-reforming lens 6. Accordingly, the two light beams transmitted through the holes 5a and 5b of the mask 5 are respectively converged by the first lens 6a and the second lens 6b and are respectively formed as a first image 7a and a second image 7b.

When the photographed object 2 is moved leftward by a distance $x_1$ in FIG. 1, the image 3 on the film equivalent face is moved leftward by a distance $x_2$.

In a focusing state of the lens system, the image 3 of the photographed object 2 is focused and formed on the film equivalent face, and the first image 7a and the second image 7b are formed on a light-receiving face formed by a charge coupled device (CCD), etc. in the image-reforming optical system constructed by the condenser lens 4, the mask 5 and the image-reforming lens 6. In this case, the first and second images 7a and 7b are formed on the light-receiving face in a state in which the first and second images are separated from each other by a certain set distance L0 as a phase difference.

When the image 3 on the film equivalent face is moved leftward, the first and second images 7a and 7b refocused and reformed by the condenser lens 4 and the image-reforming lens 6 approach each other by the same distance $x_3$.

To change such a state to the focusing state of the lens system, it is necessary to move a focusing drive lens within the photographing lens by a distance $x_4$ on a far distance side of the lens system.

To automatically focus the lens system, the distance L0 between the first and second images 7a and 7b is detected to calculate the distance $x_3$. Further, a focus moving direction of the photographing lens 1 and a moving amount $x_4$ thereof are provided on the basic of this distance $x_3$. The photographing lens 1 is moved by this amount $x_4$ to focus the lens system.

Figure 2:
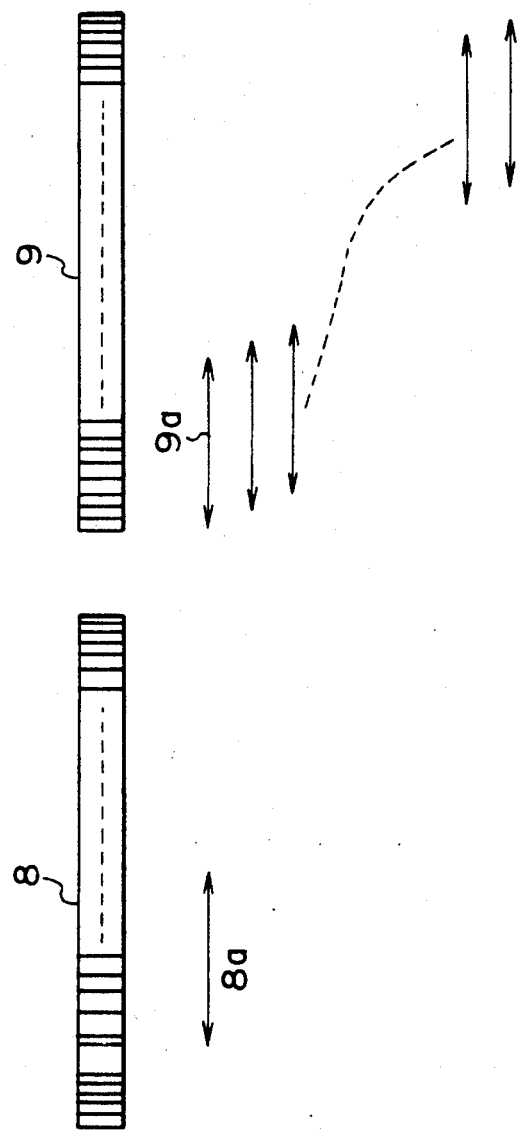
FIG. 2 is a view showing the concept of an operation of a conformity degree in the general focusing state detector.

For example, Japanese Patent Application Laying Open (KOKAI) No. 62-102213 shows detection of the phase difference performed in advance before the calculation of the moving amount $x_4$ for moving the photographing lens 1 to focus the lens system. Two photoelectric converting elements for receiving two images focused and formed by two optical systems for detecting a focusing state of the lens system are constructed by first and second photoelectric converting elements 8 and 9 as shown in FIG. 2. The first and second photoelectric converting elements 8 and 9 are constructed by small photoelectric converting elements arranged in line and composed of a plurality of picture elements. When respective outputs of the first and second photoelectric converting elements 8 and 9 are compared with each other, a reference area 8a in the first photoelectric converting element 8 is set in advance on the basic of the present position of a distance ring in the photographing lens optical system to provide a data block in this reference area 8a.

Next, a comparing area 9a is set such that the comparing area 9a has the same capacity as the reference area 8a. Data blocks of the reference and comparing areas 8a and 9a are compared with each other. For example, these data blocks are compared with each other a plurality of times by shifting the comparing area 9a in a unit of a picture element so as to search a position of the comparing area 9a in which these data blocks are in conformity with each other. Thus, a phase difference between the respective outputs of the first and second photoelectric converting elements 8 and 9 is calculated.

When the moving distance $x_4$ of the photographing lens 1 for providing a focusing state thereof is calculated, it is sufficient to use an electric circuit shown in e.g., Japanese Patent Application Laying Open (KOKAI) No. 62-192732.

In the electric circuit shown in this publication, light beams in two regions symmetrically arranged with respect to the optical axis of a lens system with respect to a light beam from the photographed object are focused and formed as images by photoelectric converting portions composed of small photoelectric converting elements arranged in line. Analog output data of each of picture elements in the photoelectric converting portions are transferred in parallel to an analog shift register based on control of the operation of a charge transfer section. Thereafter, the analog output data of each of the picture elements are obtained in series by operating the shaft register based on control of the operation of a shifting section.

These analog output data are converted to digital data to calculate the phase difference between the first image 7a and the second image 7b shown in FIG. 1 by the operation of an arithmetic circuit at the next stage. The moving amount $x_4$ of the photographing lens 1 is calculated to move and focus this lens on the basis of data of this phase difference.

Timings of control operations of the above photoelectric converting portions, the charge transfer section and the shifting control section are set in accordance with the following procedures.

First, the photoelectric converting portions are cleared on the basis of the control of a reset signal thereof. Then, a charge begins to be stored to each of the small photoelectric converting elements. Next, this charge storing operation is completed when an output of a monitor light-receiving section disposed in the vicinity of the photoelectric converting portions has reached a predetermined value.

A transfer signal is next transmitted to the charge transfer section. Stored charge data of the respective photoelectric converting portions shown by analog voltage values are transferred in parallel to the shift register and are stored to respective memory regions of the shift register.

After a predetermined constant time has passed after generation of the above reset signal, data of picture elements stored to the respective memory regions of the shift register are inputted in series to a known arithmetic circuit including an A/D converter by a shifting signal transmitted from the shifting control section, thereby finally calculating the moving amount $x_4$.

In the above phase difference detecting system, there is a mechanical error in size of the holes 5a and 5b for transmitting only the light beams therethrough in the regions symmetrically arranged with respect to the optical axis O of the lens system with respect to a light beam from the photographed object. This mechanical error is inevitably caused when the holes 5a and 5b are manufactured. In such a case, the mechanical error reduces reliability of two image data obtained by converting the light beams through these holes 5a and 5b into electric signals.

Therefore, in Japanese Patent Application Laying Open (KOKAI) Nos. 62-200310 and 62-200311, a correction coefficient is calculated on the basis of diameters of the two holes 5a and 5b shown in FIG. 1 to compensate the image data by this correction coefficient.

The photoelectric converting portions for providing the two image data are often constructed by electric elements such as a charge coupled device (CCD) in which small photoelectric converting elements are arranged in line. In this case, a difference in sensitivity between the plural small photoelectric converting elements becomes an error in image data finally obtained.

For example, Japanese Patent Application Laying Open (KOKAI) No. 60-4914 shows a structure for preventing such an error. In this publication, a secondary signal is provided in accordance with a difference between reference image data normally obtained and comparison image data obtained by shifting the small photoelectric converting elements by one pitch. The image data are corrected by using this secondary signal on the basis of a difference in sensitivity.

In the above phase difference detecting system, the focusing operation can be performed with high accuracy and the above focusing state can be detected at a high speed. However, it is impossible to sufficiently cope with the movement of the photographed object in such a phase difference detecting system.

Namely, in the case of a photographing operation, the focusing state of a lens system is detected by pushing a shutter button down to the middle of the entire stroke of the shutter button. The focus moving amount of a focus moving member is calculated on the basis of these detected results and the focus moving member in a photographing lens optical system is moved by this focus moving amount. Just after this movement of the focus moving member, a shutter is opened and closed to perform an exposure operation.

Therefore, there is a slight time lag between a detecting time point of the focusing state and a starting time point of the exposure operation. Accordingly, when the photographed object is at rest or is slowly moved, there is no special problem in the phase difference detecting system. However, a finally obtained image is defocused when the photographed object is moved at a high speed.

For example, Japanese Patent Application Laying Open (KOKAI) No. 62-125311 shows a focusing device having a so-called movable body predicting function for predicting the movement of a movable body to prevent the finally obtained image from being defocused.

In this focusing device, the focusing state is detected a plurality of times for a very short period by pushing a shutter button down to the middle of the entire stroke of the shutter button. Detecting data indicative of the focusing state obtained by the plural detections are compared with each other. When these detecting data are equal to each other, it is judged that the photographed object is at rest and the exposure operation is started after a predetermined focusing operation is performed.

In contrast to this, when the above detecting data indicative of the focusing state obtained by the plural detections are not equal to each other, it is judged that the photographed object is moved toward or away from the lens system for example. In this case, a speed curve is calculated and a distance between the photographed object and the lens system is estimated at a starting time point of the actual exposure operation. The exposure operation is performed just after the focusing operation corresponding to this estimated distance is performed. Thus, it is also possible to perform the exposure operation in the focusing state of the lens system with respect to the moving photographed object.

In this case, concrete basic constructions of the photoelectric converting portions, the charge transfer section and the shifting control section can be set to those used in the above-mentioned Japanese Patent Application Laying Open (KOKAI) No. 62-192732. Two series data obtained from the shift register are constructed by data corresponding to light intensity distributions of the first and second images 7a and 7b. After these two series data are first obtained, the photoelectric converting portions are again cleared on the basis of the control of a reset signal. A charge is then stored to each of the small photoelectric converting elements. Further, similar to the above-mentioned case, this charge storing operation is completed when an output of the monitor photometric section has reached a predetermined value. Then, a transfer signal is transmitted to the charge transfer section and stored charge data of each of the photoelectric converting elements are transferred in parallel to the shift register. Similarly, data are transmitted in series from the shift register and a second distance measuring operation is performed. Similarly, third and fourth distance measuring operations are performed.

In the above focusing state detector, when the focusing state of a lens system is detected a plurality of times, the intensity distributions of the first and second images 7a and 7b are outputted by the number of times equal to the number of detections of the focusing state. For example, when the number of detections of the focusing state is three, the intensity distributions of the first and second images 7a and 7b are outputted by three times.

Accordingly, a time required to perform the plural detections (shown as n detections) of the focusing state is n times a time required to output the intensity distributions of the first and second images 7a and 7b. Accordingly, a total of times for detecting the focusing state is provided by adding fixed times such as a calculating time, a charge transfer time, etc. to the above time required to perform the plural detections.

In the general focusing state detector, data of a defocusing amount are detected a plurality of times to improve an accuracy in distance measurement and fulfill an operation predicting function. In this case, a phase difference between images formed by light beams in the two regions symmetrically arranged with respect to the optical axis of the lens system about a light beam from the photographed object is calculated by using the photoelectric converting elements such as a charge coupled device (CCD) in each of the plural distance measurements. A focus moving amount of the photographing lens is calculated from data of this phase difference. Accordingly, it takes much time to provide the focus moving amount of the photographing lens.

Namely, a first detecting time of the focusing state multiplied by the number of detections of the focusing state (i.e., the number of distance measurements) is required in total to provide the focus moving amount of the photographing lens.

Further, in the general focusing state detector, the phase difference data at the present time are provided on the basis of image data at the present time obtained at a time point of each of the plural distance measurements. Further, the phase difference data at the preceding time are provided on the basis of the image data at the preceding time. A difference between defocusing amounts at the preceding and present times is detected by comparing the phase difference data at the preceding and present times with each other. When there is no change in defocusing amount, it is judged that the photographed object is at rest.

In contrast to this, when the defocusing amount at the present time is changed from that at the preceding time, it is judged that the photographed object is moving in a direction of the optical axis. Thus, the movement of the photographed object is predicted on the basis of this change in defocusing amount.

However, the movement of the photographed object can be accurately predicted when image signals provided at two time points of distance measurement, i.e., at the present and preceding times are coincident with each other and brightness distributions of the light beams incident to the respective photoelectric converting portions are equal to each other. When these image signals are not sufficiently coincident with each other and these brightness distributions are greatly different from each other, it is impossible to accurately predict the movement of the photographed object since an error in operation of the focusing state detector is caused. Therefore, in a certain case, it is judged that the photographed object is moving although the photographed object is at rest.

Further, when the photographed object is moved in a direction perpendicular to the optical axis of the lens system, the two image data are greatly shifted from each other and are not in conformity with each other. Therefore, a great phase difference is caused even when a distance between the photographed object and the lens system is approximately constant, thereby providing data of an incorrect defocusing amount.

A light-receiving section for providing the image data is constructed by a charge coupled device (CCD) so that a dynamic range of a quantity of light incident to the light-receiving section is narrow. To prevent this dynamic range from being narrowed, a monitor photometric section is disposed in the vicinity of the photoelectric converting portions for detecting image data. A charge storing time is controlled in the light-receiving section for detecting image data on the basis of an output of the monitor photometric section to make constant an average charge storing amount of the image data from the light-receiving section. For example, such a structure is shown in Japanese Patent Application Laying Open (KOKAI) No. 62-192732.

In such a structure, there is no special problem when two image data corresponding to light beams in the two regions symmetrically arranged with respect to the optical axis of the lens system are obtained at only specified time points close to each other. However, there is a problem when image data are obtained at each of a plural of time points far from each other and are compared with each other to predict the movement of the photographed object.

Namely, when the movement of the photographed object is predicted by comparing the data of plural phase differences based on the image data obtained at the plural time points, it is necessary that general photoelectric converting characteristics including the electric characteristics of an amplifier are equal to each other at the plural time points. However, when the focusing state detector has a monitor control means, an apparent gain of the monitor control means is changed at the plural time points. Therefore, the image data are different from each other with respect to the same photographed object so that no image data are in conformity with each other at the plural time points, thereby detecting an incorrect defocusing amount.

Further, a reference area of data is set in advance on the basis of distance information of the photographing lens when the phase difference is calculated by providing a conformity degree of image outputs of the two optical systems. Therefore, a means for detecting a position of the photographing lens is indispensable to the focusing state detector. Accordingly, the focusing state detector has a complicated structure and a mechanical means for detecting a position of the photographing lens must be used in this focusing state detector so that an accuracy in detection of the position of the photographing lens is limited. Therefore, it is difficult to accurately set the reference area.

Figure 3:
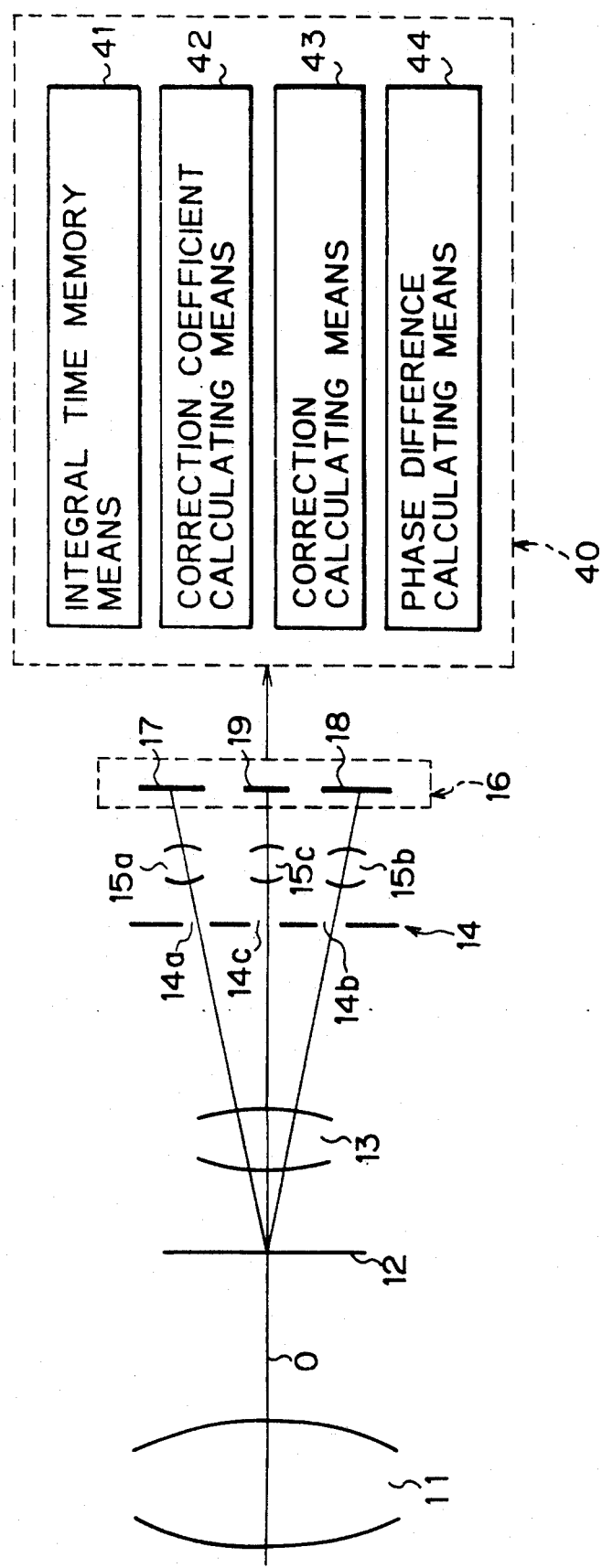
FIG. 3 is a schematic view showing the construction of a focusing state detector in accordance with a first embodiment of the present invention.

FIG. 3 is an optical path view showing the basic construction of a focusing state detector in accordance with a first embodiment of the present invention. In this focusing state detector, a predetermined image-forming face 12 is located in a position equal to that of an unillustrated film face located backward from a photographing lens 11. First to third converting optical systems are arranged backward from the predetermined image-forming face 12.

A condenser lens 13 is disposed to converge the image of a photographed object formed on the predetermined image-forming face 12. A mask 14 is arranged backward from this condenser lens 13 and has first, second and third holes 14a, 14b and 14c. The first and second holes 14a and 14b transmit light beams therethrough in two regions symmetrically arranged with respect to the optical axis O of a lens system about a light beam from the photographed object. The third hole 14c transmits a light beam therethrough in a region including this optical axis O.

First, second and third image-reforming lenses 15a, 15b and 15c are respectively arranged backward from the first, second and third holes 14a, 14b and 14c of the mask 14. A photoelectric converting section 16 is arranged backward from these image-reforming lenses 15a, 15b and 15c, and is constructed by first, second and third photoelectric converting portions 17, 18 and 19 described in detail later. This photoelectric converting section 16 is connected to an arithmetic section 40 described in detail later.

In the following description, the first hole 14a of the mask 14 and the first image-reforming lens 15a constitute the first converting optical system. The second hole 14b and the second image-reforming lens 15b constitute the second converting optical system. Further, the third hole 14c and the third image-reforming lens 15c constitute the third converting optical system.

The first photoelectric converting portion 17 forming the photoelectric converting section 16 receives a light beam converged by the first image-reforming lens 15a through the first hole 14a. The second photoelectric converting portion 18 receives a light beam converged by the second image-reforming lens 15b through the second hole 14b. The third photoelectric converting portion 19 receives a light beam converged by the third image-reforming lens 15c through the third hole 14c. An output of the photoelectric converting section 16 is transmitted to the arithmetic section 40.

Figure 4:
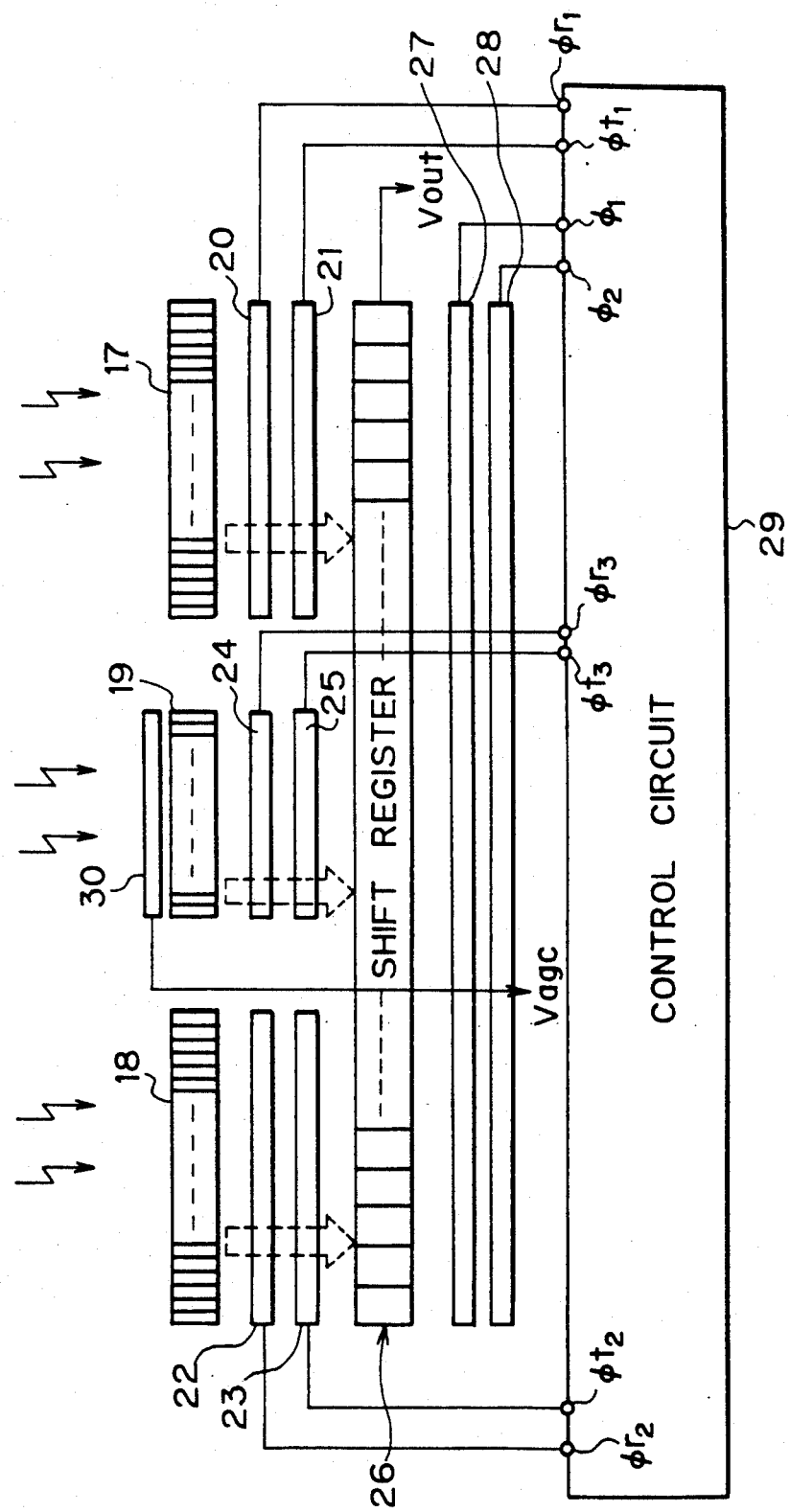
FIG. 4 is a diagram showing an electric circuit of a photoelectric converting section disposed in the focusing state detector shown in FIG. 3.

As shown in FIG. 4, electric circuits constituting such a photoelectric converting section 16 have the first to third photoelectric converting portions 17 to 19. Each of the first to third photoelectric converting portions 17 to 19 is formed as a so-called CCD photoelectric converting portion composed of small photoelectric converting elements of a charge storing type arranged in line. A reset portion 20 and a shifting portion 21 are connected to the first photoelectric converting portion 17. The reset portion 20 constitutes a charge clearing section for clearing a stored charge in a series of the respective photoelectric converting elements. The shifting portion 21 constitutes a charge transfer section for shifting a charge. Similarly, reset portions 22, 24 as a charge clearing section and shifting portions 23, 25 as a charge transfer section are respectively connected to the second and third photoelectric converting portions 18 and 19.

An analog shift register 26 as a data memory section is connected to the first to third photoelectric converting portions 17 to 19. Shifting portions 27 and 28 are also connected to the first to third photoelectric converting portions 17 to 19 to perform a shifting control operation of the shift register 26 by using two phases.

A control circuit 29 is disposed to obtain three or two image information signals (described in detail later) respectively by the above first, second and third photoelectric converting portions 17, 18 and 19 at a plurality of time points. The control circuit 29 constitutes a control means for simultaneously or selectively generating three clear signals in the respective reset portions 20, 22 and 24, transfer signals in the above charge transfer section, and shift pulses $\phi_1$ and $\phi_2$ as shift signals in the above shift register 26. The three clear signals are constructed by first, second and third reset pulses $\phi r_1$, $\phi r_2$ and $\phi r_3$. The transfer signals are constructed by first, second and third shift pulses $\phi t_1$, $\phi t_2$ and $\phi t_3$ in the shifting portions 21, 23 and 25.

The first, second and third reset pulses $\phi r_1$, $\phi r_2$ and $\phi r_3$ are respectively transmitted from the control circuit 29 to the above reset portions 20, 22 and 24. The first, second and third shift pulses $\phi t_1$, $\phi t_2$ and $\phi t_3$ are respectively transmitted to the above first, second and third shifting portions 21, 23 and 25. The shift pulses $\phi_1$ and $\phi_2$ are respectively transmitted to the first and second shifting portions 27 and 28.

A monitor photometric section 30 is arranged in the vicinity of the above photoelectric converting section 16. In this embodiment, the monitor photometric section 30 is arranged in the vicinity of the third photoelectric converting portion 19. The control circuit 29 includes the function of an unillustrated monitor control means for making constant an average stored charge amount in the first, second and third photoelectric converting portions 17, 18 and 19 based on an output voltage $V_{agc}$ of the monitor photometric section 30.

Further, the arithmetic section 40 has an integral time memory means 41, a correction coefficient calculating means 42, a correction calculating means 43 and a phase difference calculating means 44.

The integral time memory means 41 calculates an integral time from generation of each of the clear signals in the above charge clearing section to generation of each of the transfer signals in the above charge transfer section. Namely, the integral time memory means 41 calculates an integral time from generation of each of the first, second and third reset pulses $\phi r_1$, $\phi r_2$ and $\phi r_3$ in the reset portions 20, 22 and 24 to generation of each of the first, second and third shift pulses $\phi t_1$, $\phi t_2$ and $\phi t_3$ in the shifting portions 21, 23 and 25. The integral time memory means 41 then stores this integral time thereto.

The correction coefficient calculating means 42 calculates a correction coefficient based on integral time data obtained by the above integral time memory means 41 at a plurality of time points. Concretely, the correction coefficient calculating means 42 calculates the correction coefficient in the following two examples.

In a first example, the correction coefficient is set in accordance with a ratio of integral times at the preceding and present times. In a second example, the correction coefficient is set in accordance with the integral time data obtained at each of the plural time points.

The first example is used in this first embodiment of the present invention.

The correction calculating means 43 corrects image data obtained by the first, second and third photoelectric converting portions 17, 18 and 19 using the correction coefficient data obtained by the correction coefficient calculating means 42.

The phase difference calculating means 44 processes phase difference data based on image data at the preceding or present time and phase difference data based on the image data corrected by the correction calculating means 43 at the present or preceding time.

Figure 5:
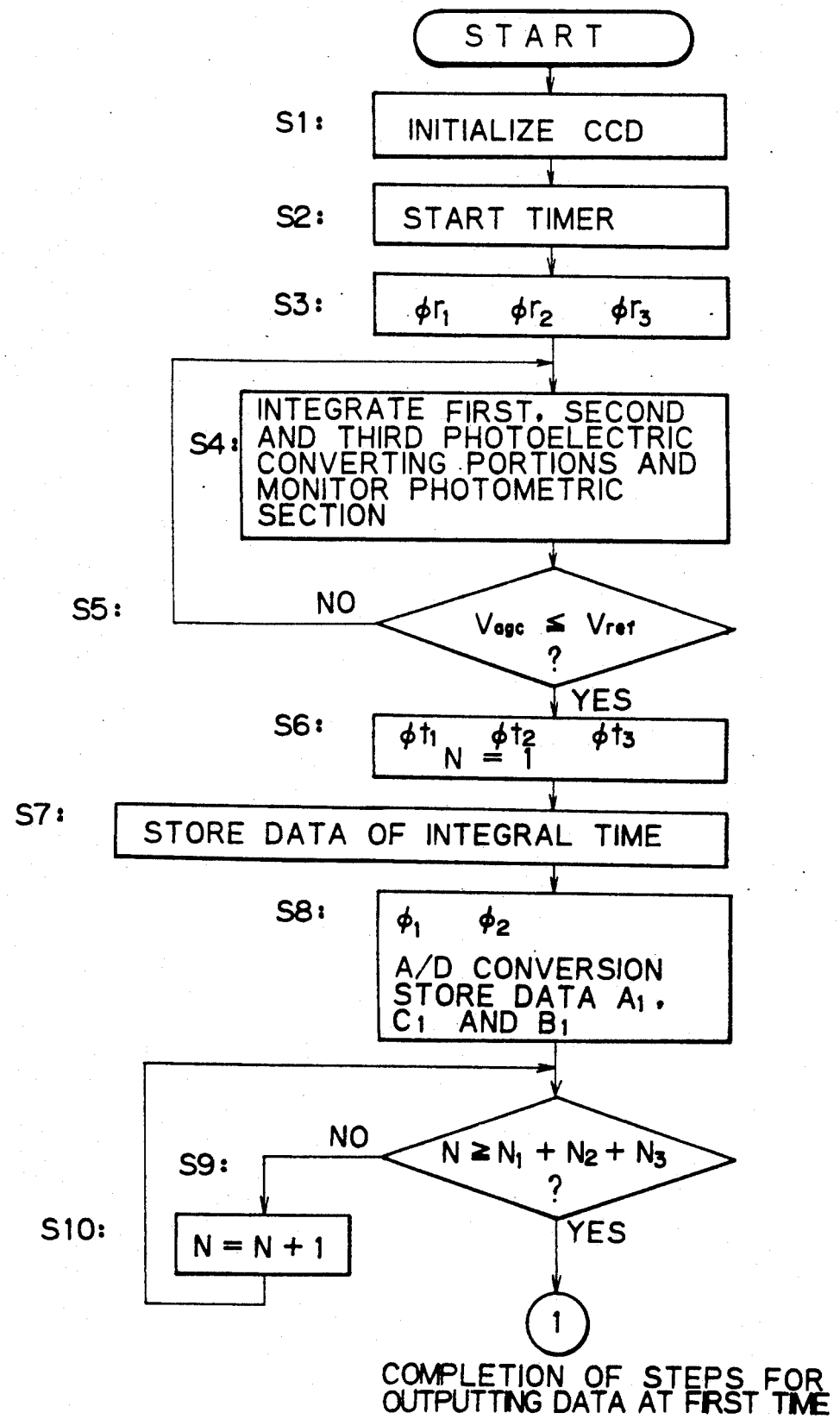
FIG. 5 is a flow chart for explaining an operation of the focusing state detector in the first embodiment of the present invention.
Figure 9:
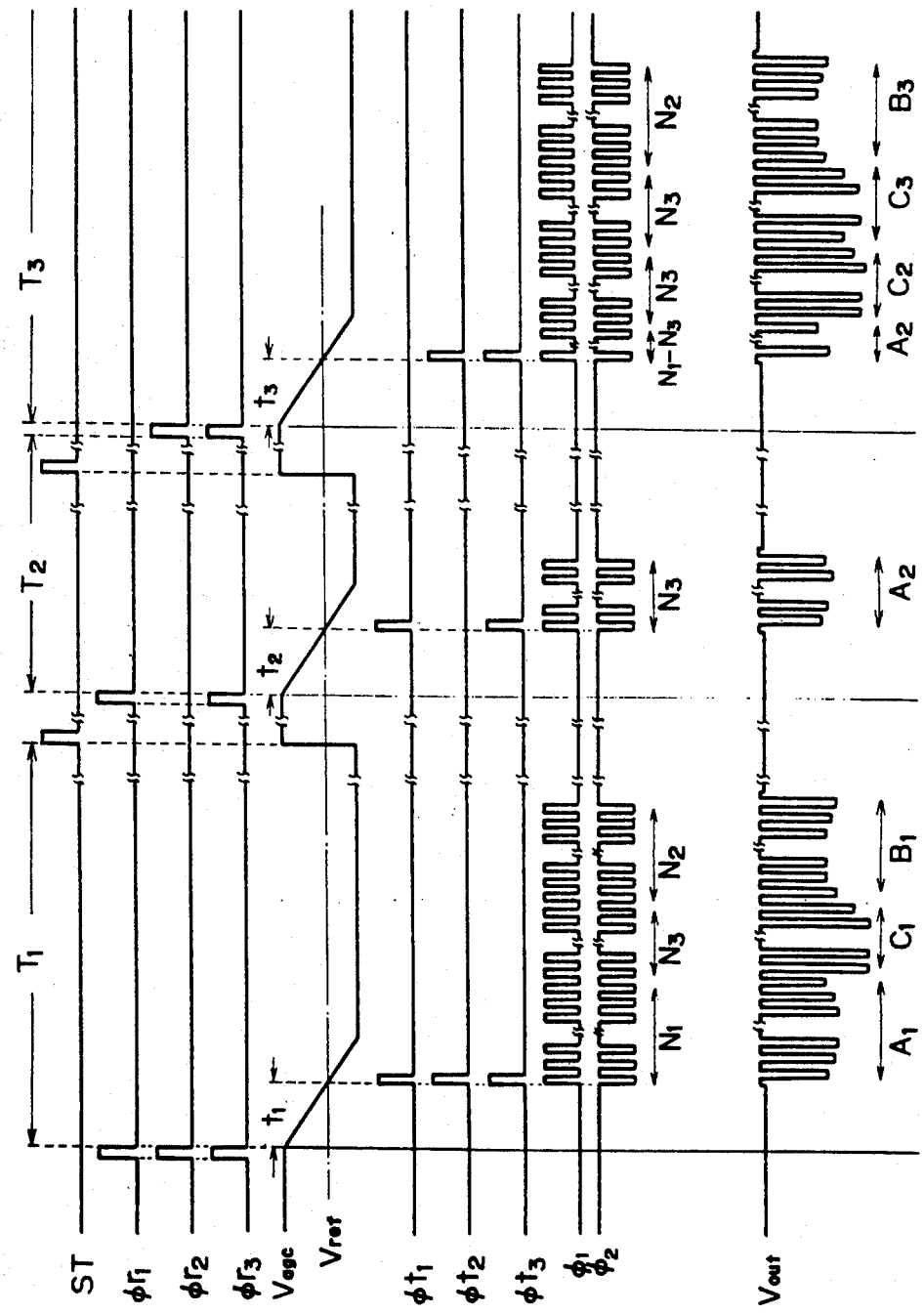
FIG. 9 is a waveform diagram for explaining the operation of the focusing state detector in the first embodiment of the present invention shown in FIG. 3.

In a step S1 shown in FIG. 5, the charge coupled device (CCD) is initialized when an automatic focusing operation is sequentially started by pushing a shutter button down to the middle of the entire stroke of the shutter button. Thus, all data left in the shift register 26 are cleared. Subsequently, a timer is started in a step S2. In a step S3, the first, second and third reset pulses $\phi r_1$, $\phi r_2$ and $\phi r_3$ rise so that voltage levels of these reset pulses are set to high voltage levels as shown in FIG. 9. Further, residual charges are cleared from the respective photoelectric converting elements of the first, second and third photoelectric converting portions 17, 18 and 19 through the first, second and third reset portions 20, 22 and 24.

In a step S4, the first, second and third reset pulses $\phi r_1$, $\phi r_2$ and $\phi r_3$ fall so that voltage levels of these reset pulses are set to low voltage levels. Accordingly, an integral operation is started in each of the photoelectric converting portions 17 to 19. Thus, a charge is stored to each of the photoelectric converting elements of the first, second and third photoelectric converting portions 17, 18 and 19 in accordance with a light intensity distribution of each of the above-mentioned three light beams.

Thereafter, in a step S5, an output voltage $V_{agc}$ of the monitor photometric section 30 is compared with a reference voltage $V_{ref}$. When the output voltage $V_{agc}$ is reduced and is lower than the reference voltage $V_{ref}$, it proceeds to a step S6. In the step S6, the first, second and third shift pulses $\phi t_1$, $\phi t_2$ and $\phi t_3$ rise so that voltage levels of these shift pulses are set to high voltage levels. Further, the number N of clock signals in a shift counter is set to one and it proceeds to the next step S7.

In the step S7, an integral time $t_1$ at a first time (or at a first time point) is stored to a RAM by an operation of the integral time memory means 41. This integral time $t_1$ is a time from a fall time point of the first reset pulse $\phi r_1$ at the low voltage level to a rise time point of the first shift pulse $\phi t_1$ at the high voltage level. Next, it proceeds to a step S8 from the step S7.

In the step S8, the shift pulse $\phi_1$ rises so that a voltage level of this shift pulse is set to a high voltage level. Further, the shift pulse $\phi_2$ falls so that a voltage level of this shift pulse is set to a low voltage level. Thus, picture element data stored to each of the photoelectric converting elements of the first, second and third photoelectric converting portions 17, 18 and 19 are outputted by one clock data amount (a data amount of one picture element) as an output $V_{out}$ from the shift register 26. This output is A/D-converted by an unillustrated A/D converter and is stored to an unillustrated RAM as data of one picture element.

Such a storing operation is repeatedly performed until a predetermined number equal to or greater than a total number of picture elements. Concretely, such a storing operation is repeatedly performed until a number $(N_1+N_2+N_3)$ provided by adding the number $N_1$ of picture elements in the first photoelectric converting portion 17, the number $N_2$ of picture elements in the second photoelectric converting portion 18, and the number $N_3$ of picture elements in the third photoelectric converting portion 19. In this first embodiment, $N_1=N_2>N_3$ is set.

Figure 10:
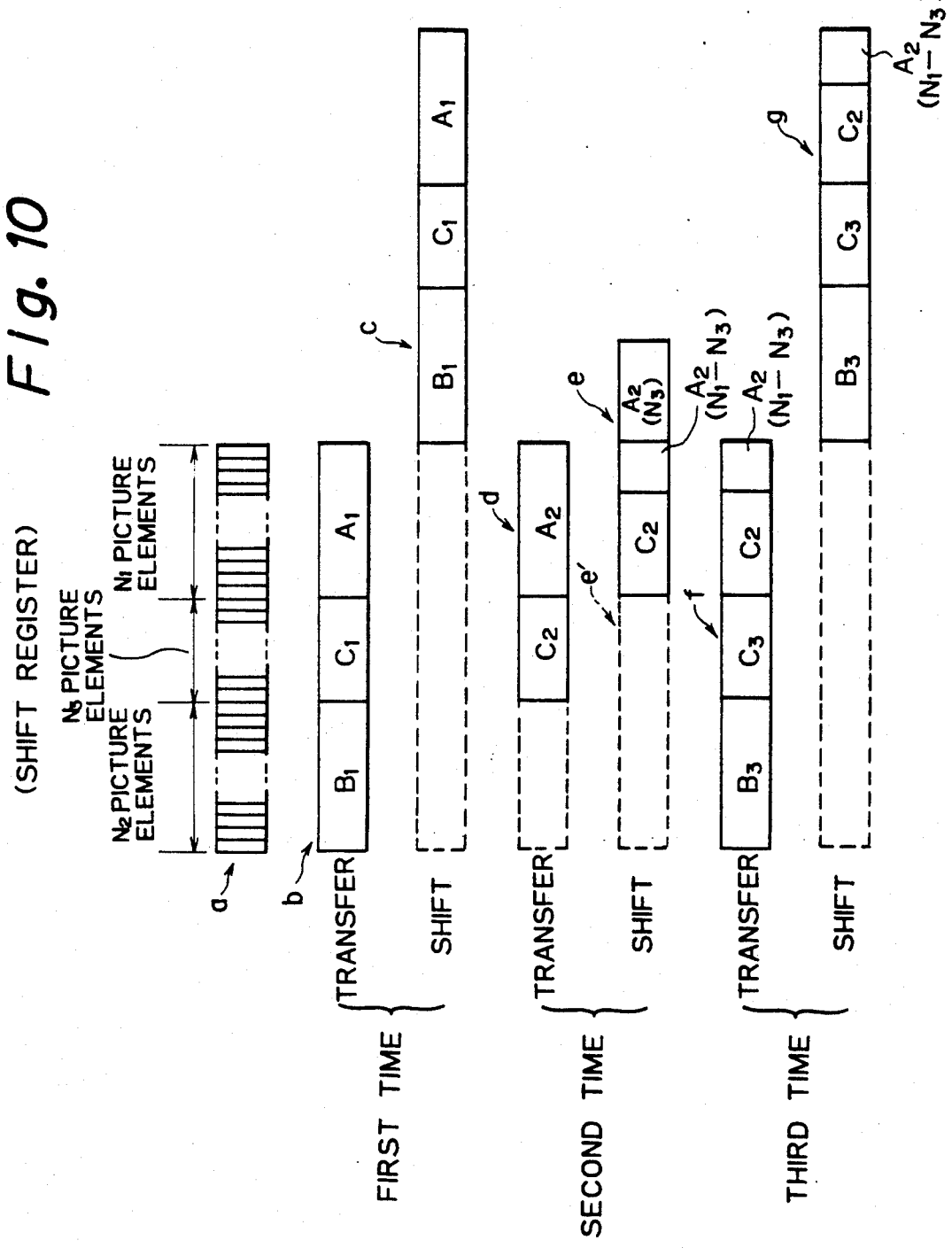
FIG. 10 is a view for explaining a data transfer and an output shift of a shift register shown in FIG. 4.

In the first embodiment, the shift register 26 has a capacity equivalent to the total number $N_1+N_2+N_3$ of picture elements as shown by reference numeral a in FIG. 10. Accordingly, a transfer operation of data in the step S6 is performed as shown by reference numeral b in FIG. 10.

In a step S9, it is judged whether $N \geq (N_1+N_2+N_3)$ is formed or not every time the data of one picture element are stored to the RAM in the step S8. When this judgment is NO, it proceeds to a step S10 and an incremental operation is performed such that value one is added to the number N.

In contrast to this, when the judgement is YES in the step S9, data of the total number of picture elements are outputted from the shift register 26 in the order of a first series of data $A_1$ at the first time, a third series of data $C_1$ at the first time, and a second series of data $B_1$ at the first time as shown by reference numeral c in FIG. 10. Thus, these data at the first time are completely stored to the RAM and steps shown in FIG. 6 begin to be executed to provide data at a second time (or at a second time point).

Figure 6:
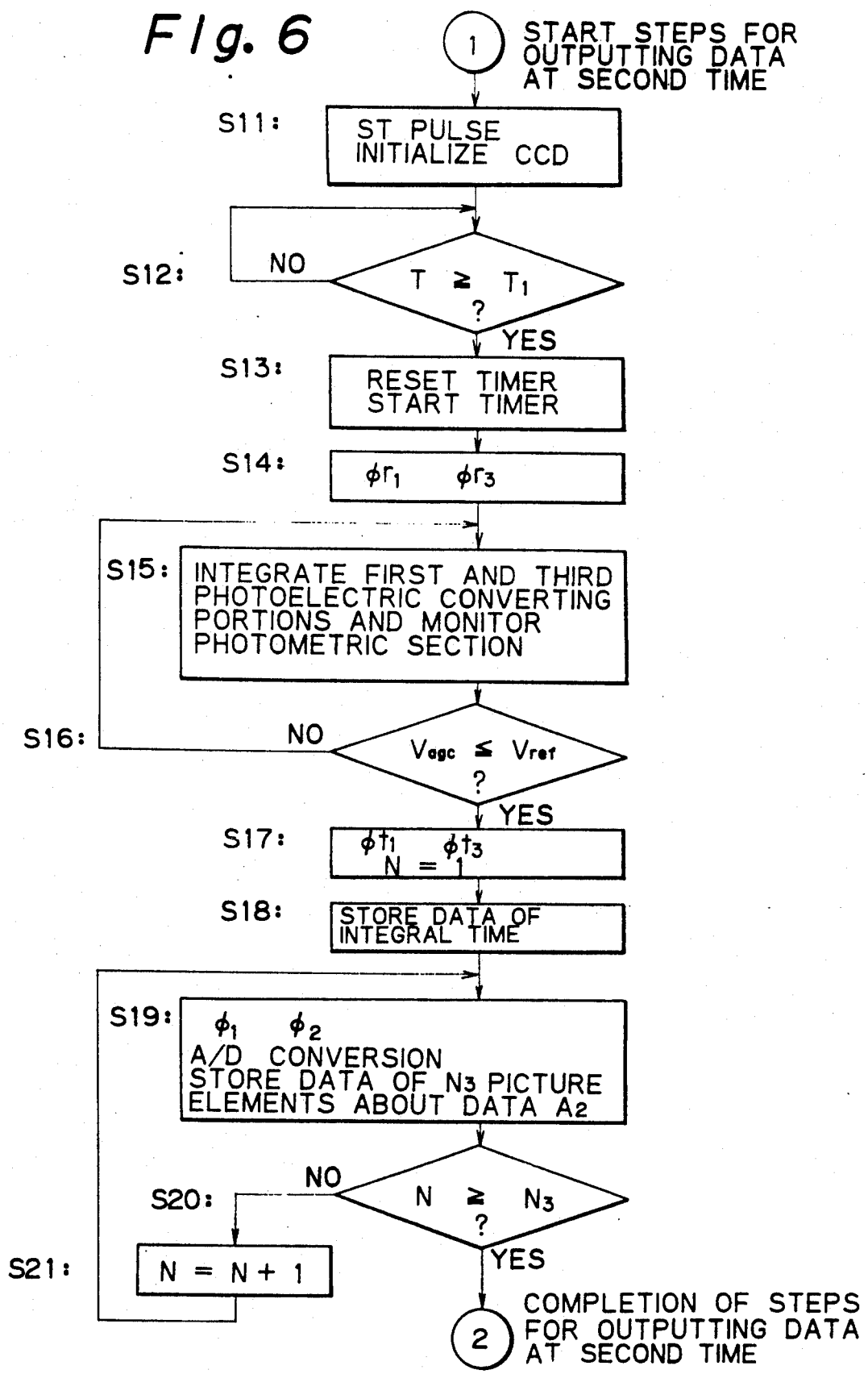
FIG. 6 is a flow chart showing steps subsequent to the flow chart shown in FIG.5.

In a step S11 shown in FIG. 6, a pulse ST for initializing the monitor photometric section 30 rises so that a voltage level of this pulse is set to a high voltage level. Thus, the monitor photometric section 30 is charged until a voltage level of this monitor photometric section 30 is equal to a predetermined voltage level, thereby attaining a standby state thereof. Further, the first to third photoelectric converting portions 17 to 19 are initialized.

In the next step S12, it is judged whether or not the elapsed time of a timer circuit started in the above step S2 exceeds a predetermined time $T_1$. When this judgment is YES, it proceeds to the next step S13. In the step S13, the above timer circuit is reset and simultaneously started again. In contrast to this, when the judgment in the step S12 is NO, it does not proceed to the step S13 until $T \geq T_1$ is formed.

In the step S5, as mentioned above, the output voltage $V_{agc}$ of the monitor photometric section 30 is compared with the reference voltage $V_{ref}$. $T \geq T_1$ in the step S12 is judged since time $t_1$, time $t_2$, - - - required to provide the judgment YES ($V_{agc} \leq V_{ref}$) in the step S5 are not constant, but are changed in accordance with brightness of the photographed object. For example, when the brightness of the photographed object is high, the time required to provide the judgment YES in the step S5 is reduced. In contrast to this, when the brightness of the photographed object is low, the time required to provide the judgment YES in the step S5 is increased.

Accordingly, when the brightness of the photographed object is extremely low, it takes much time to obtain data of each of the picture elements in the first to third photoelectric converting portions 17 to 19. As a result, a total automatic focusing time is increased so that no focusing state detector can be really used. Therefore, no output of data of the first to third photoelectric converting portions 17 to 19 is interrupted and it compulsorily proceeds to the next step at the certain specified time $T_1$ arbitrarily set in accordance with a lower limit of a general brightness range of the photographed object.

When the timer circuit is started in the step S13, the first and third reset pulses $\phi r_1$ and $\phi r_3$ rise in a step S14 so that voltage levels of these reset pulses are set to high voltage levels. Thus, the first and third photoelectric converting portions 17 and 19 are reset through the reset portions 20 and 24. Simultaneously, an integral operation of each of the first and third photoelectric converting portions is started with respect to each of the picture elements in accordance with a light intensity distribution of each of the received light beams. Simultaneously, as shown in steps S14 and S15, the monitor photometric section 30 is reset and an integral operation is started with respect to the monitor photometric section 30.

In the next step S16, similar to the above step S5, it is judged whether or not the output voltage $V_{agc}$ of the monitor photometric section 30 is equal to or lower than the reference voltage $V_{ref}$. When the output voltage $V_{agc}$ of the monitor photometric section 30 is reduced and is lower than the reference voltage $V_{ref}$, it proceeds to a step S17. In the step S17, the first and third shift pulses $\phi t_1$ and $\phi t_3$ rise so that voltage levels of these shift pulses are set to high voltage levels. Data of the first and third photoelectric converting portions 17 and 19 are shifted by the shift register 26 through the shifting portions 21 and 25 as shown by reference numeral d in FIG. 10. Further, the number N of clock signals in a shift counter is set to one and it proceeds to the next step S18.

In the step S18, similar to the above step S7, an integral time $t_2$ at the second time (or at the second time point) is stored to the RAM and it proceeds to the next step S19. In the step S19, the shift pulse $\phi_1$ rises so that a voltage level of this shift pulse is set to a high voltage level. In contrast to this, the shift pulse $\phi_2$ falls so that a voltage level of this shift pulse is set to a low voltage level.

Accordingly, the picture element data stored to each of the photoelectric converting elements of the first photoelectric converting portion 17 are outputted by one clock data amount (a data amount of one picture element) as an output $V_{out}$ from the shift register 26. This output $V_{out}$ is A/D-converted and is stored to the RAM as data of one picture element.

Such a storing operation is repeatedly performed until the number $N_3$ of picture elements constituting the third photoelectric converting portion 19.

Namely, it is judged in a step S20 whether $N \geq N_3$ is formed or not every time the data of one picture element are stored to the RAM in the step S19. When this judgment is NO, it proceeds to a step S21 and an incremental operation is performed such that value one is added to the number N.

In contrast to this, when the judgment is YES in the step S20, data of $N_3$ picture elements in the first photoelectric converting portion 17 are outputted from the shift register 26. As shown by reference numeral e in FIG. 10, these data of $N_3$ picture elements in the first photoelectric converting portion 17 are constructed by data of $N_3$ picture elements with respect to a first series of data $A_2$ at the second time. The steps for providing data at the second time and shown in FIG. 6 are thus completely executed and it proceeds to steps for providing data at a third time (or at a third time point) and shown in FIG. 7.

Figure 7:
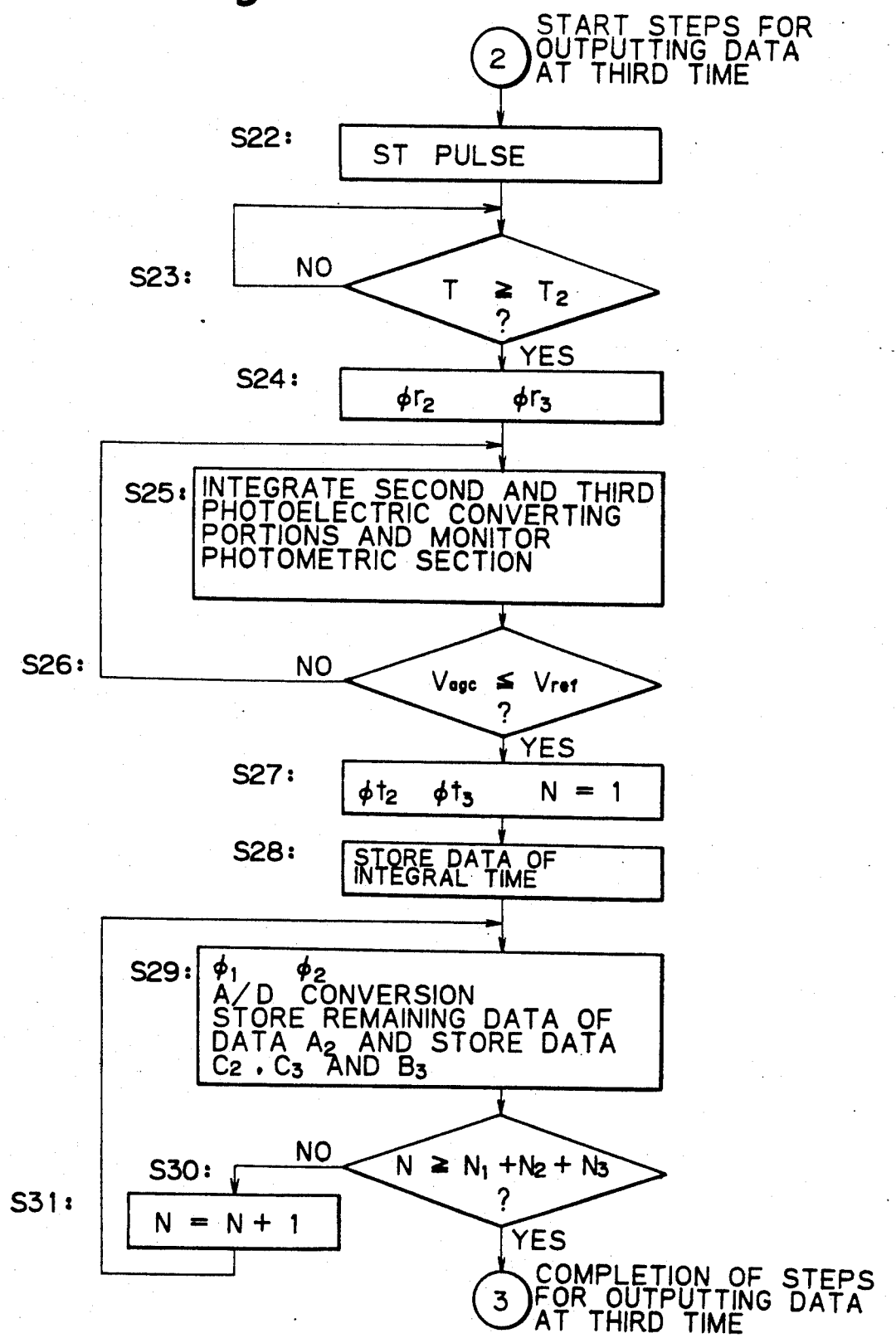
FIG. 7 is a flow chart showing steps subsequent to the flow chart shown in FIG. 6.

In a step S22 shown in FIG. 7, an ST pulse for initializing the monitor photometric section 30 rises so that a voltage level of this pulse is set to a high voltage level. Thus, the monitor photometric section 30 is charged until a voltage level of this monitor photometric section 30 is equal to a predetermined voltage level, thereby attaining a standby state thereof. Further, the first to third photoelectric converting portions 17 to 19 are reset.

In the next step S23, it is judged whether or not the elapsed time of a timer circuit started in the above step S13 exceeds a predetermined time $T_2$. When this judgment is YES, it proceeds to the next step S24.

In contrast to this, when the judgment in the step S23 is NO, it does not proceed to the step S24 until $T \geq T_2$ is formed.

$T \geq T_2$ in the step S23 is judged for reasons similar to those for the comparison ($T \geq T_1$) of the times T and $T_1$ in the above step S12.

When the judgment is YES in the step S23, it proceeds to the next step S24. In this step S24, the second and third reset pulses $\phi r_2$ and $\phi r_3$ rise so that voltage levels of these reset pulses are set to high voltage levels. The second and third photoelectric converting portions 18 and 19 are respectively reset through the reset portions 22 and 24. Simultaneously, an integral operation of each of the second and third photoelectric converting portions is started with respect to each of the picture elements in accordance with each of the received light beams. Simultaneously, the monitor photometric section 30 is reset and an integral operation is started with respect to the monitor photometric section 30.

In the next step S26, similar to the above step S5, it is judged whether or not the output voltage $V_{agc}$ of the monitor photometric section 30 is equal to or lower than the reference voltage $V_{ref}$. When the output voltage $V_{agc}$ of the monitor photometric section 30 is reduced and is lower than the reference voltage $V_{ref}$, it proceeds to a step S27. In the step S27, the second and third shift pulses $\phi t_2$ and $\phi t_3$ rise so that voltage levels of these shift pulses are set to high voltage levels. Data of the second and third photoelectric converting portions 18 and 19 are respectively shifted by the shift register 26 through the shifting portions 23 and 25.

Such a shifting operation of the shift register 26 is performed with respect to a data region in which data are not cleared from the shift register 26 in the second shift, but are left in the shift register 26. As shown by reference numeral f in FIG. 10, this data region is an empty region except for data of $(N_1 - N_3)$ picture elements with respect to the first series of data $A_2$ at the second time and except for the third series of data $C_2$ at the second time. Namely, this data region is an empty region e' caused when data of $N_3$ picture elements with respect to the data $A_2$ at the second time are shifted.

Accordingly, as shown by reference numeral f in FIG. 10, the data of the shift register 26 are arranged in an order of the data of $(N_1-N_3)$ picture elements with respect to the first series of data $A_2$ at the second time already stored in the preceding shift, the third series of data $C_2$ at the second time, a third series of data $C_3$ at the third time, and a second series of data $B_3$ at the third time. Next, the number N of clock signals in a shaft counter is set to one and it proceeds to the next step S28.

In the step S28, similar to the above steps S7 and S18, data of an integral time $t_3$ at the third time are stored to a RAM and it proceeds to a step S29. In the step S29, the shift pulse $\phi_1$ rises so that a voltage level of this shift pulse is set to a high voltage level. In contrast to this, the shift pulse $\phi_2$ falls so that a voltage level of this shift pulse is set to a low voltage level.

Accordingly, the picture element data stored to each of the photoelectric converting elements of the first photoelectric converting portion 17 are outputted by one clock data amount (a data amount of one picture element) as an output $V_{out}$ from the shift register 26. This output $V_{out}$ is A/D-converted and is stored to a RAM as data of one picture element.

In such a storing operation, the RAM stores data of the remaining picture elements except for $N_3$ picture elements with respect to the respective picture element data $A_2$ of the first photoelectric converting portion 17 at the preceding time. Subsequently, the RAM stores data $C_2$ of the third photoelectric converting portion 19 obtained in steps for outputting data at the second time.

Next, the RAM stores the third series of data $C_3$ obtained in steps for outputting data at the third time and stores the second series of data $B_3$ obtained in the steps for outputting data at the third time.

In the next steps S30 and S31, similar to the above steps S9 and S10, it is judged whether $N \geq (N_1+N_2+N_3)$ is formed or not. When this judgment is YES, the steps for outputting data at the third time and shown in FIG. 7 are completely executed and it proceeds to the next step S32 so as to start a distance measuring operation in a series of steps shown in FIG. 8.

Figure 8:
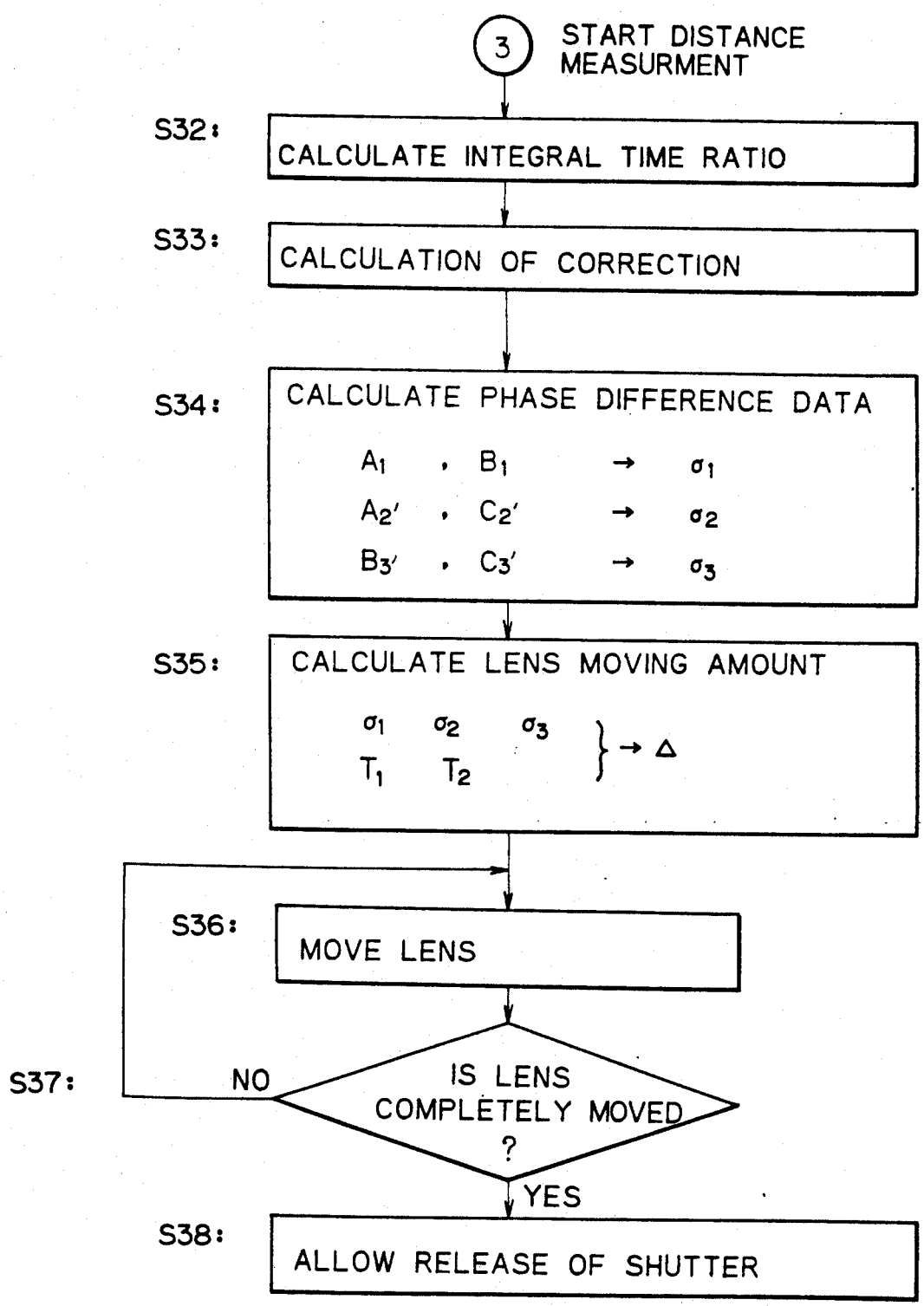
FIG. 8 is a flow chart showing steps subsequent to the flow chart shown in FIG. 7.

In the step S32 shown in FIG. 8, integral time ratios with respect to the integral times $t_1$, $t_2$ and $t_3$ obtained in the above steps S7, S18 and S28 are calculated by the correction coefficient calculating means 42.

Namely, two integral time ratios $t_1/t_2$ and $t_2/t_3$ are calculated by the correction coefficient calculating means 42. In the next step S33, the image data $A_2$ and $C_2$ already obtained at the second time are corrected by the above integral time ratio $t_1/t_2$ using the correction calculating means 43, thereby providing corrected image data $A_2'$ and $C_2'$ at the second time. Further, the image data $B_3$ and $C_3$ obtained at the third time are corrected by the above integral time ratio $t_2/t_3$ using the correction calculating means 43, thereby providing corrected image data $B_3'$ and $C_3'$ at the third time. Then, it proceeds to the next step S34.

A correction coefficient $\alpha$ calculated by the correction coefficient calculating means 42 and correction contents of the correction calculating means 43 are represented by the following formulas.

$$Aj' = Aj \times \alpha,$$

$$\alpha = t'/t$$

In the above formulas, $Aj$ designates image data in an address at the preceding or present time.

$Aj'$ designates corrected image data in an address j at the preceding or present time.

Reference numeral t designates an integral time at the preceding or present time.

Reference numeral $t'$ designates an integral time at the present or preceding time.

In the step S34, first phase difference data $\sigma_1$ are provided from data $A_1$ and $B_1$ of the picture element data stored to the RAM and provided in the above steps S8, S19 and S29. These data $A_1$ and $B_1$ are respectively the first series of data $A_1$ and the second series of data $B_1$ provided at the first time.

Next, the data $A_2$ and $C_2$ are respectively corrected to provide a first series of corrected data $A_2'$ and a third series of corrected data $C_3'$. In this case, the data $A_2$ are constructed by data of $N_3$ picture elements with respect to the first series of data $A_2$ provided at the second time, and data of $(N_1-N_3)$ picture elements provided at the third time. The data $C_2$ are the third series of data stored at the second time. Second phase difference data $\sigma_2$ are provided from the first series of corrected data $A_2'$ and the third series of corrected data $C_3'$.

Next, the second series of data $B_3$ and the third series of data $C_3$ obtained in the steps (see FIG. 7) for outputting data at the third time are respectively corrected to provide a second series of corrected data $B_3'$ and a third series of corrected data $C_3'$. Third phase difference data $\sigma_3$ are provided from the second series of corrected data $B_3'$ and the third series of corrected data $C_3'$. Then, it proceeds to the next step S35.

In the step S35, a moving amount $\Delta$ of the photographing lens is calculated on the basis of a total of five kinds of data composed of the first, second and third phase difference data $\sigma_1$, $\sigma_2$ and $\sigma_3$, time $T_1$ between the first and second time points of distance measurement, and time $T_2$ between the second and third time points of distance measurement.

In the next step S36, a focusing drive ring of the photographing lens begins to be driven.

In the next step S37, it is judged whether or not the photographing lens is completely moved by the lens moving amount $\Delta$ provided in the above step S35. When this judgment is NO, it is returned to the step S36 and the photographing lens is continuously moved. In contrast to this, when the judgment in the step S37 is YES, the series of distance measurements, calculations, and movement of the photographing lens are sequentially completed and a shutter begins to be released in a step S38.

Accordingly, in this first embodiment, the picture element data are outputted before the phase difference data are calculated and provided at each of the first, second and third times (or time points). Namely, the first to third picture element data are outputted at the first time. The second picture element data are partially outputted at the second time. The first to third picture element data are outputted at the third time. When the phase difference data are calculated and provided, the first phase difference data are provided from the picture element data obtained at the first time in two regions opposed to each other with respect to the optical axis of the lens system. The second phase difference data are provided from the picture element data obtained at the second time in a region including this optical axis and a region having no optical axis. The third phase difference data are provided from the picture element data obtained at the third time in a region including this optical axis and a region having no optical axis. Accordingly, it is possible to reduce a time for outputting the picture element data and a time required to calculate the moving amount of the photographing lens.

Further, in this embodiment, a time point for completing the integral operation by the charge coupled device (CCD) is controlled in accordance with a light-receiving amount of the monitor photometric section. Accordingly, no accuracy in detection of a focusing state of the lens system is reduced in accordance with brightness of the photographed object.

Such monitor control is performed on the basis of an output of the monitor photometric section 30 disposed in the vicinity of the third photoelectric converting portion 19. Accordingly, the monitor control is accurately performed in a reference state in which no image is charged irrespective of a change in distance between the photographed object and the lens system. Namely, in this reference state, no image is changed irrespective of the distance between the photographed object and the lens system since a light beam in a region including the optical axis of the lens system about a light beam from the photographed object is monitored by the monitor photometric section 30.

Further, image data are corrected on the basis of the respective integral times $t_1$, $t_2$ and $t_3$ in the plural detections of these image data. Accordingly, the image data are in conformity with each other at correction time points thereof even when the photographed object is moved in a direction of the optical axis of the lens system or a direction perpendicular thereto and there is a great change in brightness of the photographed object in the plural detections of the image data. Accordingly, it is possible to accurately perform a distance measuring operation.

In the above-mentioned first embodiment of the present invention, the first to third series of data are obtained at three time points. A moving amount of the photographing lens is calculated on these data obtained at each of the three times (or time points). The photographing lens is moved by this moving amount to provide a focusing state thereof.

However, a defocusing amount may be calculated when the first to third series of data are obtained in the first detection of the focusing state. In this case, the second and third detections of the focusing state are performed after the photographing lens is moved toward a focusing point thereof in accordance with this defocusing amount. Then, the photographing lens is finally moved to the focusing point on the basis of the first to third series of data.

Such a structure constitutes the structure of a focusing state detector in accordance with a second embodiment of the present invention. A concrete example of this structure will next be described in detail with reference to FIGS. 11 to 16.

Figure 11:
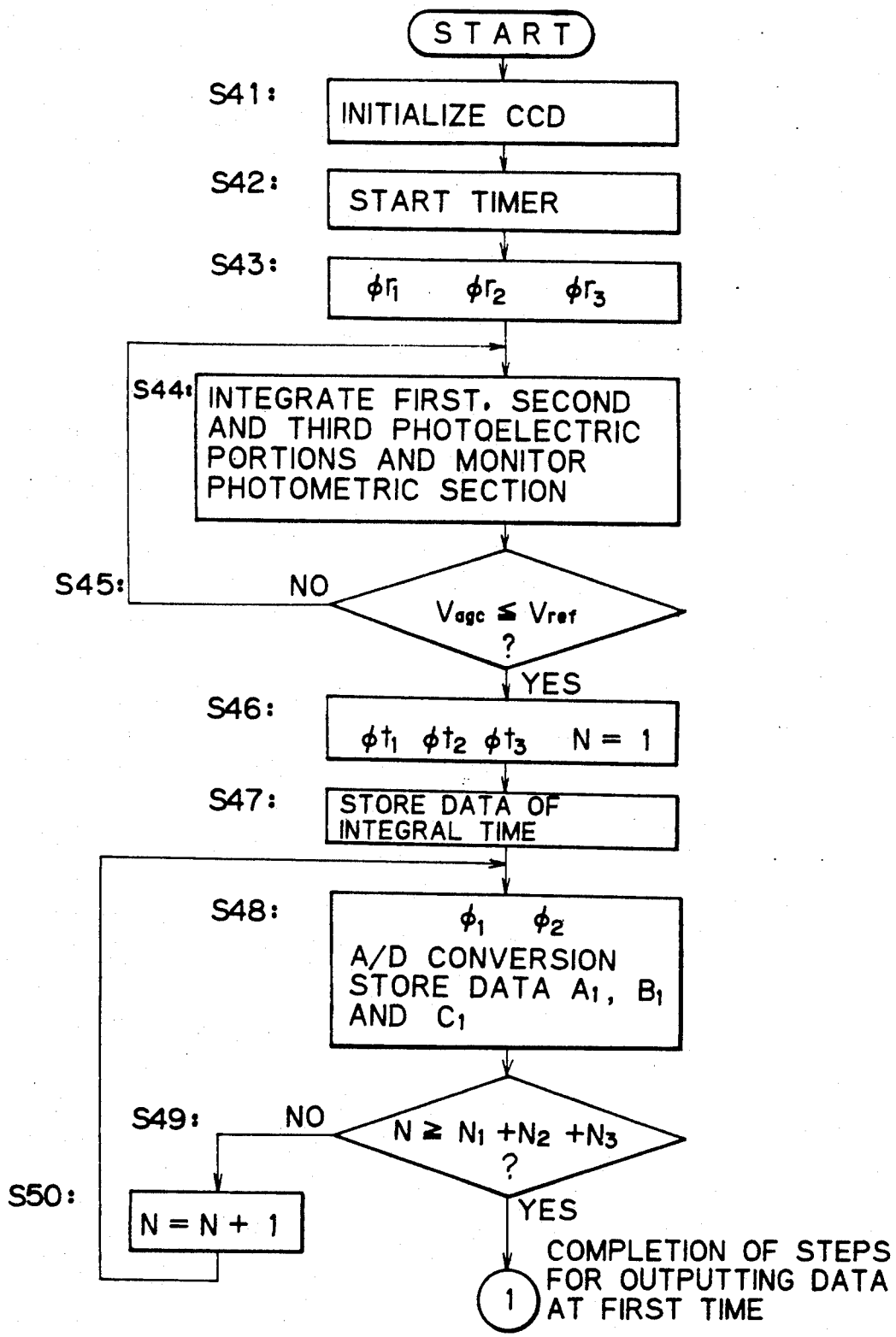
FIG. 11 is a flow chart for explaining the operation of a focusing state detector in accordance with a second embodiment of the present invention.

When sequential automatic focusing operations are started by pushing a shutter buttom down to the middle of the entire stroke of the shutter button, a charge coupled device (CCD) is initialized in a step S41 shown in FIG. 11. Namely, all data left in the shift register 26 are cleared in this step S41.

Figure 16:
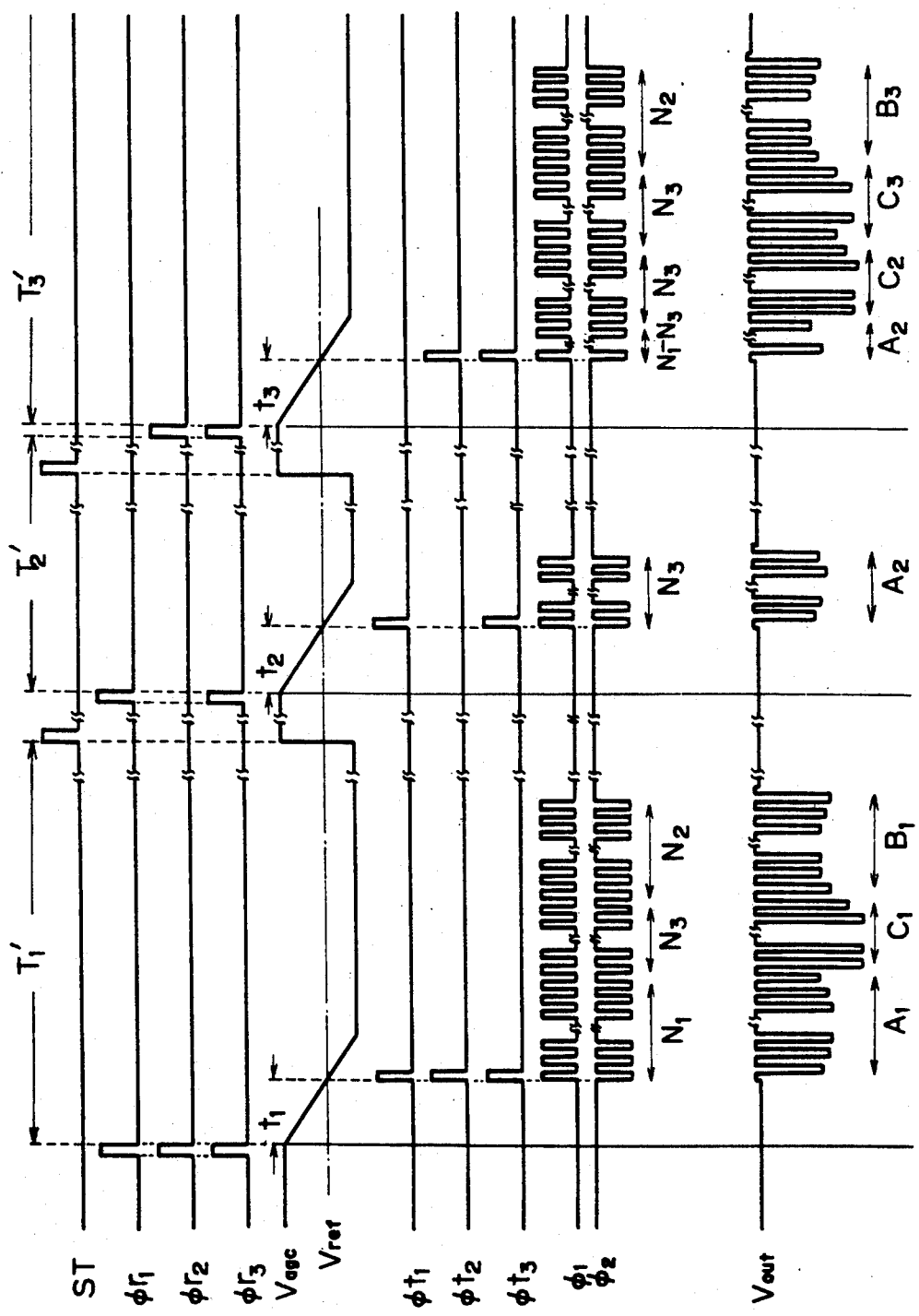
FIG. 16 is a waveform diagram of constructional portions for explaining an operation of the focusing state detector in the second embodiment of the present invention.

Subsequently, a timer is started in a step S42. In a step S43, first, second and third reset pulses $\phi r_1$, $\phi r_2$ and $\phi r_3$ rise so that voltage levels of these reset pulses are set to high voltage levels as shown in FIG. 16. Further, residual charges are cleared from the respective photoelectric converting elements of the first, second and third photoelectric converting portions 17, 18 and 19 through the first, second and third reset portions 20, 22 and 24.

In a step S44, the first, second and third reset pulses $\phi r_1$, $\phi r_2$ and $\phi r_3$ then fall so that voltage levels of these reset pulses are set to low voltage levels. Accordingly, an integral operation is started in each of the photoelectric converting portions 17 to 19. Thus, a charge is stored to each of the photoelectric converting elements of the first, second and third photoelectric converting portions 17 to 19 in accordance with a light intensity distribution of each of the above-mentioned three light beams.

Thereafter, in a step S45, an output voltage $V_{agc}$ of the monitor photometric section 30 is compared with a reference voltage $V_{ref}$. When the output voltage $V_{agc}$ is reduced and is lower than the reference voltage $V_{ref}$, it proceeds to a step S46. In the step S46, first, second and third shift pulses $\phi t_1$, $\phi t_2$ and $\phi t_3$ rise so that voltage levels of these shift pulses are set to high voltage levels. Further, the counting value N of a shift counter is set to one and it proceeds to the next step S47.

In the step S47, data of an integral time $t_1$ are stored to a RAM by an operation of the integral time memory means 41 and it proceeds to the next step S48.

In the step S48, a shift pulse $\phi_1$ rises so that a voltage level of this shift pulse is set to a high voltage level. In contrast to this, a shift pulse $\phi_2$ falls so that a voltage level of this shift pulse is set to a low voltage level. Thus, picture element data stored to each of the photoelectric converting elements of the first, second and third photoelectric converting portions 17, 18 and 19 are outputted by a data amount of one picture element as an output $V_{out}$ from the shift register 26. This output $V_{out}$ is A/D-converted and stored to a RAM as data of one picture element.

Such a storing operation is repeatedly performed until a number ($N_1 + N_2 + N_3$) provided by adding the number $N_1$ of picture elements in the first photoelectric converting portion 17, the number $N_2$ of picture elements in the second photoelectric converting portion 18, and the number $N_3$ of picture elements in the third photoelectric converting portion 19. In this embodiment, $N_1 = N_2 \geq N_3$ is set.

In a step S49, it is judged whether $N \geq (N_1 + N_2 + N_3)$ is formed or not every time the data of one picture element are stored to the RAM in the step S48. When this judgment is NO, it proceeds to a step S50 and an incremental operation is performed such that value one is added to the number N.

When the judgment in the step S49 is YES, the data of all picture elements are outputted from the shift register 26. In the series of steps shown in FIG. 11, these data are completely outputted at the first time (or at the first time point) and a series of steps for moving the photographing lens at the first time and shown in FIG. 12 is next started.

Figure 12:
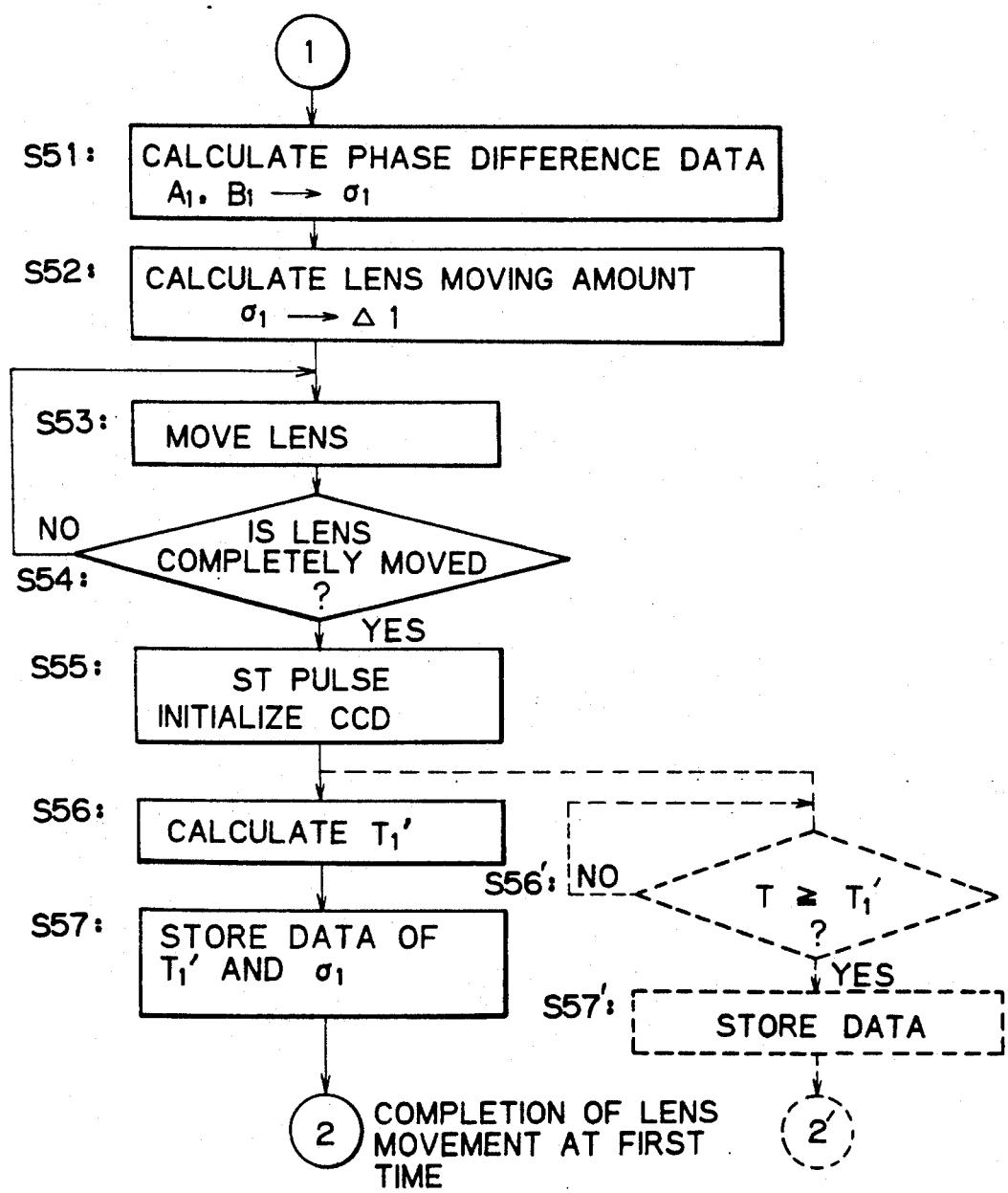
FIG. 12 is a flow chart showing steps subsequent to the flow chart shown in FIG. 11.

In a step S51 shown in FIG. 12, first phase difference data $\sigma_1$ are provided from the picture element data stored to the RAM and provided in the above step S48. These picture element data are constructed by a first series of data $A_1$ and a second series of data $B_1$.

In the next step S52, a moving amount $\Delta_1$ of the photographing lens is calculated on the basis of such calculated first phase difference data $\sigma_1$. Further, the photographing lens is moved in the next step S53.

In the step S54, it is judged whether or not the photographing lens is completely moved by the lens moving amount Δ1. When this judgment is NO, it is returned to the step S53 and the photographing lens is continuously moved. In contrast to this, when this judgment in the step S54 is YES, it proceeds to the next step S55. In this step S55, an ST pulse rises so that a voltage level of this pulse is set to a high voltage level. Further, similar to the above step S41, the charge coupled device (CCD) is initialized. In the next step S56, a time $T_1'$ from a starting time point of distance measurement to a completing time point of the movement of the photographing lens is measured.

In the next step S57, data of this time $T_1'$ and the first phase difference data $\sigma_1$ provided in the above step S51 are stored to a RAM. Thus, the series of steps for moving the photographing lens at the first time (or at the first time point) and shown in FIG. 12 is completely executed. Then, a series of steps for moving the photographing lens at a second time (or at a second time point) and shown in FIG. 13 is next started.

Figure 13:
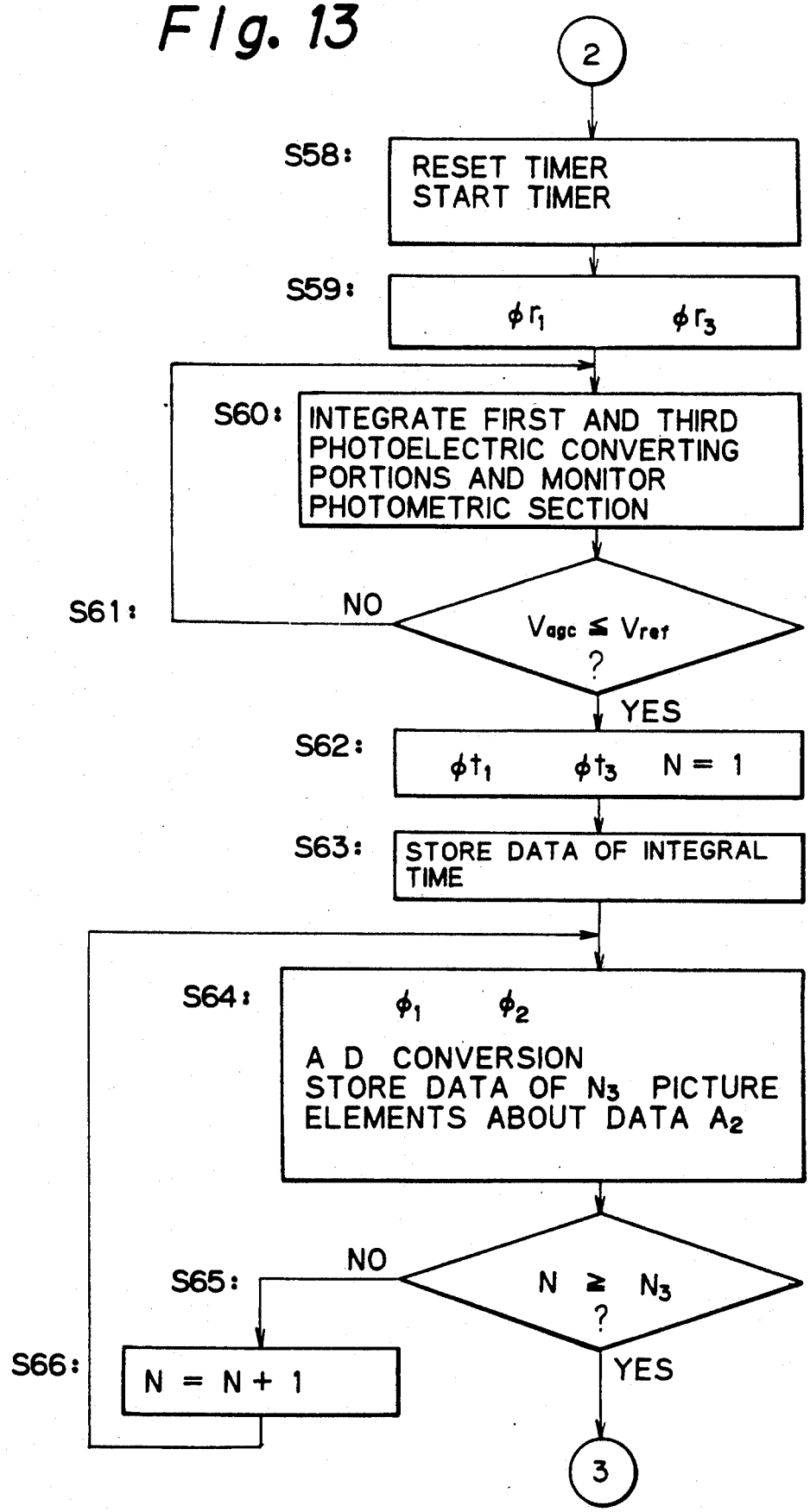
FIG. 13 is a flow chart showing steps subsequently to the flow chart shown in FIG. 12.

In a step S58 shown in FIG. 13, a timer is reset and started. In the next step S59, first and third reset pulses $\phi r_1$ and $\phi r_3$ rise so that voltage levels of these reset pulses are set to high voltage levels as shown in FIG. 16. Further, residual charges are cleared from the respective photoelectric converting elements of the first and third photoelectric converting portions 17 and 19 through the first and third reset portions 20 and 24.

In a step S60, the first and third reset pulses $\phi r_1$ and $\phi r_3$ fall so that voltage levels of these reset pulses are set to low voltage levels. Accordingly, an integral operation is started in each of the first and third photoelectric converting portions 17 and 19. Thus, a charge is stored to each of the photoelectric converting elements of the first and third photoelectric converting portions 17 and 19 in accordance with a light intensity distribution of each of the above-mentioned first and third light beams.

Thereafter, in a step S61, an output voltage $V_{agc}$ of the monitor photometric section 30 is compared with a reference voltage $V_{ref}$. When the output voltage $V_{agc}$ is reduced and is lower than the reference voltage $V_{ref}$, it proceeds to a step S62. In the step S62, first and third shift pulses $\phi t_1$ and $\phi t_3$ respectively rise through the first and third shifting portions 21 and 25 so that voltage levels of these shift pulses are set to high voltage levels. Further, the counting value N of a shift counter is set to one and it proceeds to the next step S63.

In the step S63, data of an integral time $t_2$ at the second time (or at the second time point) are stored to a RAM by an operation of the integral time memory means 41. This integral time $t_2$ at the second time is a time from a fall time point of the first reset pulse $\phi r_1$ at the low voltage level thereof to a rise time point of the first shift pulse $\phi t_1$ at the high voltage level thereof. Then, it proceeds to the next step S64. In this embodiment, no integral time $t_1$ at the first time is used as data.

In the step S64, the shift pulse $\phi_1$ rises so that a voltage level of this shift pulse is set to a high voltage level. In contrast to this, the shift pulse $\phi_2$ falls so that a voltage level of this shift pulse is set to a low voltage level. Thus, picture element data stored to each of the photoelectric converting elements of the first and third photoelectric converting portions 17 and 19 are outputted by a data amount of one picture element as an output $V_{out}$ from the shift register 26. This output $V_{out}$ is A/D-converted and stored to a RAM as data of one picture element.

Such a storing operation is repeatedly performed until the number $N_3$ of picture elements in the third photoelectric converting portion 19. Namely, it is judged in a step S65 whether $N \geq N_3$ is formed or not every time the data of one picture element are stored to the RAM in the step S64. When this judgment is NO, it proceeds to a step S66 and an incremental operation is performed such that value one is added to the number N.

When the judgment in the step S65 is YES, the data of $N_3$ picture elements in the third photoelectric converting portion 19 are outputted from the shift register 26. Thus, the data at the second time are outputted and the series of steps shown in FIG. 13 is completely executed. Then, a series of steps for outputting data at a third time (or a third time point) and shown in FIG. 14 is started and it proceeds to a step S67.

Figure 14:
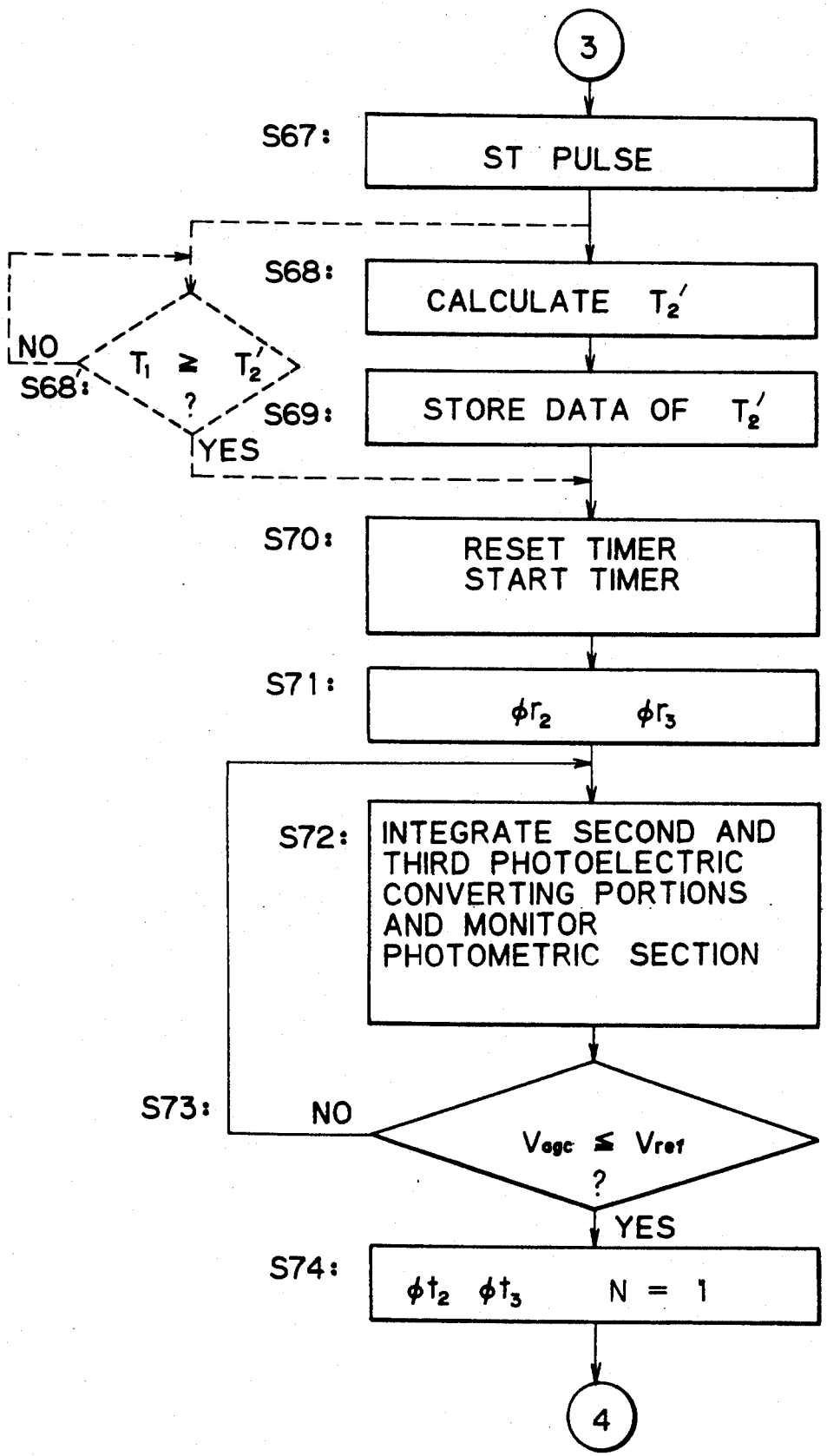
FIG. 14 is a flow chart showing steps subsequent to the flow chart shown in FIG. 13.

In the step S67 shown in FIG. 14, an ST pulse rises so that a voltage level of this pulse is set to a high voltage level. Further, the monitor photometric section 30 is charged until a voltage level of this monitor photometric section 30 is equal to a predetermined voltage level, thereby attaining a standby state thereof.

In the next step S68, a time $T_2'$ from a starting time point of the above data output at the second time to a starting time point of the data output at the third time is measured by the timer started in the above step S58. This starting time point of the above data output at the second time is a time point at which the reset pulses $\phi r_1$ and $\phi r_3$ fall so that voltage levels of these reset pulses are set to low voltage levels. The starting time point of the data output at the third time is a time point at which the reset pulses $\phi r_2$ and $\phi r_3$ rise so that voltage levels of these reset pulses are set to high voltage levels. Data of this time $T_2'$ are stored to a RAM in the next step S69 and the timer is reset and started in a step S70.

Simultaneously, it proceeds to a step S71 and the second and third reset pulses $\phi r_2$ and $\phi r_3$ rise so that voltage levels of these reset pulses are set to high voltage levels. Thus, in a step S72, a charge begins to be stored to each of the photoelectric converting elements of the second and third photoelectric converting portions 18 and 19 and the monitor photometric section 30.

Thereafter, in a step S73, an output voltage $V_{agc}$ of the monitor photometric section 30 is compared with a reference voltage $V_{ref}$. When the output voltage $V_{agc}$ is reduced and is lower than the reference voltage $V_{ref}$, it proceeds to a step S74. In the step S74, the second and third shift pulses $\phi t_2$ and $\phi t_3$ rise so that voltage levels of these shift pulses are set to high voltage levels. Further, the counting value N of a shift counter is set to one. Thus, the series of steps shown in FIG. 14 is completely executed and a series of steps shown in FIG. 15 is next started.

Figure 15:
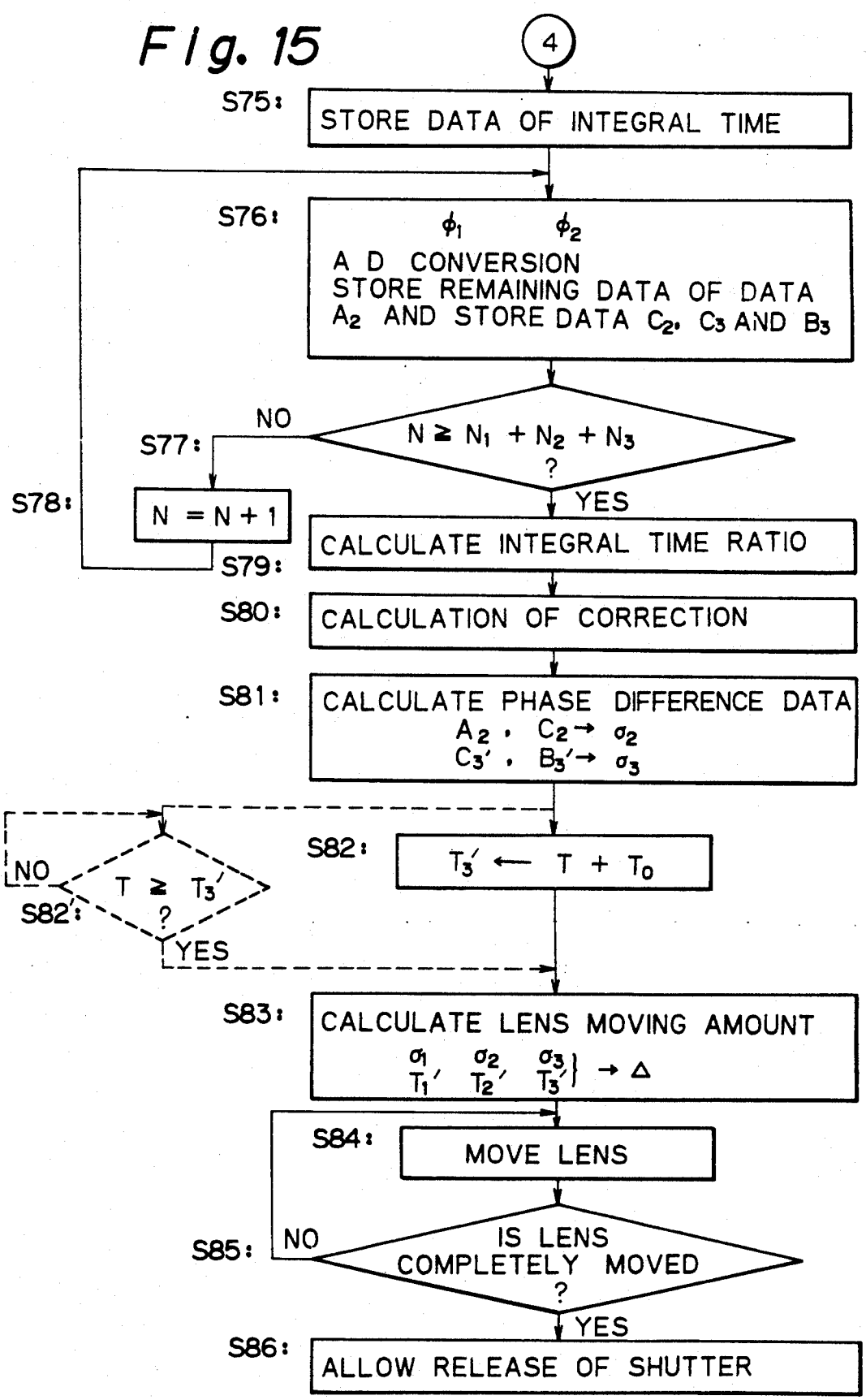
FIG. 15 is a flow chart showing steps subsequent to the flow chart shown in FIG. 14.

In a step S75 shown in FIG. 15, similar to the integral time $t_2$ at the second time obtained in the above step S63, the data of an integral time $t_3$ at the third time (or at the third time point) are stored to a RAM and it proceeds to the next step S76.

In the step S76, the shift pulse $\phi_1$ rises so that a voltage level of this shift pulse is set to a high voltage level. In contrast to this, the shift pulse $\phi_2$ falls so that a voltage level of this shift pulse is set to a low voltage level.

Thus, picture element data stored to each of the photoelectric converting elements of the second and third photoelectric converting portions 18 and 19 are outputted by one clock data amount (a data amount of one picture element) as an output $V_{out}$ from the shift register 26. This output $V_{out}$ is A/D-converted and is stored to a RAM as data of one picture element.

Such a storing operation is performed until data of $(N_1 - N_3)$ picture elements in the second photoelectric converting portion 18, data $C_2$ and $C_3$ obtained at the second and third times, and data $B_3$ obtained at the third time are completely shifted.

Namely, it is judged in a step S77 whether $N \geq (N_1 + N_2 + N_3)$ is formed or not every time the data of one picture element are stored to the RAM in the step S76. When this judgment is NO, it proceeds to a step S78 and an incremental operation is performed such that value one is added to the number N. In contrast to this, when the judgment in the step S77 is YES, all the data are stored to the RAM and it proceeds to the next step S79.

In the step S79, the correction coefficient calculating means 42 calculates an integral time ratio $t_2/t_3$ as a correction coefficient with respect to the integral times $t_2$ and $t_3$ obtained in the above steps S63 and S76. In the next step S80, the correction calculating means 43 corrects the second series of data $B_3$ and the third series of data $C_3$ already obtained as image data at the third time by using the integral time ratio $t_2/t_3$. Thus, the correction calculating means 43 provides a second series of data $B_3'$ and a third series of data $C_3'$ as corrected image data. Then, it proceeds to the next step S81.

In the step S81, second phase difference data $\sigma_2$ are provided from the data $A_2$ and $C_2$ stored to the RAM in the above step S76. Further, third phase difference data $\sigma_3$ are provided from the corrected data $C_3'$ and $B_3'$ provided in the above step S80.

In the next step S82, the releasing time of a shutter is added to an elapsed time of the timer started in the above step S70. This releasing time is a time $T_0$ required for calculations, upward movement of a mirror, diaphragm, etc. from a time point of the complete execution of the step S81. The added time is provided as time $T_3'$ and it proceeds to the next step S83.

In the step S83, a moving amount $\Delta$ of the photographing lens is calculated on the basis of a total of six kinds of data composed of the first phase difference data $\sigma_1$ provided in the above step S51, the second and third phase difference data $\sigma_2$ and $\sigma_3$ provided in the step S81, and the times $T_1'$, $T_2'$ and $T_3'$ respectively calculated in the steps S56, S68 and S82.

For example, this lens moving amount $\Delta$ is set in accordance with the number of driving pulses of a photo-interrupter operated in association with the rotation of a focusing drive ring. In a step S84, the photographing lens is moved in accordance with this number of drive pulses. In a step S85, it is judged whether or not the number of driving pulses has reached a set pulse number. In other words, it is judged whether the subtracting value of a subtracting counter is equal to zero or not. When this judgment in the step S85 is YES, the photographing lens is completely moved by the lens moving amount $\Delta$ so that it proceeds to the next step S86. In the step S86, the shutter can be released to provide a suitable exposure.

In the above second embodiment, the times $T_1'$, $T_2'$ and $T_3'$ are respectively provided in the steps S56, S68 and S82 shown in FIGS. 12, 14 and 15 and showing the series of sequential automatic focusing operations. These times $T_1'$, $T_2'$ and $T_3'$ are not set to fixed values, but are values read from timer circuits. However, these times $T_1'$, $T_2'$ and $T_3'$ may be set to values experientially determined on the basis of many real photographing data of the photographed object. In this case, the flow charts shown in FIGS. 12, 14 and 15 are partially replaced with those shown by broken lines.

Namely, the steps S56 and S57 shown by solid lines are replaced with steps S56' and S57' shown by broken lines. Similarly, the two steps S68 and S69 are replaced with a step S68' and the step S82 is replaced with a step S82'. In the other portions of the flow charts, operations similar to the above-mentioned operations are performed.

Accordingly, after the respective photoelectric converting portions 17 to 19 are initialized in the step S55, it is judged whether or not the present time has reached the time $T_1'$ in the step S56'. When this judgment is YES, the first phase difference data $\sigma_1$ provided in the above step S51 are stored to the RAM and operations similar to the above-mentioned operations are performed until the step S67.

In the step S67, the ST pulse rises so that a voltage level of this pulse is set to a high voltage level. Next, it is judged whether or not the present time has reached the time $T_2'$ in the step S68'. When this judgment is YES, it proceeds to the step S70 and the timer is reset and is simultaneously started.

Further, operations similar to the above-mentioned operations are performed until the step S81. In the step S81, the second and third phase difference data $\sigma_2$ and $\sigma_3$ are provided. In the next step S82', it is judged whether or not the present time T has reached the time $T_3'$. When this judgment is YES, it proceeds to the next step S83 and a moving amount of the photographing lens is calculated. Thereafter, operations similar to the above-mentioned operations are performed.

In this embodiment, when the photographing lens is finally moved to perform a focusing operation thereof, the photographing lens is first moved to a focusing point in a first distance measurement. The photographing lens is again moved in second and third distance measurements so that it is possible to reduce a total of focusing times for moving the photographing lens.

Further, with respect to picture element data outputted in advance before the output of phase difference data at the first to third times (or time points), first to third picture element data are outputted at the first time. Second picture element data are partially outputted at the second time. The remaining second picture element data and the first and third picture element data are outputted at the third time. Accordingly, it is possible to reduce a time for outputting the picture element data. Further, image data are corrected by detecting and controlling an integral time by monitor control so that the image data are in conformity with each other.

In the above first and second embodiments, the image data at the present time are corrected by an integral time ratio at the preceding time. However, the image data at the preceding time may be corrected by the integral time ratio at the present time.

As shown in each of the above embodiments, the correction coefficient for correcting the image data is set to the integral time ratio. However, this correction coefficient may be constructed by data corresponding to each of integral times obtained in a plurality of detections of a focusing state of the lens system. Namely, the image data are corrected in accordance with the following formulas using a correction coefficient $\beta$.

$$Aj' = Aj \times \beta$$

$$\beta = K/ti$$

In these formulas, Aj designates image data in an address j.

Aj' designates corrected image data in the address j.
Reference numeral K designates a constant.
Reference numeral ti designates an integral time.

In the respective embodiments mentioned above, the monitor photometric section is arranged in the vicinity of the third photoelectric converting portion. However, the monitor photometric section is not necessarily arranged in the vicinity of the third photoelectric converting portion. For example, the monitor photometric section may be arranged in the vicinity of the first or second photoelectric converting portion.

A focusing state detector having a fourth structure in accordance with a third embodiment of the present invention will next be described in detail with reference to FIG. 17, etc.

Figure 17:
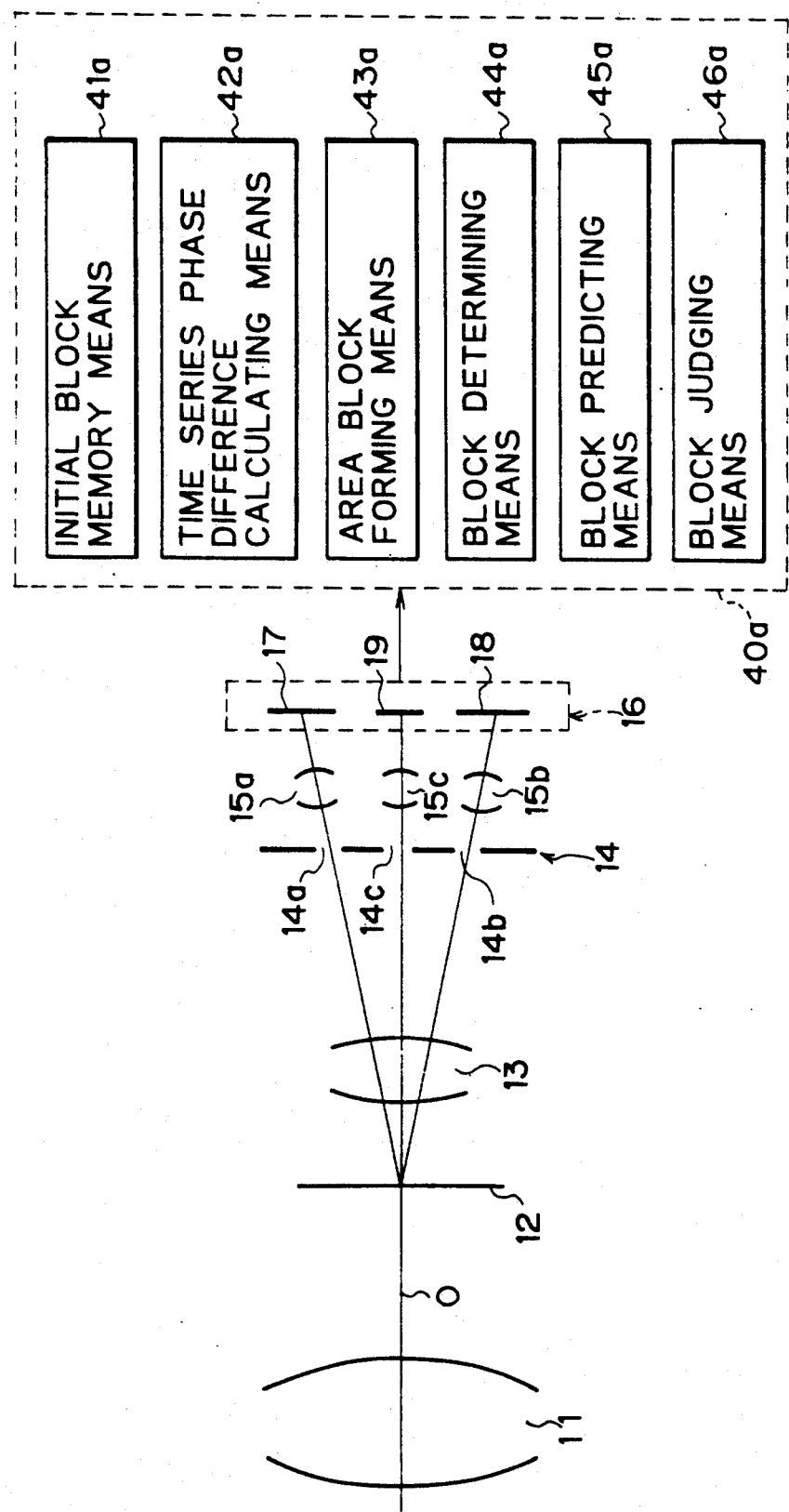
FIG. 17 is a schematic view showing the construction of a focusing state detector in accordance with a third embodiment of the present invention different from the first and second embodiments thereof respectively shown in FIGS. 3 and 11.

FIG. 17 is a view of the optical path of a lens system showing a basic construction of the focusing state detector in the third embodiment of the present invention. A predetermined image-forming face 12 is located in a position equivalent to that of an unillustrated film face located backward from a photographing lens 11. First to third coverting optical systems are arranged backward from the predetermined image-forming face 12.

In this third embodiment, constructional portions 13 to 19 including a condenser lens 13 and a third photoelectric converting portion 19 are similar to those in the first embodiment shown in FIG. 3. Therefore, an explanation about these constructional portions 13 to 19 is omitted in the following description.

An output of a photoelectric converting section 16 is transmitted to an arithmetic means 40a.

This arithmetic means 40a is basically constructed by six means composed of an initial block memory means 41a, a time series phase difference calculating means 42a, an area block forming means 43a, a block determining means 44a, a block predicting means 45a, and a block judging means 46a.

The initial block memory means 41a stores third image data corresponding to addresses in a block set in advance within a plurality of picture elements in the third photoelectric converting portion 19. In this third embodiment, the plurality of picture elements are constructed by 24 picture elements.

The time series phase difference calculating means 42a divides the third image data obtained by the third photoelectric converting portion 19 at the preceding or present time into a plurality of small blocks composed of e.g., eight picture elements within the 24 picture elements forming the third image data. The time series phase difference calculating means 42a shifts each of the plurality of small blocks in a picture element unit with respect to the third image data obtained at the present or preceding time. Then, the time series phase difference calculating means 42a compares these shifted data blocks with each other to calculate a changing amount of a phase difference.

The area block forming means 43a reforms or re-blocks the small blocks of picture elements based on the changing amount of a phase difference every small block obtained by the above time series phase difference calculating means 42a.

The block determining means 44a selects one of the blocks of picture elements reblocked by the above area block forming means 43a and used as phase difference data for detecting a focusing state of the lens system.

The block predicting means 45a predicts a block of picture elements at the next time on the basis of the blocks of picture elements determined by the above block determining means 44a at the preceding and present times.

The block judging means 46a judges whether or not a reference block of picture elements used at the present time is obtained from any one of the above initial block memory means 41a, the above block determining means 44a and the above block predicting means 45a.

Concrete electric circuits constituting the above photoelectric converting section 16 have first to third photoelectric converting portions 17 to 19 as shown in FIG. 4. For example, each of the first to third photoelectric converting portions 17 to 19 is formed as a so-called CCD light-receiving portion having small photoelectric converting elements of a charge storing type arranged in line and constructed by a plurality of picture elements arranged in line. For example, each of the first and second photoelectric converting portions 17 and 18 is formed by 48 picture elements and the third photoelectric converting portion 19 is formed by 24 picture elements.

Concrete construction and operation of the photoelectric converting section 16 are similar to those described in detail with reference to FIG. 4 and an explanation thereof is therefore omitted in the following description.

The schematic construction of a focusing state detector having fifth and sixth structures in accordance with a fourth embodiment of the present invention will next be described briefly with reference to FIG. 18.

Figure 18:
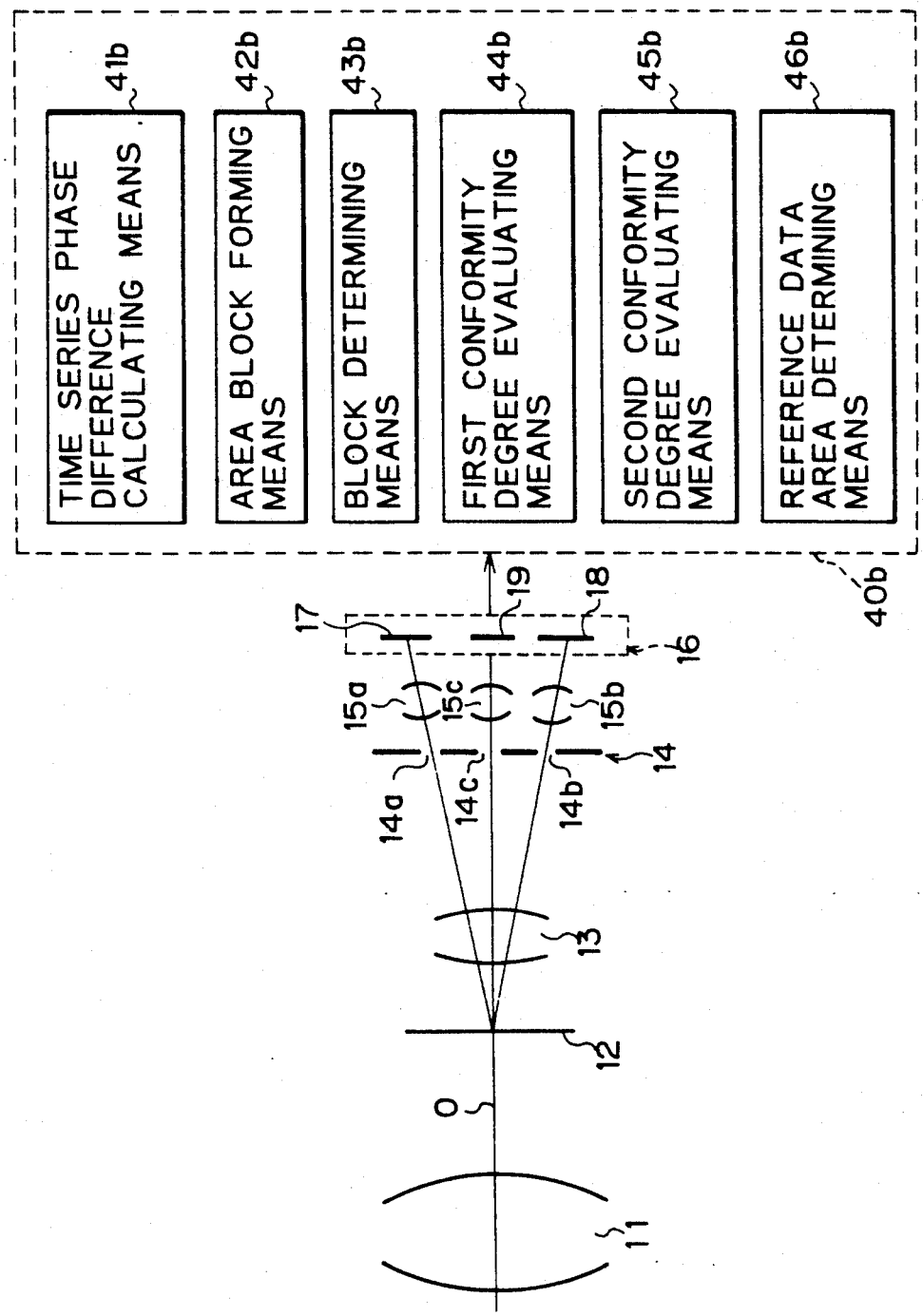
FIG. 18 is a schematic view showing the construction of a focusing state detector in accordance with a fourth embodiment of the present invention different from the first, second and third embodiments thereof respectively shown in FIGS. 3, 11 and 17.

FIG. 18 is a view of the optical path of a lens system showing a basic construction of the focusing state detector having the fifth and sixth structures in the fourth embodiment of the present invention. A predetermined image-forming face 12 is located in a position equivalent to that of an unillustrated film face located backward from a photographing lens 11. First to third converting optical systems are arranged backward from the predetermined image-forming face 12.

In this fourth embodiment, constructional portions 13 to 19 including a condenser lens 13 and a third photoelectric converting portion 19 are similar to those in the first embodiment shown in FIG. 3. Therefore, an explanation about these constructional portions 13 to 19 is omitted in the following description.

An output of a photoelectric converting section 16 is transmitted to an arithmetic means 40b.

This arithmetic means 40b is basically constructed by six means composed of a time series phase difference calculating means 41b, an area block forming means 42b, a block determining means 43b, first and second conformity degree evaluating means 44b and 45b, and a reference data area determining means 46b.

The time series phase difference calculating means 41b divides third image data obtained by using the third photoelectric converting portion 19 at the preceding or present time into a plurality of small blocks composed of e.g., eight picture elements within 24 picture elements forming the third image data. The time series phase difference calculating means 41b shifts each of the plurality of small blocks in a picture element unit with respect to the third image data obtained at the present or preceding time. Then, the time series phase difference calculating means 41b compares these shifted data blocks with each other to calculate a changing amount of a phase difference.

The area block forming means 42b reforms or re-blocks the small blocks of picture elements based on the changing amount of a phase difference every small block obtained by the above time series phase difference calculating means 41b.

The block determining means 43b selects one of the blocks of picture elements reblocked by the above area block forming means 42b and used as phase difference data for detecting a focusing state of the lens system. The block determining means 43b is constructed by a weighting means for weighting each of the blocks of picture elements and a judging means for judging any one of the weighted blocks of picture elements to be selected.

The first conformity degree evaluating means 44b shifts first or second image data in a picture element unit with respect to a block of picture elements determined by the above block determining means 43b at the present time. Then, the first conformity degree evaluating means 44b evaluates a conformity degree of the first and second image data with respect to this block.

The reference data area determining means 46b determines an area of the first or second image data evaluated as a highest conformity degree by the above first conformity degree evaluating means 44b and sets this area to a reference data area.

The second conformity degree evaluating means 45b shifts reference data of the first or second image data in the reference data area determined by the above reference data area determining means 46b. Concretely, the second conformity degree evaluating means 45b shifts these reference data in a picture element unit with respect to the second or first image data. The second conformity degree evaluating means 45b then evaluates a conformity degree of the second or first image data with respect to the reference data of the first or second image data.

Concrete electric circuits constituting the above photoelectric converting section 16 are similar to those shown in FIG. 4 and an explanation about the construction of these electric circuits is therefore omitted in the following description.

Operations of the focusing state detectors having the fourth to sixth structures in the third and fourth embodiments of the present invention shown in FIGS. 17 and 18 will next be described in detail with reference to FIGS. 19 to 40.

When sequential automatic focusing operations are started by pushing a shutter button until a half pushing state, etc., electric circuits constituting the focusing state detector are respectively initialized in a step P0 shown in FIG. 19. Thereafter, it proceeds to a step P1. In the step P1, it is judged whether the number Mno of detections of distance measurement is equal to one or not. Namely, it is judged whether it is a first detection of distance measurement or not. When this judgement is YES, it proceeds to the next step P2.

In the step P2, first, second and third image data obtained in the first detection of distance measurement are stored to a memory device. FIG. 20 is a flow chart showing detailed processings in this step P2.

In a step S1 shown in FIG. 20, a charge coupled device (CCD) is initialized so that all data left in the shift register 26 are cleared. Subsequently, a timer is started in a step S2. In a step S3, first, second and third reset pulses $\phi r_1$, $\phi r_2$ and $\phi_3$ rise so that voltage levels of these reset pulses are set to high voltage levels as shown in FIG. 9. Further, residual charges are cleared from the respective photoelectric converting elements of the first, second and third photoelectric converting portions 17, 18 and 19 through the first, second and third reset portions 20, 22 and 24.

In a step S4, the first, second and third reset pulses $\phi r_1$, $\phi r_2$ and $\phi_3$ fall so that voltage levels of these reset pulses are set to low voltage levels. Accordingly, an integral operation is started in each of the photoelectric converting portions 17 to 19. Thus, a charge is stored to each of the photoelectric converting elements of the first, second and third photoelectric converting portions 17, 18 and 19 in accordance with a light intensity distribution of each of the above-mentioned three light beams.

Thereafter, in a step S5, an output voltage $V_{agc}$ of the monitor photometric section 30 is compared with a reference voltage $V_{ref}$. When the output voltage $V_{agc}$ is reduced and is lower than the reference voltage $V_{ref}$, it proceeds to a step S6. In the step S6, first, second and third shift pulses $\phi t_1$, $\phi t_2$ and $\phi t_3$ rise so that voltage levels of these shift pulses are set to high voltage levels. Then, it proceeds to a step S7. In this step S7, the counting value N of a shift counter is set to one and it proceeds to the next step S8.

In the step S8, a shift pulse $\phi_1$ rises so that a voltage level of this shift pulse is set to a high voltage level. Further, a shift pulse $\phi_2$ falls so that a voltage level of this shift pulse is set to a low voltage level. Thus, picture element data stored to each of the photoelectric converting elements of the first, second and third photoelectric converting portions 17, 18 and 19 are outputted by one clock data amount (a data amount of one picture element) as an output $V_{out}$ from the shift register 26. This output $V_{out}$ is A/D-converted by an unillustrated A/D converting circuit and is stored to an unillustrated RAM forming the memory means 41 as data of one picture element.

Such a storing operation is repeatedly performed until a predetermined number equal to or greater than a total number of picture elements. Concretely, such a storing operation is repeatedly performed until a number $(N_1+N_2+N_3)$ provided by adding the number $N_1$ of picture elements in the first photoelectric converting portion 17, the number $N_2$ of picture elements in the second photoelectric converting portion 18, and the number $N_3$ of picture elements in the third photoelectric converting portion 19. In this embodiment, $N_1=N_2>N_3$ is set. Concretely, as mentioned above, $N_1=N_2=48$ and $N_3=24$ are set.

In this embodiment, the shift register 26 has a capacity equivalent to the total number $N_1+N_2+N_3$ of picture elements as shown by reference numeral a in FIG. 10. Accordingly, a transfer operation of data in the step S6 is performed as shown by reference numeral b in FIG. 10.

In a step S9, it is judged whether $N \geq (N_1+N_2+N_3)$ is formed or not every time the data of one picture element are stored to the RAM in the step S8. When this judgment is NO, it proceeds to a step S10 and an incremental operation is performed such that value one is added to the number N.

When the judgment is YES in the step S9, data of the total number of picture elements are outputted from the shift register 26 in the order of first image data $A_1$ at a first time (i.e., in the first detection of distance measurement), third image data $C_1$ at the first time, and second image data $B_1$ at the first time as shown by reference numeral c in FIG. 10. Thus, these data at the first time are completely stored to the RAM and and it proceeds to a step P3 shown in FIG. 19.

In the step P3, the operation of the timer is stopped so that a set time T of this timer is set to $T_L$ and is further set to $T_{LL}$. In the next step P4, the timer is started and it proceeds to the next step P5.

In the step P5, it is judged whether the number Mno indicative of the number of detections of the stored data is equal to one or not. In other words, it is judged whether it is a first detection of the stored data or not. When this judgment is YES, it proceeds to the next step P6 for setting addresses in a reference area with respect to the third image data.

Figure 22:
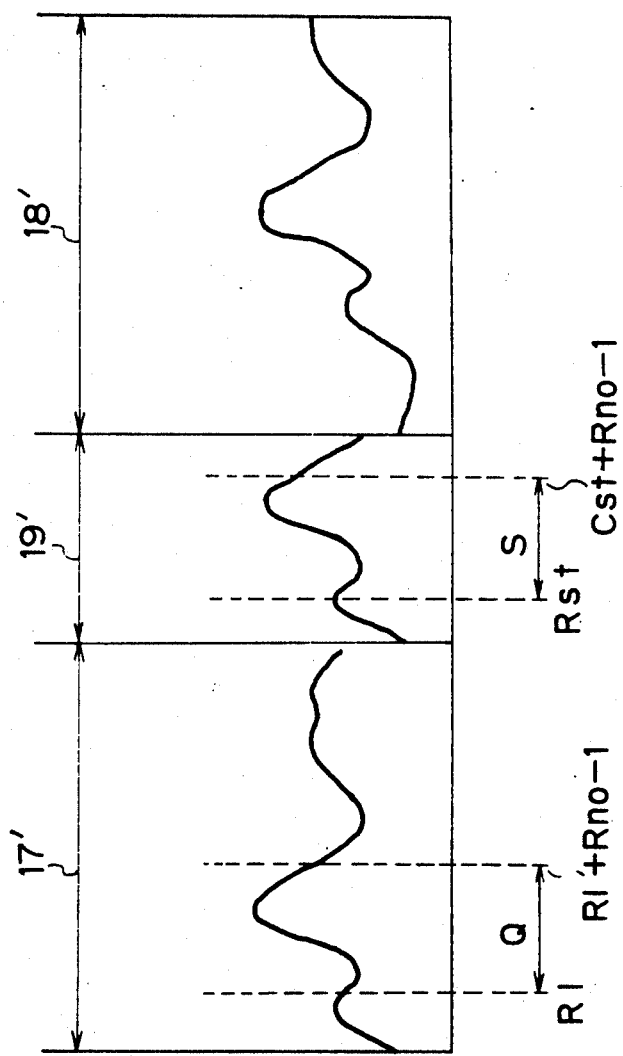
FIG. 22 is a waveform diagram for explaining the operation of the focusing state detector in accordance with the flow chart shown in FIG. 21.

In this embodiment, a first address Cst in a data block of the third image data is set to one and the number Rno of picture elements is set to 24. With respect to position relation of the third image data, as shown in FIG. 22, a data block S is located within an output area 19' of the third image data. Accordingly, a head address in the data block S is set to Cst and a final address in the data block S is set to Cst+Rno−1. These address data are stored to a RAM as information of the data block S and it proceeds to the next step P7.

Figure 21:
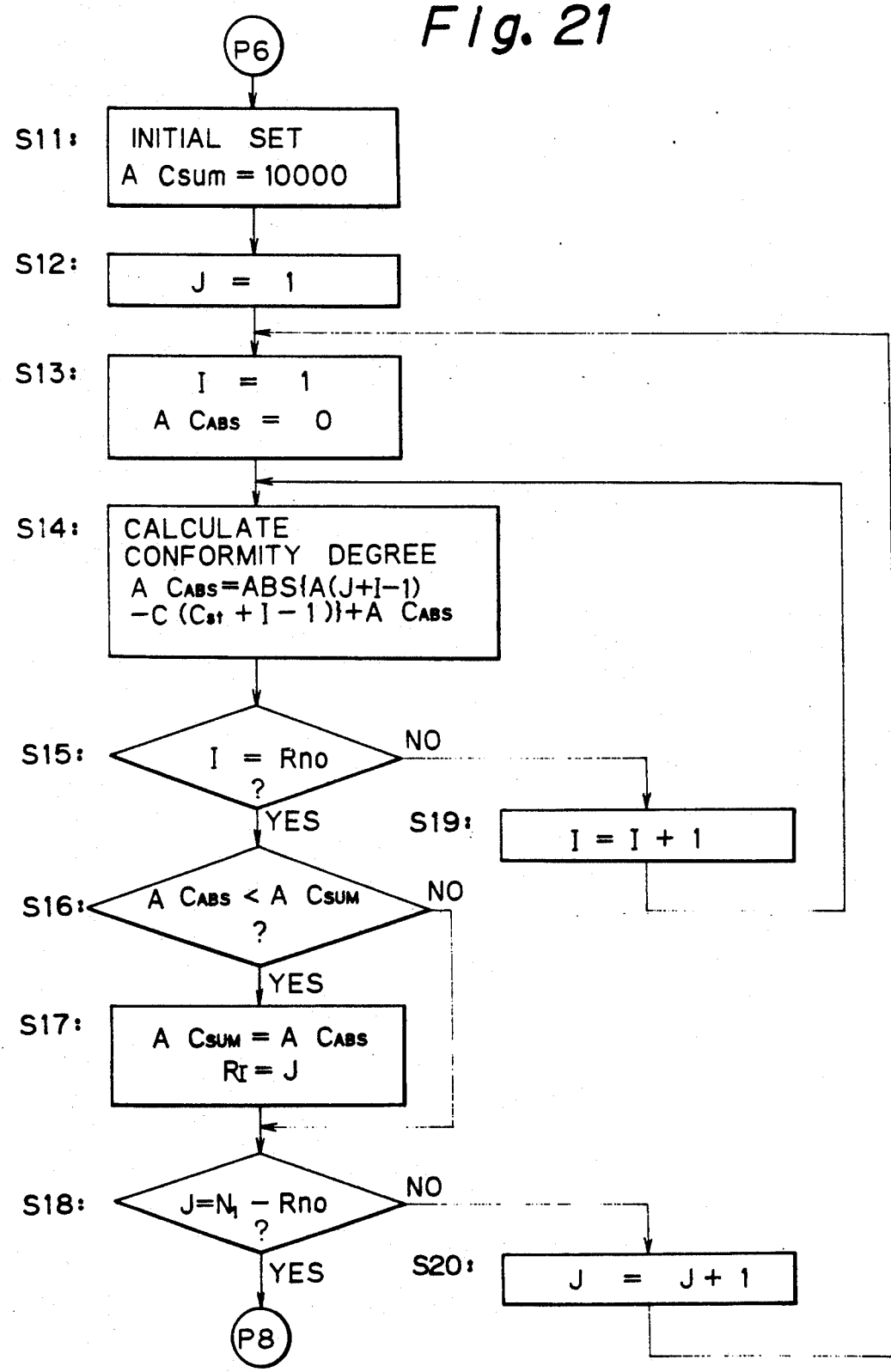
FIG. 21 is a flow chart showing a step P7 in detail in the flow chart shown in FIG. 19.

The step P7 is a step for determining the reference area of a first series of data composed of the first image data with respect to a third series of data composed of the third image data. FIG. 21 shows a flow chart of a subroutine of detailed processings in this step P7.

In a step S11 of the subroutine forming the step P7, a total number ACsum of picture elements with respect to the first and third image data is set to an arbitrary number equal to or greater than the number of all picture elements. For example, the total number ACsum is set to 10000. With respect to the position relation of the third image data, as shown in FIG. 22, the data block S is located within the output area 19' of the third image data. Accordingly, a head address in the data block S is set to Cst and a final address in the data block S is set to Cst+Rno−1.

In the next step S12, the number J of small blocks of picture elements described in detail later is initially set to one. In the next step S13, the number I of shifts of the data block is set to one and a difference $AC_{ABS}$ in address number between the first and third image data is set to zero. Then, it proceeds to the next step S14.

The step S14 is a step for providing a conformity degree of the data block S obtained above and the first image data by shifting the data block S in one picture element unit within the first image data. In this step S14, the following calculation is made.

$$AC_{ABS} = ABS\{A(J+I-1) - C(Cst+I-1)\} + AC_{ABS}$$

It proceeds to the next step S15 when the data block S is shifted in one picture element unit. In the step S15, it is judged whether or not the shifting number I is equal to the number Rno of picture elements in the data block S. When this judgment is NO, it proceeds to a step S19. In the step S19, an incremental operation is performed such that value one is added to the shifting number I and it is returned to the step S14. In contrast to this, when the judgment in the step S15 is YES, the shifting number I for providing the conformity degree is equal to the number Rno of picture elements in the data block S and it proceeds to the next step S16.

In the step S16, it is judged whether $AC_{ABS} = AC_{sum}$ and RI=J are formed or not. RI is described in detail later. When this judgment is YES, address data indicative of $AC_{sum} = AC_{ABS}$ and RI=J are stored to a RAM in a step S17.

In contrast to this, when the judgment in the step S16 is NO, it proceeds to a step S18 without executing the step S17. In the step S18, it is judged whether or not a difference between the number $N_1$ of picture elements in the first photoelectric converting means 17 and the number Rno of picture elements in the data block S is equal to the number J of small blocks. When this judgment is NO, no shifting operation of the data block is completely performed so that it proceeds to a step S20. In the step S20, an incremental operation is performed such that value one is added to the number J of small blocks. Then, it is returned to the above step S13 and the above-mentioned operations from the step S13 to the step S17 are performed again.

In contrast to this, when the judgment in the step S18 is YES, the shifting operation of the data block is completely performed. Accordingly, the step P7 shown in FIG. 19 is completely executed so that the reference area for detecting a phase difference is determined. Therefore, as shown in FIG. 22, a reference data area Q is located in an output area 17' of the first image data and head and final addresses in the reference data area Q are respectively set to RI and RI+Rno−1. Then, it proceeds to the next step P8.

Figure 23:
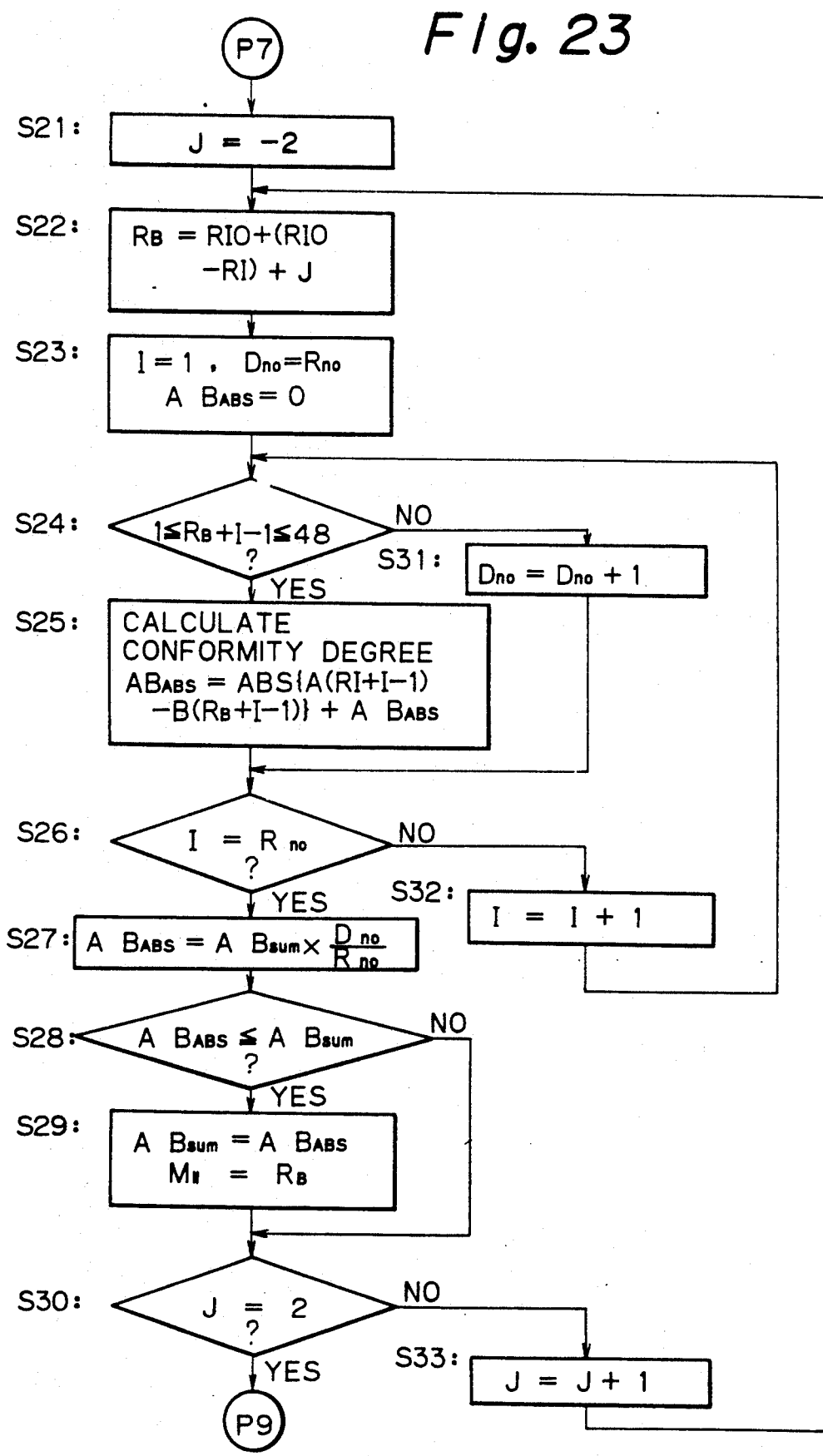
FIG. 23 is a flow chart showing a step P8 in detail in the flow chart shown in FIG. 19.

The step P8 is a step for calculating a conformity degree of first and second series of data composed of the first and second image data. FIG. 23 shows a flow chart of a series of detailed processings in the step P8.

In a step S21 shown in FIG. 23, the number J of small blocks is set to −2.

The number J of small blocks is set to −2 for the following reasons.

Figure 24:
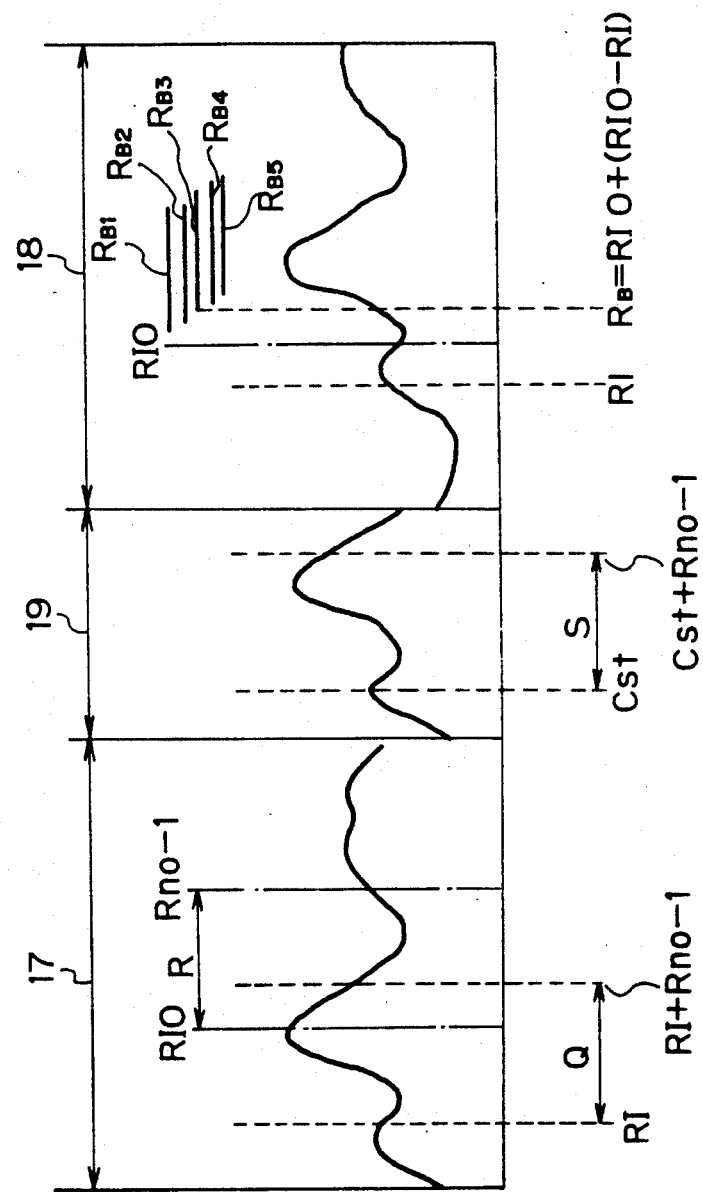
FIG. 24 is a waveform diagram for explaining the operation of the focusing state detector in accordance with the flow chart shown in FIG. 23.

As shown in FIG. 24, a data block S ranged from a head address Cst to a final address Cst+Rno−1 is located within an output area 19' of the third image data. A reference data area Q ranged from a head address RI and a final address RI+Rno−1 is located within an output area 17' of the first image data. The reference data area Q is determined as mentioned above in conformity with the data block S so that it is possible to naturally provide a shifting area for detecting the conformity degree in an output area 18' of the second image data.

Namely, at the time of a focusing operation, a reference data area R at the focusing time is located in a central portion of the output area 17' of the first image data. A head address in the reference data area R is set to RI0 and a final address in the reference data area R is set to Rno−1. Accordingly, when the shifting area to be shifted within the output area 18' of the second image data is represented with RI0 as a reference, phase difference data can be found if the data block is shifted by ±2 picture elements with respect to a block $R_{B3}$ as a center corresponding to the reference data area Q.

Accordingly, with respect to the block $R_{B3}$ having the head address shown by $R_B = RI0 + (RI0 - RI)$, there are a total of five blocks composed of a block $R_{B2}$ shifted by −1 picture element, a block $R_{B1}$ shifted by −2 picture elements, the block $R_{B3}$, a block $R_{B4}$ shifted by +1 picture element, and a block $R_{B5}$ shifted by +2 picture elements. Accordingly, it is sufficient to set a first block shift by J=−2 and set a final block shift by J=+2.

In the step 21 shown in FIG. 23, J= −2 is thus set and it proceeds to the next step S22.

In the step S22, $$R_B = RI0 + (RI0 - RI) + J$$

is set to shift the block.

In the next step S23, I=1, Dno=Rno, and $AB_{ABS}=0$ are set. Reference numeral Dn0 designates the number of picture elements actually used and described in detail later.

In the next step S24, it is judged whether or not data corresponding to the reference data area Q determined above exist within the output area 18' of the second image data. Namely, in this step S24, $$1 \leq R_B + I - 1 \leq 48$$

is judged.

A position of the reference data area Q is changed in accordance with the distance between the photographed object and the lens system at the present time. The number of picture elements forming this reference data area Q is smaller than a normal number thereof on proximate and infinite sides of the lens system. Accordingly, in this case, as described later, it is necessary to correct the number of picture elements forming the reference data area Q by using data of the number Dno of picture elements actually used.

When the judgment in the step S24 is YES, the block $R_B$ is located within the output area 18' of the second image data and it proceeds to the next step S25. In the step S25, a conformity degree is calculated in accordance with the following formula.

$$AB_{ABS} = ABS\{A(RI+I-1) - B(R_B+I-1)\} + AB_{ABS}$$

Then, it proceeds to the next step S26.

In contrast to this, when the judgment in the step S24 is NO, no block $R_B$ is located within the output area 18' of the second image data. Accordingly, it proceeds to a step S26 without executing the step S25.

In the step S26, it is judged whether I=Rno is formed or not. When this judgment is YES, it proceeds to a step S27. In the step S27, $AB_{ABS}$ is corrected in accordance with the following formula.

$$AB_{ABS} = ABsum \times (Dno/Rno)$$

When the judgment in the step S24 is YES, Dno=Rno is formed so that no $AB_{ABS}$ is corrected. In contrast to this, when the judgment in the step S24 is NO, no block $R_B$ is located within the output area 18' of the second image data so that Dno<Rno is formed so that $AB_{ABS}$ is corrected at the ratio Dno/Rno.

In the next step S28, it is judged whether $AB_{ABS} \leq ABsum$ is formed or not. When this judgment in this step S28 is YES, $ABsum = AB_{ABS}$ and $M_{11} = R_B$ are set in the next step S29 and it proceeds to a step S30. In contrast to this, when the judgment in the step S28 is NO, it proceeds to the next step S30 without executing the step S29. Accordingly, a first shifting operation is completed with respect to the output area 18' of the second image data and it is judged in the step S30 whether J=2 is formed or not. When the judgment in the step S30 is NO, an incremental operation is formed in a step S33 such that value one is added to the number J of small blocks and it is returned to the above step S22.

In contrast to this, when the judgment in the step S30 is YES, five shifting operations about the above five blocks are completed with respect to the output area 18' of the second image data. Accordingly, the series of steps shown in FIG. 23 is completely executed so that the step P8 shown in FIG. 19 is completely executed. Accordingly, it is possible to obtain phase difference data in the first distance measurement and it proceeds to the next step P9.

The step P9 is not executed this time in this example, but is executed at a subsequent time point as described in detail later. Accordingly, when the step P8 is completely executed, it directly proceeds to a step P10 from the step P8 by jumping the step P9.

In the step P10, various kinds of data obtained in the first detection of distance measurement are arranged in a time series to use these data in the next second detection of distance measurement. Namely, $Rno_L$ and Rno are respectively rearranged and set to $Rno_{LL}$ and $Rno_L$. Further, $Cst_L$, Cst and C(i) are respectively rearranged and set to $Cst_{LL}$, $Cst_L$ and D(i). In the next step P11, an incremental operation is performed such that value one is added to the number Mno indicative of the number of detections of the detected image data and it is returned to the above step P1.

In the step P1, it is judged whether Mno=1 is formed or not. In this case, the number Mno is equal to 2 so that this judgment in the step P1 is NO. Accordingly, it proceeds to a step P12.

In the step P12, the first to third image data at the second and third detecting times of distance measurement are stored to a memory device. Concretely, such a data storing operation is performed as shown in FIGS. 26 and 27.

Figure 26:
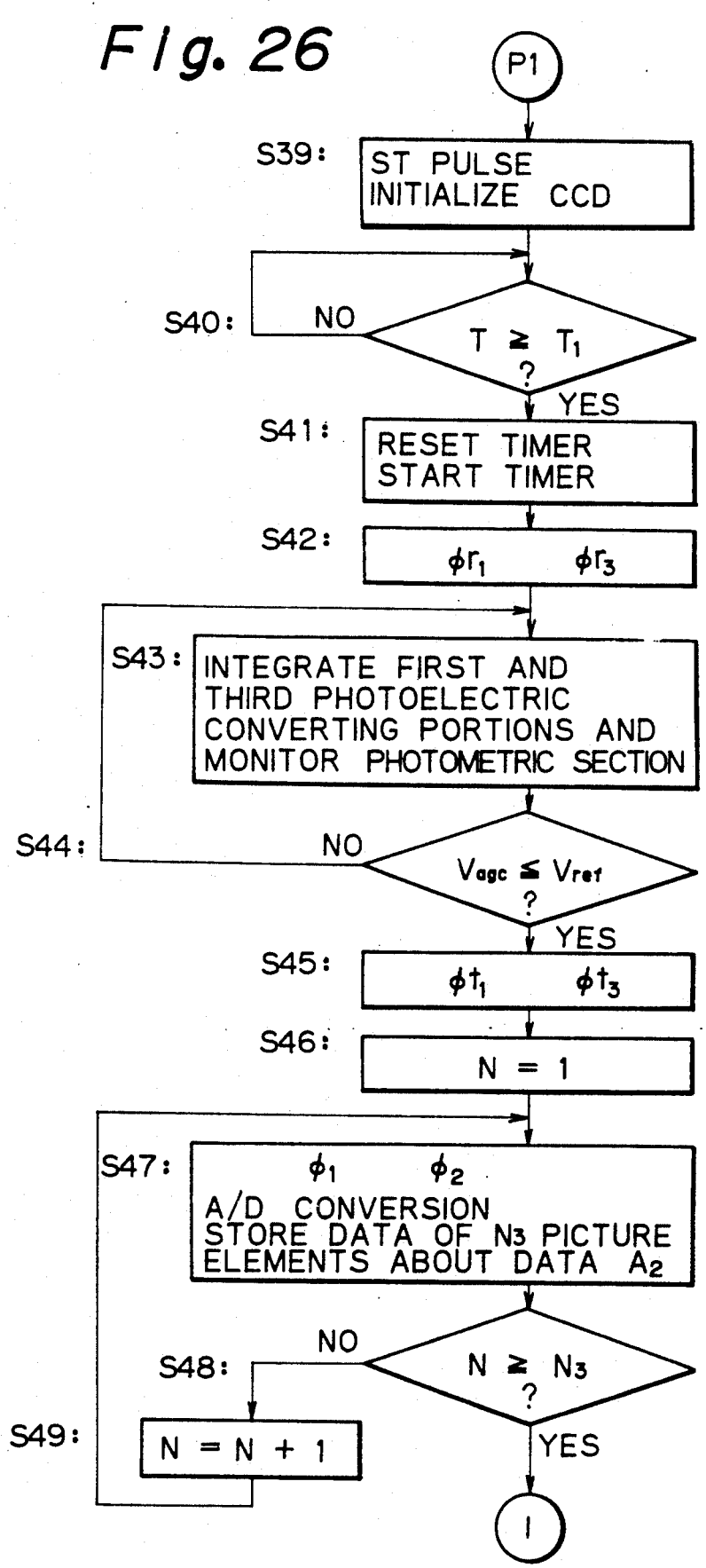
FIG. 26 is a flow chart showing a step P12 in detail in the flow chart shown in FIG. 19.
Figure 27:
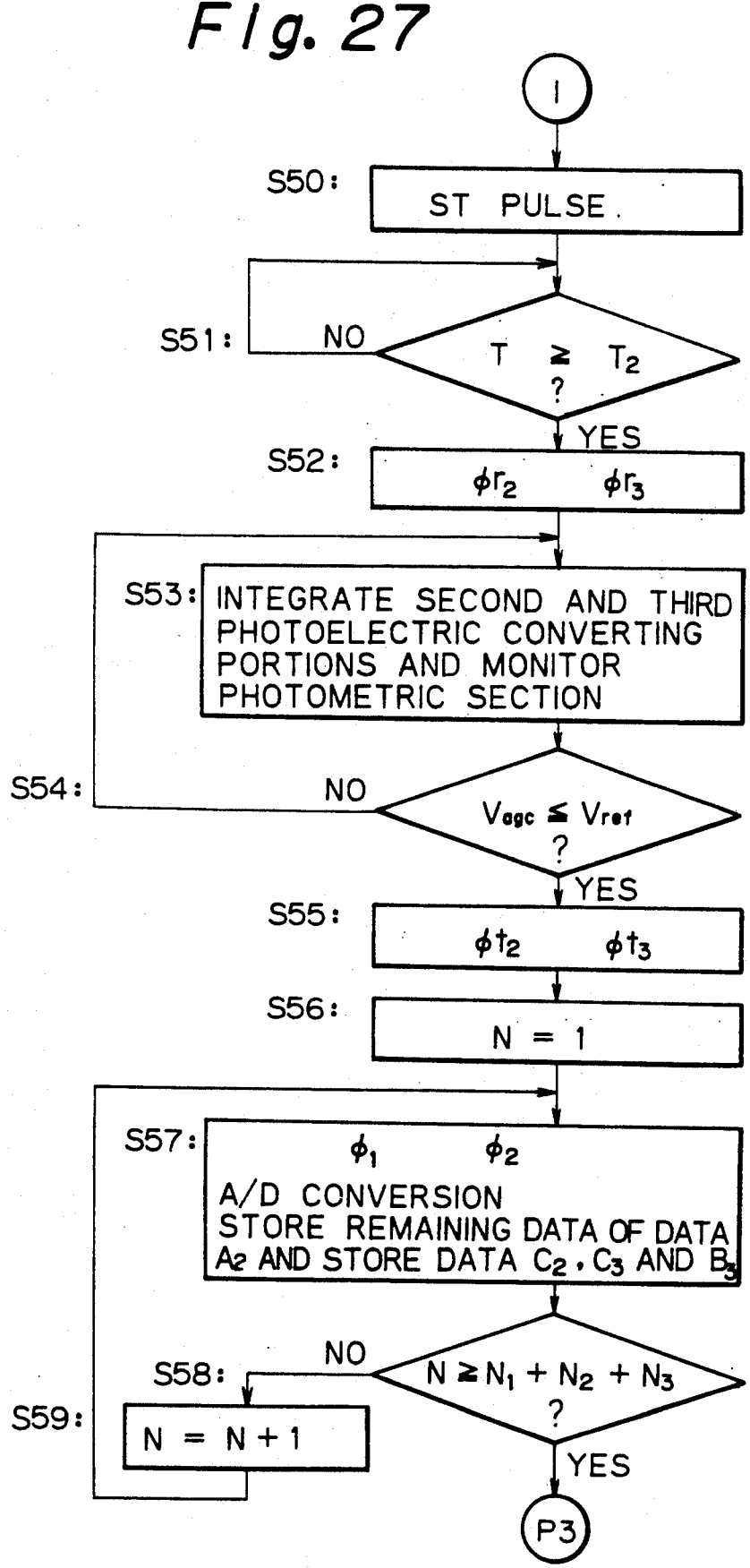
FIG. 27 is a flow chart showing steps subsequent to the flow chart shown in FIG. 26.

In a step S39 shown in FIG. 26, a pulse ST (shown in FIG. 9) for initializing the monitor photometric section 30 rises so that a voltage level of this pulse ST is set to a high voltage level. Thus, the monitor photometric section 30 is charged until a voltage level of the monitor photometric section 30 is equal to a predetermined voltage level. The monitor photometric section 30 thus attains a standby state and the first to third photoelectric converting portions 17 to 19 are initialized.

In the next step S40, it is judged whether or not the elapsed time of a timer circuit started in the above step S2 exceeds a predetermined time $T_1$. When this judgment in this step S40 is YES, it proceeds to the next step S41. In the step S41, the above timer circuit is reset and is simultaneously started again. In contrast to this, when the judgment in the step S40 is NO, it does not proceed to the step S41 until $T \geq T_1$ is formed.

"$T \geq T_1$?" is judged in the step S40 since a time $T_i$ is required to provide the judgment YES ($V_{agc} \leq V_{ref}$) in the comparison of the output voltage $V_{agc}$ of the monitor photometric section 30 and the reference voltage $V_{ref}$ in the step S5 and this time $T_i$ is not constant, but is changed in accordance with brightness of the photographed object. For example, when the brightness of the photographed object is high, the time $T_i$ is reduced. In contrast to this, when the brightness of the photographed object is low, the time $T_i$ is increased.

Accordingly, when the brightness of the photographed object is extremely low, it takes much time to obtain data of the respective picture elements in the first to third photoelectric converting portions 17 to 19. As a result, a total automatic focusing time is increased so that no focusing state detector can be really used.

Therefore, no output of data of the first to third photoelectric converting portions 17 to 19 is interrupted and it compulsorily proceeds to the next step at the certain specified time $T_1$ arbitrarily set in accordance with a lower limit of a general brightness range of the photographed object.

When the timer circuit is started in the step S41, the first and third reset pulses $\phi r_1$ and $\phi r_3$ rise in a step S42 so that voltage levels of these reset pulses are set to high voltage levels. Thus, the first and third photoelectric converting portions 17 and 19 are reset through the reset portions 20 and 24. Simultaneously, an integral operation is started with respect to each of the picture elements in accordance with a light intensity distribution of each of the received light beams. Further, simultaneously, the monitor photometric section 30 is reset and an integral operation is started with respect to the monitor photometric section 30.

In the next step S44, similar to the above step S5, it is judged whether or not the output voltage $V_{agc}$ of the monitor photometric section 30 is equal to or lower than the reference voltage $V_{ref}$. When the output voltage $V_{agc}$ of the monitor photometric section 30 is reduced and is lower than the reference voltage $V_{ref}$, it proceeds to a step S45. In the step S45, the first and third shift pulses $\phi t_1$ and $\phi t_3$ rise so that voltage levels of these shift pulses are set to high voltage levels. Data of the first and third photoelectric converting portions 17 and 19 are shifted by the shift register 26 through the shifting portions 21 and 25 as shown by reference numeral d in FIG. 10.

In the next step S46, the counting value N of a shift counter is set to one and it proceeds to the next step S47. In the step S47, the shift pulse $\phi_1$ rises so that a voltage level of this shift pulse is set to a high voltage level. In contrast to this, the shift pulse $\phi_2$ falls so that a voltage level of this shift pulse is set to a low voltage level.

Accordingly, the picture element data stored to each of the photoelectric converting elements of the first photoelectric converting portion 17 are outputted by one clock data amount (a data amount of one picture element) as an output $V_{out}$ from the shift register 26. This output $V_{out}$ is A/D-converted and is stored to a RAM as data of one picture element.

Such a storing operation is repeatedly performed until the number $N_3$ of picture elements constituting the third photoelectric converting portion 19.

Namely, it is judged in a step S48 whether $N \geq N_3$ is formed or not every time the data of one picture element are stored to the RAM in the step S47. When this judgment is NO, it proceeds to a step S49 and an incremental operation is performed such that value one is added to the number N.

When the judgment is YES in the step S48, data of $N_3$ picture elements in the first photoelectric converting portion 17 are outputted from the shift register 26. As shown by reference numeral e in FIG. 10, these data of $N_3$ picture elements in the first photoelectric converting portion 17 are constructed by data of $N_3$ picture elements with respect to a first series of data $A_2$ at the second time. Thus, the steps for providing data at the second time and shown in FIG. 26 are completely executed and it proceeds to steps for providing data at a third time and shown in FIG. 27.

In a step S50 shown in FIG. 27, a ST pulse for initializing the monitor photometric section 30 rises so that a voltage level of this pulse is set to a high voltage level. Thus, the monitor photometric section 30 is charged until a voltage level of this monitor photometric section 30 is equal to a predetermined voltage level, thereby attaining a standby state thereof. Further, the first to third photoelectric converting portions 17 to 19 are reset.

In the next step S51, it is judged whether or not an elapsed time of the timer circuit started in the above step S41 exceeds a predetermined time $T_2$. When this judgment is YES, it proceeds to the next step S52.

In contrast to this, when the judgment in the step S51 is NO, it does not proceed to the step S52 until $T \geq T_2$ is formed.

$T \geq T_2$ in the step S51 is judged for reasons similar to those for the comparison ($T \geq T_1$) of the times T and $T_1$ in the above step S40.

When the judgment is YES in the step S51 and it proceeds to the step S52, the second and third reset pulses $\phi r_2$ and $\phi r_3$ rise so that voltage levels of these reset pulses are set to high voltage levels. The second and third photoelectric converting portions 18 and 19 are respectively reset through the reset portions 22 and 24. Simultaneously, an integral operation is started with respect to each of the picture elements in the second and third photoelectric converting portions 18 and 19 in accordance with each of the received light beams. Further, simultaneously, the monitor photometric section 30 is reset and an integral operation is started with respect to the monitor photometric section 30.

In the next step S54, similar to the above step S5, it is judged whether or not the output voltage $V_{agc}$ of the monitor photometric section 30 is equal to or lower than the reference voltage $V_{ref}$. When the output voltage $V_{agc}$ of the monitor photometric section 30 is reduced and is lower than the reference voltage $V_{ref}$, it proceeds to a step S55. In the step S55, the second and third shift pulses $\phi t_2$ and $\phi t_3$ rise so that voltage levels of these shift pulses are set to high voltage levels. Data of the second and third photoelectric converting portions 18 and 19 are respectively shifted by the shift register 26 through the shifting portions 23 and 25.

Such a shifting operation of the shift register 26 is performed with respect to a data region in which data are not cleared from the shift register 26 in the second shift, but are left in the shift register 26. As shown by reference numeral f in FIG. 10, this data region is an empty region except for data of $(N_1-N_3)$ picture elements with respect to the first series of data $A_2$ at the second time and except for the third series of data $C_2$ at the second time. Namely, this data region is an empty region e' caused when data of $N_3$ picture elements with respect to the data $A_2$ at the second time are shifted.

Accordingly, as shown by reference numeral f in FIG. 10, when the step S55 shown in FIG. 27 is completely executed, the data of the shift register 26 are arranged in an order of the data of $(N_1-N_3)$ picture elements with respect to the first series of data $A_2$ already stored at the second time in the preceding shift, the third series of data $C_2$ at the second time, a third series of data $C_3$ at the third time, and a second series of data $B_3$ at the third time.

In the next step S56 shown in FIG. 27, the counting value N of a shift counter is set to one and it proceeds to the next step S57. In the step S57, the shift pulse $\phi_1$ rises so that a voltage level of this shift pulse is set to a high voltage level. In contrast to this, the shift pulse $\phi_2$ falls so that a voltage level of this shift pulse is set to a low voltage level.

Accordingly, picture element data stored to each of the photoelectric converting elements of the first photoelectric converting portion 17 are outputted by one clock data amount (a data amount of one picture element) as an output $V_{out}$ from the shift register 26. This output $V_{out}$ is A/D-converted and is stored to a RAM as data of one picture element.

In such a storing operation, the RAM stores data of the remaining picture elements except for $N_3$ picture elements with respect to the respective picture element data $A_2$ of the first photoelectric converting portion 17 at the preceding time. Subsequently, the RAM stores data $C_2$ of the third photoelectric converting portion 19 obtained in steps for outputting data at the second time.

Next, the RAM stores the third series of data $C_3$ obtained in steps for outputting data at the third time, and stores the second series of data $B_3$ obtained in the steps for outputting data at the third time.

In the next steps S30 and S31, similar to the above steps S9 and S10, it is judged whether $N \geq (N_1+N_2+N_3)$ is formed or not. When this judgment is YES, the step P12 for outputting data at the third time and shown in FIG. 19 is completely executed and it proceeds to the step completely executed and it proceeds to the step P3.

Operations of the focusing state detector in the steps P3 and P4 are similar to the above-mentioned operations. In the step P5, it is judged whether Mno=1 is formed or not. In this case, Mno=2 is formed so that it proceeds to a step P13. In the step P13, it is judged again whether Mno=2 is formed or not. The judgment in this step P13 is YES so that it proceeds to a step P14.

Figure 28:
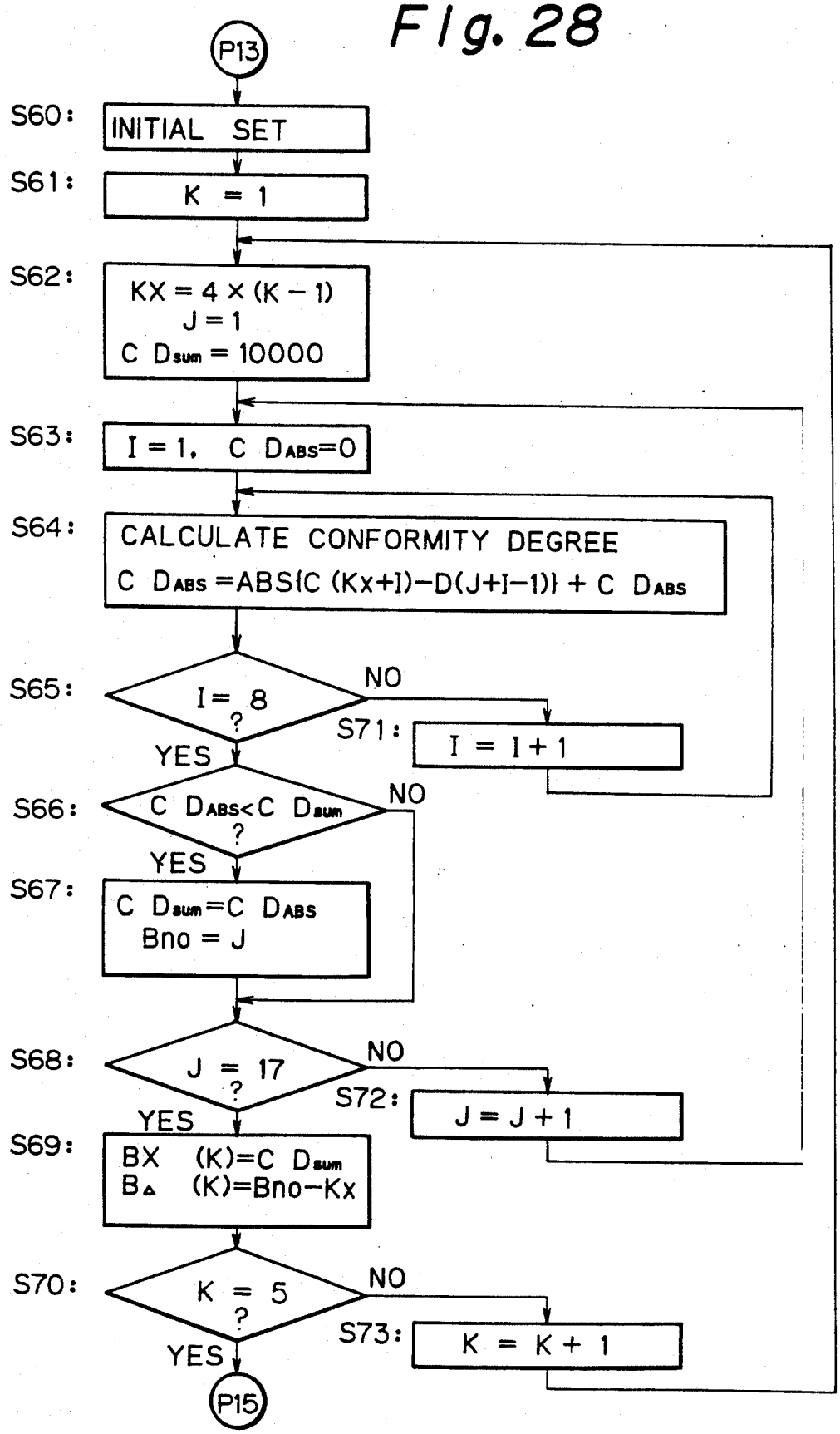
FIG. 28 is a flow chart showing a step P14 in detail in the flow chart shown in FIG. 19.

The step P14 is a step for calculating a phase difference in time between blocks of the third series of data composed of the third image data. Namely, this phase difference is a phase difference in time between the third series of data at the preceding and present times. FIG. 28 shows detailed processings in this step P14.

In a step S60 shown in FIG. 28, the focusing state detector is initialized and a number K described later is set to one in the next step S61. Then, it proceeds to the next step S62.

Figure 29:
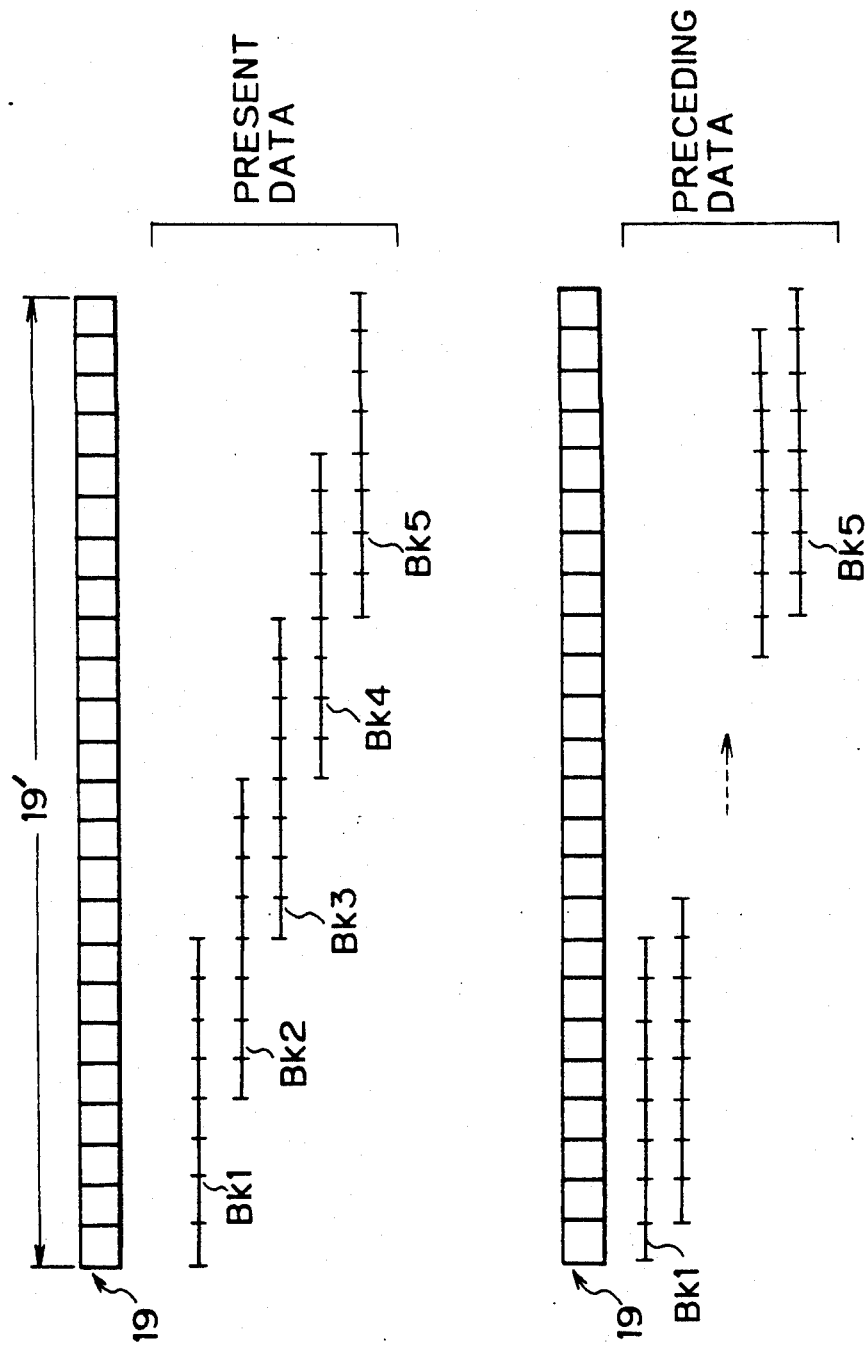
FIG. 29 is a diagram for explaining the operation of the focusing state detector in accordance with the flow chart shown in FIG. 28.

In this embodiment, as mentioned above, the number of picture elements in the third photoelectric converting portion 19 is set to 24. As shown in FIG. 29, five reference areas Bk1 to Bk5 respectively have eight picture elements and are set within an output area 19' of the third image data formed by the 24 picture elements constituting the third photoelectric converting portion 19. The above number K is a number for specifying any one of these reference areas Bk1 to Bk5.

In a step S62, $Kx=4\times(K-1)$, $J=1$, $CD_{sum}=10000$ are respectively set and it proceeds to the next step S63. Reference numeral Kx is described later. In this step S63, $I=1$ and $CD_{ABS}=0$ are set. This reference numeral I is a number for specifying any one of the eight picture elements in each of the reference areas Bk1 to Bk5. Reference numeral $CD_{ABS}$ designates a shift amount between the third image data at the preceding and present times, and this shift amount is represented in a picture element unit.

In the next step S64, the following calculation is made.

$$CD_{ABS}=ABS\{C(Kx+1)-D(J+1-1)\}+CD_{ABS}$$

In this formula, reference numeral Kx designates a data shift amount represented in a picture element unit and is set to 16 in this example. Reference numerals C and D respectively designate the third image data at the present and preceding times.

In the step S64 shown in FIG. 28, as shown in FIG. 29, the focusing state detector first calculates the conformity degree of a picture element in a first address in the first reference area Bk1 about the preceding data with respect to a picture element in a first address in the first reference area Bk1 about the present data.

After the above conformity degree with respect to one picture element is calculated, it proceeds to a step S65. In the step S65, it is judged whether I=8 is formed or not. Namely, it is judged whether or not the conformity degree is calculated in the step S64 by the number 8 of picture elements constituting the first reference area Bk1. When this judgment is NO, it proceeds to a step S71. In the step S71, an incremental operation is preformed such that value one is added to the number I. Thus, the conformity degree with respect to one picture element is again calculated in the step S64. In contrast to this, when the judgment in the step S65 is YES, the conformity degree is completely calculated with respect to the eight picture elements so that it proceeds to the next step S66.

In the step S66, it is judged whether $CD_{ABS}<CDsum$ is formed or not. When this judgment is YES, $CDsum=CD_{ABS}$ and Bno=J are set in a step S67 and it proceeds to a step S68. In contrast to this, when the judgment in the step S66 is NO, it directly proceeds to a step S68 from the step S66 without executing the step S67.

In the step S68, it is judged whether J=17 is formed or not. Namely, it is judged whether a reference area for calculating the conformity degree is a final reference area Bk5 or not. The above number 17 shows the number of a head address in the final reference area Bk5. Accordingly, when the judgment in the step S68 is NO, it proceeds to a step S72. In the step S72, an incremental operation is performed such that value one is added to the number J. Thus, the above-mentioned operations from the step S63 to the step S67 are again performed with respect to the next reference area.

In contrast to this, when the judgment in the step S68 is YES, the conformity degree has been calculated with respect to the five reference areas Bk1 to Bk5 so that it proceeds to a step S69. In the step S69, Bx (K)=CDsum and $B_\Delta(K)$=Bno−Kx are set.

In this case, reference numeral Bx (K) designates the conformity degree of a K-th reference area (one of Bk1 to Bk5) about the present data in most conformity with this reference area about the preceding data. Further, reference numeral $B_\Delta$ (K) designates a phase difference between the present and preceding data in the K-th reference area (one of Bk1 to Bk5).

In the next step S70, it is judged whether K=5 is formed or not. Namely, it is judged whether or not Bx (K) and $B_\Delta$ (K) are calculated with respect to the five reference areas Bk1 to Bk5. When this judgment is NO, it proceeds to a step S73. In the step S73, an incremental operation is performed such that value one is added to the value K, and it is returned to the step S62. Thus, the above-mentioned operations from the step S63 to the step S69 are again performed. In contrast to this, when the judgment in the step S70 is YES, the series of steps shown in FIG. 28 is completely executed and it proceeds to a step P15 shown in FIG. 19.

Figure 30:
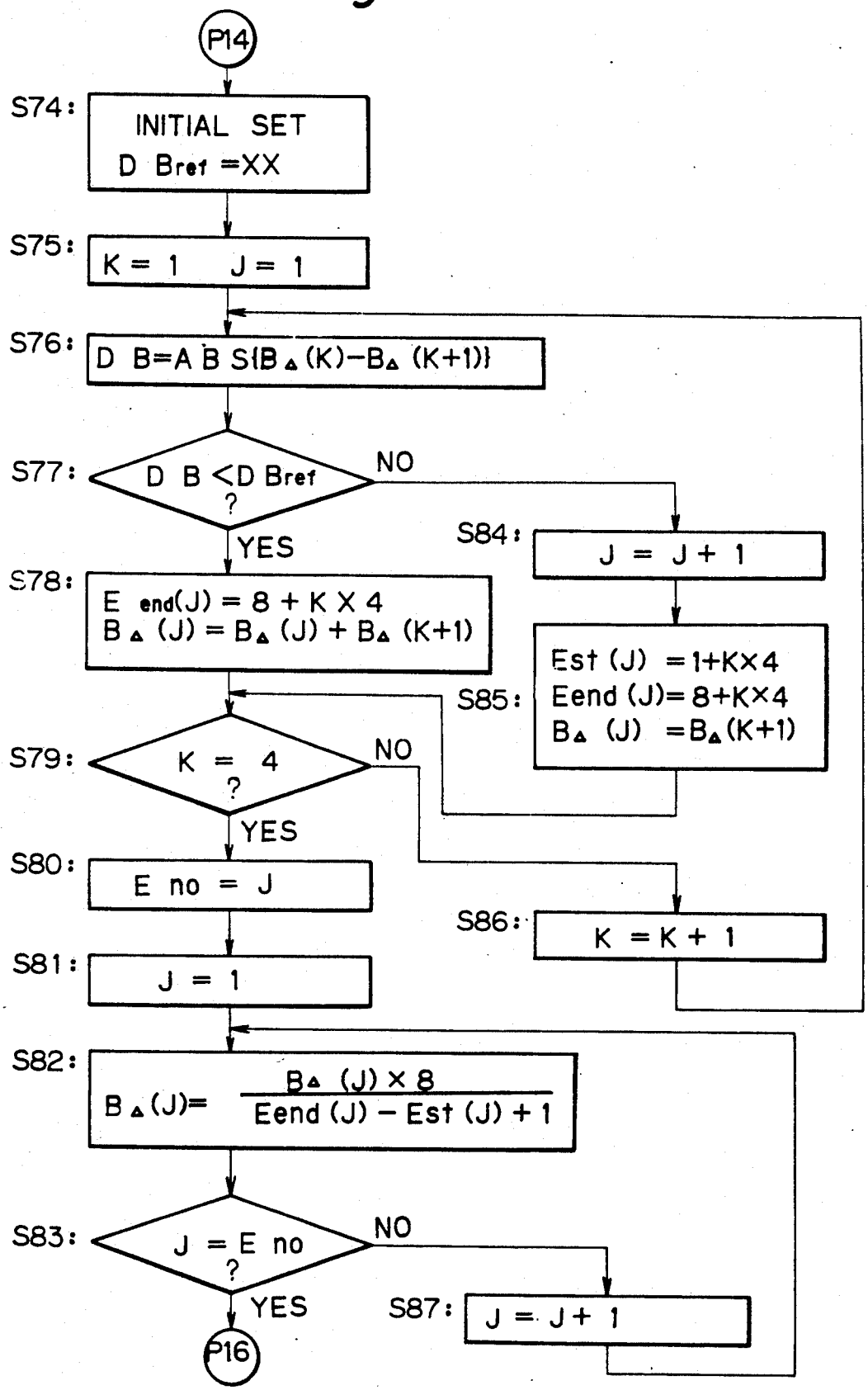
FIG. 30 is a flow chart showing a step P15 in detail in the flow chart shown in FIG. 19.

The step P15 is a step for reblocking the third image data at the present time based on data of the conformity degree obtained in the step P14. These third image data are reblocked by connecting the third image data at the present time adjacent to each other with respect to the reference areas and having a phase difference similar to that of the third image data at the preceding time. FIG. 30 is a flow chart showing detailed processings in the step P15. In a first step P74 shown in FIG. 30, a reference phase difference $DB_{ref}=XX$ is initially set and $K=1$ and $J=1$ are initially set in the next step S75.

Figure 31:
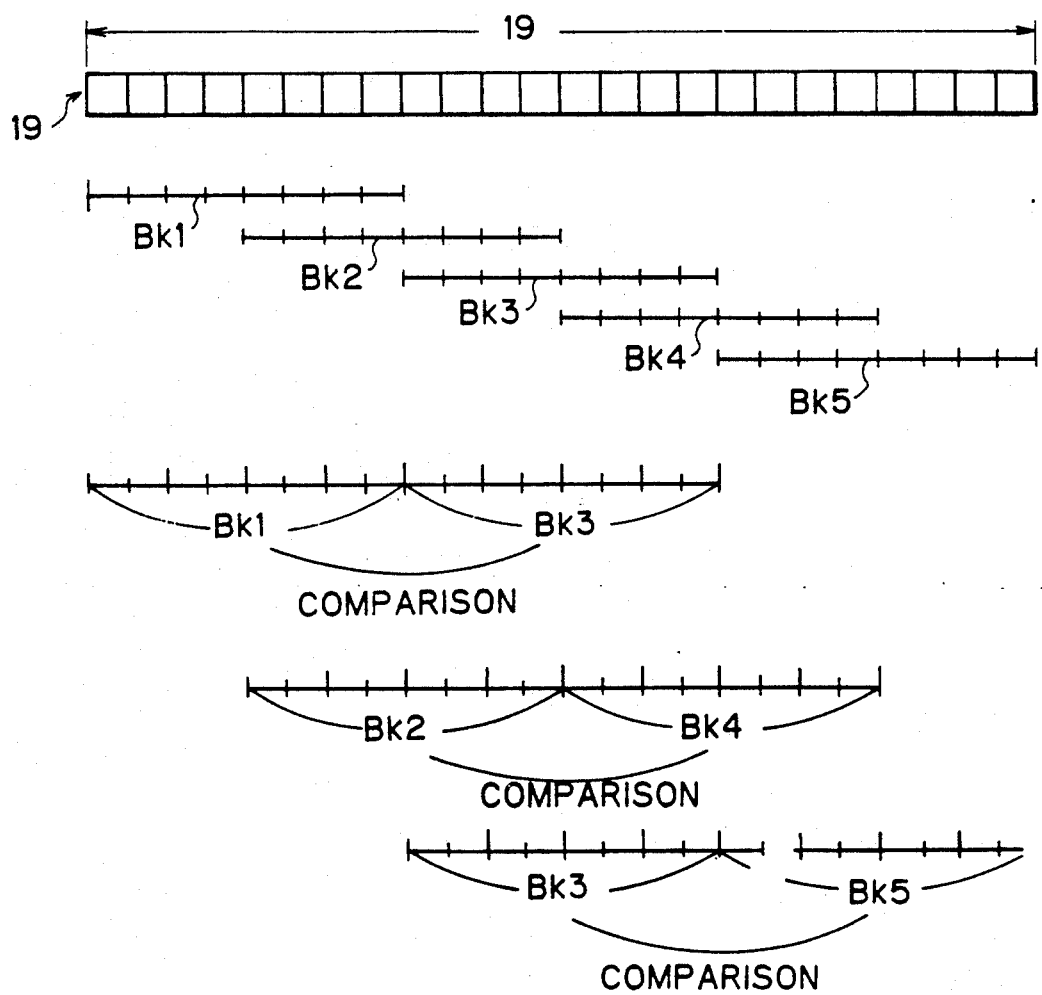
FIG. 31 is a diagram for explaining the operation of the focusing state detector in accordance with the flow chart shown in FIG. 30.

In the next step S76 shown in FIG. 30, as shown in FIG. 31, a phase difference in data is calculated in accordance with the following formula, $$DB = ABS\{B_\Delta(k) - B_\Delta(k+1)\}$$

with respect to adjacent areas of the reference areas Bk1 to Bk5 obtained in the above step P14, i.e., the respective detailed steps of the flow chart shown in FIG. 28. Namely, the phase difference in data between the reference areas Bk1 and Bk3 is calculated. Further, the phase difference in data between the reference areas Bk2 and Bk4 is calculated. Further, the phase difference in data between the reference areas Bk3 and Bk5 is calculated.

In the next step S77, it is judged whether $DB < DB_{ref}$ is formed or not. When this judgment is YES, a final address represented by Eend $(J) = 8 + K \times 4$ in a reblocked reference area is stored to a memory device. Further, phase difference data at this time represented by $B_\Delta(J) = B_\Delta(J) + B_\Delta(K+1)$ are stored to the memory device. In the next step S79, it is judged whether the number K at this time is equal to 4 or not. When this judgment is YES, the number Eno of reblocked reference areas is set to J in a step S80.

In contrast to this, when the judgment in the step S77 is NO, it proceeds to the next step S84. In the step S84, an incremental operation is performed such that value one is added to the number J and it proceeds to the next step S85. In the step S85, a head address Est $(J) = 1 + K \times 4$ and a final address Eend $(J) = 8 + K \times 4$ are set in the reblocked reference area. Further, phase difference data at this time $B_\Delta = B_\Delta(K+1)$ are set in the step S85 and it proceeds to the next step S79.

When the judgment in the step S79 is NO, an incremental operation is performed in a step S86 such that value one is added to the number K to again execute the steps S76 to S79 with respect to the next reference area.

The number Eno of reblocked reference areas obtained in the above step S80 is once set to one by setting $J=1$ in the next step S81 and it proceeds to the next step S82. In this step S82, the phase difference with respect to each of the reblocked reference areas is again calculated on the basis of a conformity degree with respect to the reference data area in accordance with the following formula.

$$B_\Delta(J) = \frac{B_\Delta(J) \times 8}{Eend(J) - Est(J) + 1}$$

The calculated phase difference is prepared to determine a reference area described later.

In the next step S83, it is judged whether $J = Eno$ is formed or not. When this judgment is YES, it proceeds to a step P16. In contrast to this, when the judgment in the step S83 is NO, an incremental operation is performed in a step S87 such that value one is added to the number J.

In the step P16, a reference area is selected out of the plural reblocked data provided in the step P15.

Figure 32:
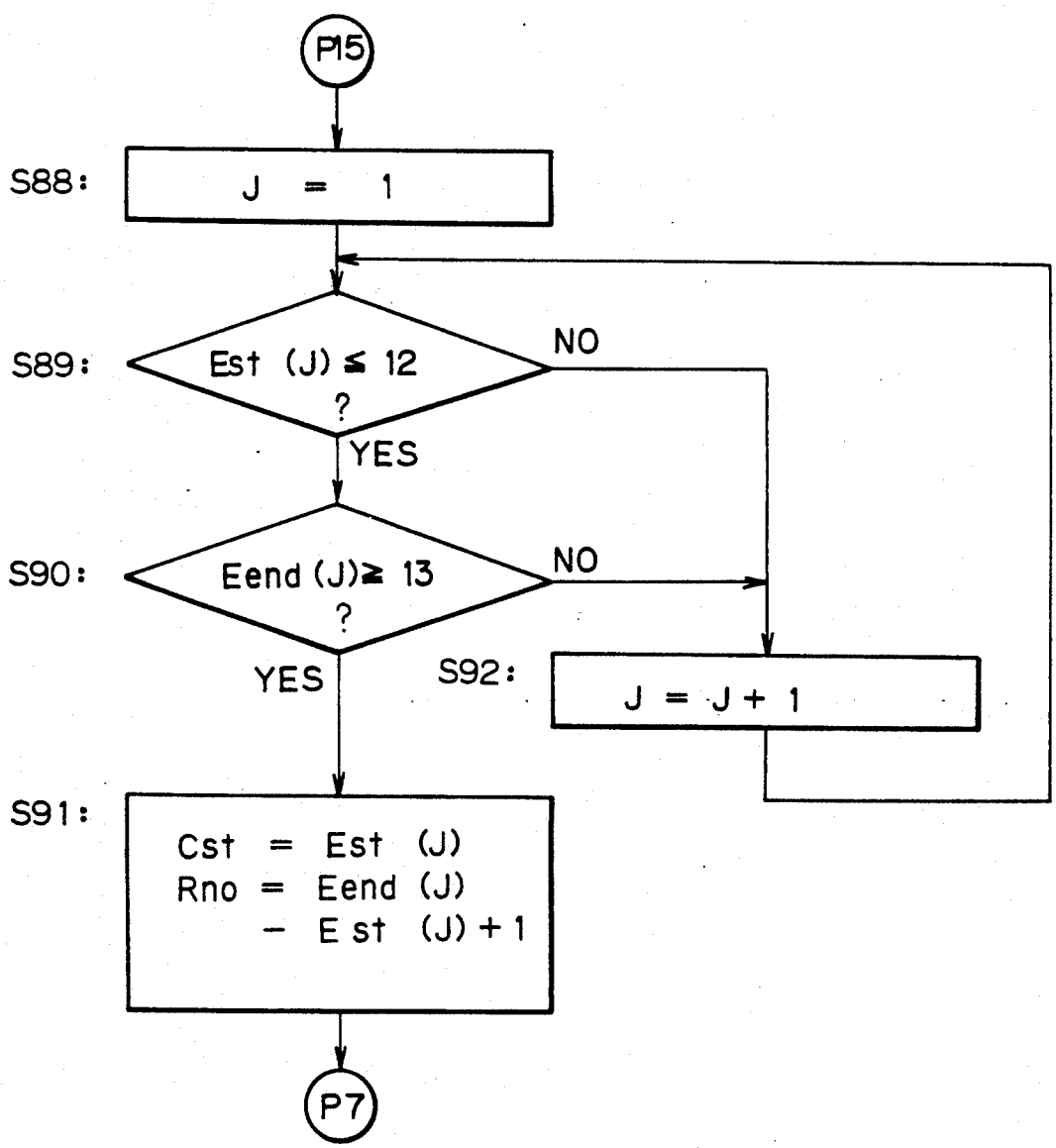
FIG. 32 is a flow chart showing a step P16 in detail in the flow chart shown in FIG. 19.
Figure 33:
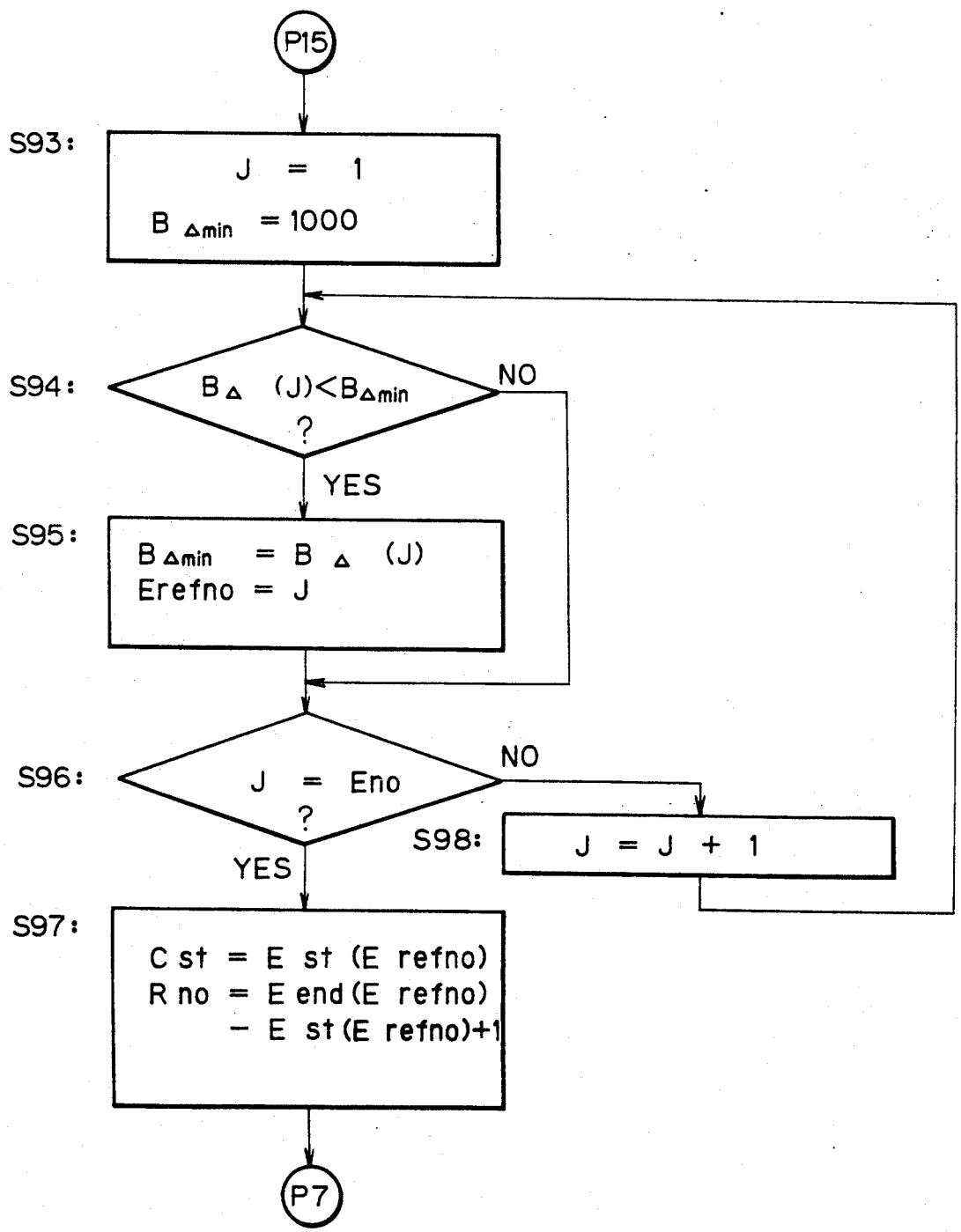
FIG. 33 is a flow chart showing the step P16 in detail in the flow chart shown in FIG. 19.
Figure 34:
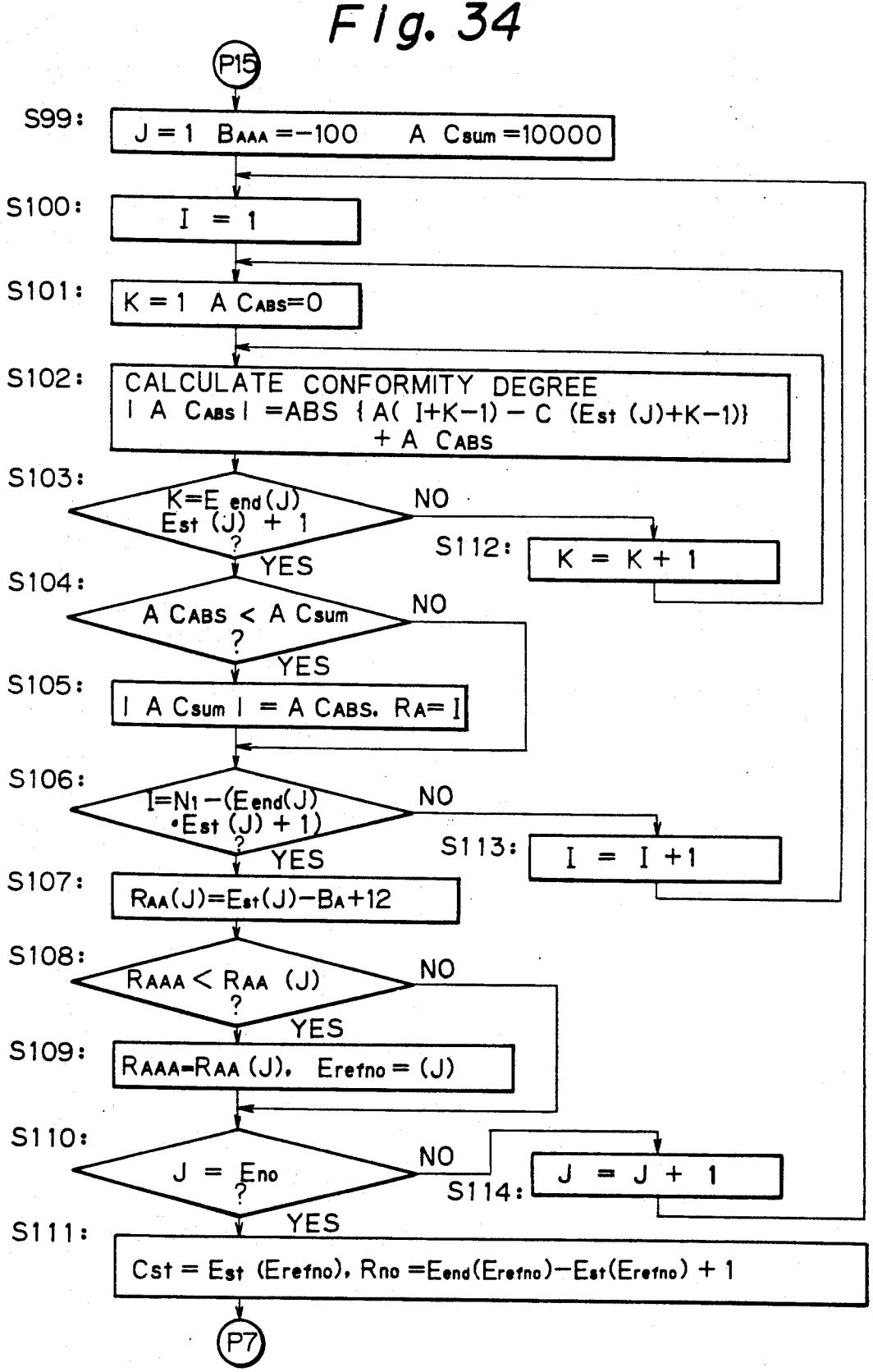
FIG. 34 is a flow chart showing the step P16 in detail in the flow chart shown in FIG. 19.

This step P16 is mainly executed by the following three priority systems composed of a central priority system shown in FIG. 32, a priority system using a small phase difference shown in FIG. 33, and a priority system using a close distance shown in FIG. 34.

Figure 35:
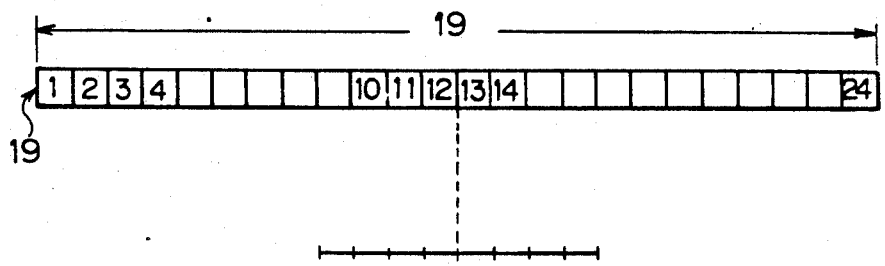
FIG. 35 is a diagram for explaining the operation of the focusing state detector in accordance with the flow chart shown in FIG. 32.

First, the screen center priority system will be described with reference to FIG. 32. In a step S88, $J=1$ is initially set. In the next step S89, it is judged whether Est $(J) \leq 12$ is formed or not. Namely, it is judged whether or not the head address in the reblocked reference area shows a value equal to or smaller than 12. In other words, as shown in FIG. 35, it is judged whether or not the head address in the reblocked reference area exists within addresses 1 to 12. When this judgment in the step S89 is NO, it proceeds to a step S92. In the step S92, an incremental operation is performed such that value one is added to the number J. In contrast to this, when the judgment in the step S89 is YES, it proceeds to a step S90. In the step S90, it is judged whether Eend $(J) \geq 13$ is formed or not. Namely, it is judged whether or not the final address in the reblocked reference area shows a value equal to or greater than 13.

In other words, as shown in FIG. 35, it is judged whether or not the final address in the reblocked reference area exists within addresses 13 to 24. When this judgment in the step S90 is NO, it proceeds to the step S92. In the step S92, the incremental operation is performed such that value one is added to the value J. Then, the steps S89 and S90 are again executed. When the judgment in each of the steps S89 and S90 is YES, a block of picture elements which contains the center of the picture screen is specified and it proceeds to the next step S91.

In this step S91, a number of this specified block is set as Cst=Est (J). Further, the number Rno of picture elements in this specified block is set to Eend (J)−Est (J)+1. When this step P16 is completely executed, it proceeds to the above-mentioned step P7.

The second priority system using a small phase difference used in the step P16 will next be described with reference to FIG. 33. In this priority system, $J=1$ is initially set in a step S93. Further, in this step S93, an initial phase difference $B_{\Delta min}$ is temporarily set to 1000.

In the next step S94, a phase difference $B_\Delta(J)$ in a reblocked j-th reference area is compared with this initial phase difference $B_{\Delta min}$. When $B_\Delta(J) < B_{\Delta min}$, $B_{\Delta min} = B_\Delta(J)$ is set and the number J is set to the number Erefno of a reference block Eref. In the next step S96, it is judged whether $J = Eno$ is formed or not.

When the judgment in the step S94 is NO, it directly proceeds to the step S96 from the step S94 without executing the step S95.

When the judgment in the step S96 is NO, an incremental operation is performed in a step S98 such that value one is added to the number J. Thus, the steps S94, S95 and S96 are again executed. In contrast to this, when the judgment in the step S96 is YES, address data in a reference block determined in the next step S97 are set as Cst=Est (Erefno). Further, the number Rno of picture elements in this reference block is set as Rno = Eend (Erefno) − Est (Erefno) + 1.

The third priority system using a close distance for determining a reference area will next be described in detail with reference to FIG. 34.

In a first step S99, $J=1$, $R_{AAA} = -100$ and AC-sum = 10000 are initially set. $R_{AAA}$ represents the maximum phase difference. In the next step S100, the shifting number I is set to one. In the next step S101, the number K of blocks is set to one and $AC_{ABS}$ is set to zero.

In the next step S102, a conformity degree of the first series of data $A_2$ and the third series of data $C_2$ obtained at the second time in the above step P12 is calculated in accordance with the following formula.

$$|AC_{ABS}| = ABS\{A(1+K-1) - C(Est(J)+K-1)\} + AC_{ABS}$$

In the next step S103, it is judged whether K=Eend(J)×Est(J)+1 is formed or not. When this judgment is NO, an incremental operation is performed in a step S112 such that value one is added to the number K of blocks. Thus, the steps S102 and S103 are again executed.

In contrast to this, when the judgment in the step S103 is YES, it proceeds to a step S104. In the step S104, it is judged whether $AC_{ABS} < AC_{sum}$ is formed or not. When this judgment is YES, $|AC_{sum}| = AC_{ABS}$ and a head address $R_A = I$ are set and it proceeds to the next step S106.

In this step S106, it is judged whether $I = N_1 - (Eend(J) \times Est(J)+1)$ is formed or not. When this judgment is NO, an incremental operation is performed in a step S113 such that value one is added to the shifting number I. Thus, the above-mentioned operations from the step S101 to the step S106 are again performed. In contrast to this, when the judgment in the step S106 is YES, data about the number J at this time are set as a phase difference $R_{AA}(J) = Est(J) - R_A + 12$, thereby specifying a block of picture elements at the closest distance.

In the next step S108, it is judged whether or not $R_{AAA} > R_{AA}(J)$ is formed every block. Further, in the next step S109, it is judged whether $R_{AAA} = R_{AA}(J)$ and Erefno = (J) are set every block. In the next step S110, it is judged whether J=Eno is formed or not. When this judgment is NO, it proceeds to a step S114. In the step S114, an incremental operation is performed such that value one is added to the number J. Thus, the above-mentioned operations from the step S100 to the step S110 are again performed.

In contrast to this, when the judgment in the step S110 is YES, data in addresses, etc. in a block of picture elements determined in accordance with the priority of a close distance are set as Cst=Est(Erefno) in the next step S111. Further, in the step S111, the number Rno of picture elements at this time is set as follows.

$$Rno = Eend(Erefno) - Est(Erefno) + 1.$$

When the reference area of reblocked data is determined by one of the first, second and third priority systems, the data in addresses, etc. in this reference block are transmitted to a means for executing the above step P7 shown in FIG. 19.

In the step P7, the reference area is determined in accordance with processings similar to those performed with respect to the first series of data $A_1$, the second series of data $B_1$ and the third series of data $C_1$ obtained at the first time in the above step P2.

In the next step P8, similar to the above-mentioned operations, the conformity degree operation is performed with respect to the first series of data $A_2$ at the second time, thereby providing phase difference data. In the step P10, these phase difference data are stored to a RAM, etc. In the next step P11, an incremental operation is performed such that value one is added to the number Mno of distance measurements, thereby starting a third distance detecting operation.

Thus, in the step P1, it is judged whether Mno is equal to one or not. This judgment is NO so that it proceeds to the step P12. Then, the steps P3, P4, P5 and P13 are sequentially executed since data to be obtained in the third distance detection are already obtained in the second distance detection in the step P12. The judgment with respect to Mno=2 in the step P13 is NO so that it proceeds to a step P17.

The step P17 is a step for calculating a similarity degree of reference areas determined with respect to the third series of data $C_1$ obtained at the first time (i.e., in the first distance detecting operation) and the third series of data $C_2$ obtained at the second time (i.e., in the second distance detecting operation). Data indicative of this similarity degree obtained in the step P17 are once stored to a RAM. In the next step P18, it is judged whether or not the above reference areas obtained at the first and second times are similar to each other. Namely, it is judged whether or not the reference area determined with respect to the third series of data $C_1$ obtained at the first time is similar to the reference area determined with respect to the third series of data $C_2$ obtained at the second time.

When the third series of data at two different time points are different from each other, the photographed object is moved at the two time points in directions perpendicular to the optical axis of the lens system. This movement of the photographed object is detected by the above judgment of the similarity degree of the reference areas. When the photographed object is moved at the above two time points in a direction of the above optical axis, there is no change in the third series of data.

Accordingly, when the judgment in the step P18 is NO, the photographed object is moved in left-handed and right-handed directions. In the next steps P14, P15 and P16, a phase difference in time is calculated with respect to the third series of data and the third series of data is reblocked and a reference area is determined with respect to the third series of reblocked data. Operations after the next step P7 are similar to the above-mentioned operations.

In contrast to this, when the judgment in the step P18 is YES, it is judged that no photographed object is moved in directions perpendicular to the above optical axis. A reference area of the third series of data in the third distance detection is predicted in the next step P19. This predicted reference area is used in the step P7 and the above-mentioned operations after the step P7 are performed.

Figure 25:
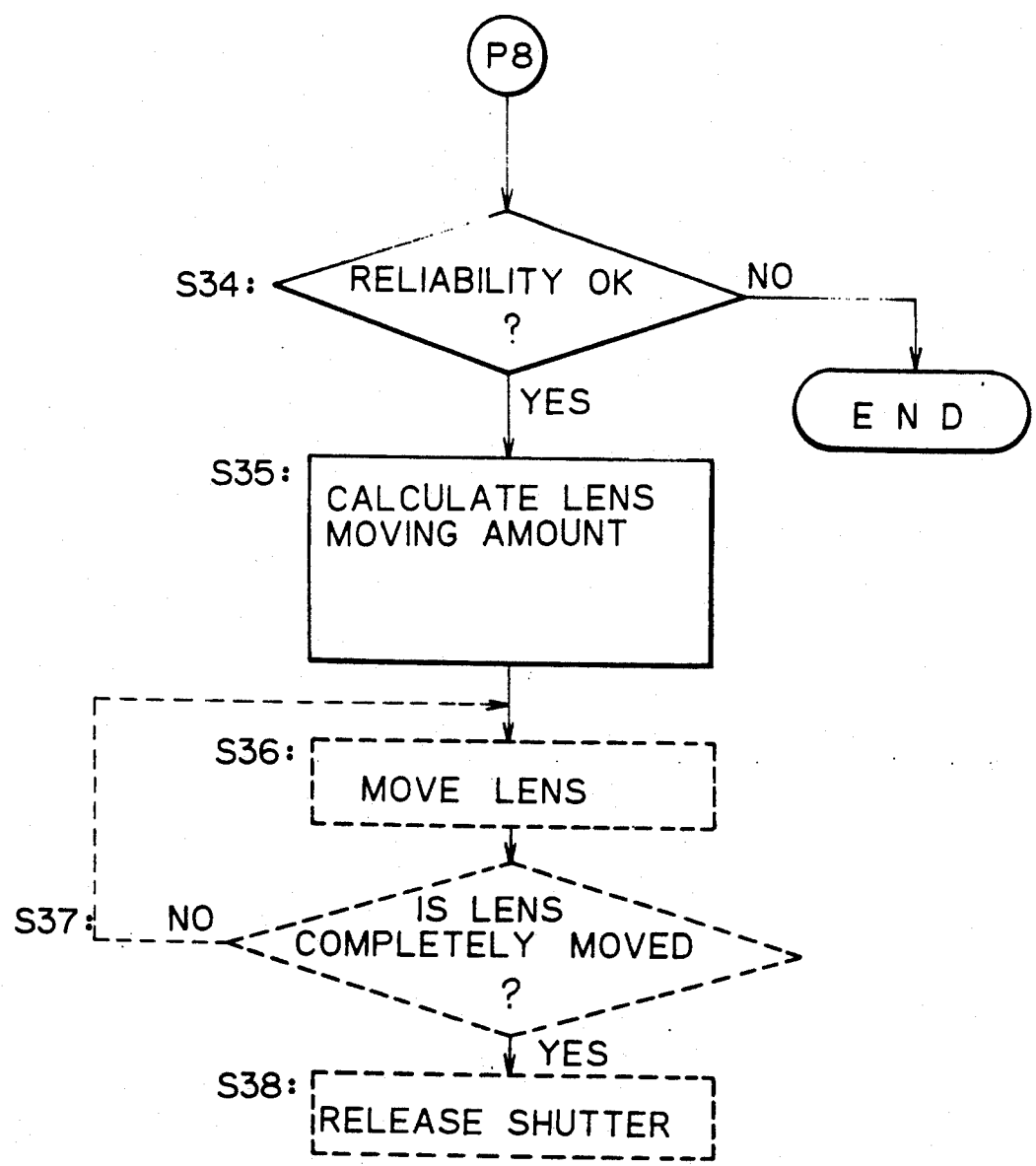
FIG. 25 is a flow chart showing a step P9 in detail in the flow chart shown in FIG. 19.

As shown in FIG. 25, various kinds of data obtained above are judged with respect to reliability thereof in a step S34. When this judgment is NO, impossibility of distance measurement, etc. are displayed and the flow chart is ended. In contrast to this, when the judgment in the step S34 is YES, it proceeds to the next step S35.

In this step S35, phase difference data are first provided from data obtained in the steps P7 and P8 in each of the distance measurements. Namely, first phase difference data $\sigma_1$ are provided from data $A_1$ and $B_2$ with respect to the picture element data obtained and stored to the RAM in the above step P2. In this case, the data $A_1$ and $B_1$ are respectively the first series of data $A_1$ and the second series of data $B_1$ obtained at the first time.

Then, second phase difference data $\sigma_2$ are provided from data $A_2$ and $C_2$ obtained in the step P12. In this case, the data $A_2$ and $C_2$ are respectively the first series of data $A_2$ obtained at the second time and the third series of data $C_2$ obtained and stored to the RAM at the second time. Third phase difference data $\sigma_3$ are provided from the second series of data $B_3$ and the third series of data $C_3$ obtained in steps for outputting data at the third time.

A moving amount $\Delta$ of the photographing lens is calculated on the basis of a total of five kinds of data composed of the above obtained first, second and third phase difference data $\sigma_1$, $\sigma_2$ and $\sigma_3$, a time $T_1$ from a first distance measuring time point to a second distance measuring time point, a time $T_2$ from the second distance measuring time point to a third distance measuring time point.

In the next step S36, a focusing drive ring of the photographing lens begins to be moved. In the next step S37, it is judged whether or not the photographing lens is completely moved by the lens moving amount $\Delta$ obtained in the above step S35. When this judgment is NO, it is returned to the step S36 and the photographing lens is continuously moved. In contrast to this, when the judgment in the step S37 is YES, the series of distance measurements and calculations and the sequential lens moving operations are completed and it proceeds to a step S38. In the step S38, a shutter begins to be released to expose a film.

Accordingly, in this embodiment of the present invention, picture element data are outputted in advance before phase difference data are provided in each of the distance measurements. Namely, first to third picture element data are outputted in the first distance measurement. Second picture element data are partially outputted in the second distance measurement. The first to third picture element data are outputted in the third distance measurement. When the phase difference data are provided, the first phase difference data are provided from data obtained in the first distance measurement in two regions opposed to each other with respect to the optical axis of a lens system. The second phase difference data are provided from data obtained in the second distance measurement with respect to a region including the above optical axis and a region having no optical axis. Further, the third phase difference data are provided from data obtained in the third distance measurement with respect to the region including the above optical axis and the region having no optical axis. Accordingly, it is possible to reduce a time for outputting the picture element data and a time required to calculate the moving amount of the photographing lens.

In this embodiment, a time point for completing the integral operation of the charge coupled device (CCD) is controlled in accordance with a light-receiving amount of the monitor photometric section so that no accuracy in detection of a focusing state of the lens system is reduced in accordance with brightness of the photographed object.

When the required phase difference data are provided in advance before the lens moving amount $\Delta$ is finally calculated to move the photographing lens, a reference area with respect to the first or second image data is set with the third image data as a reference. Data of a conformity degree are obtained by comparing the image data within this reference area with each other in detail so that the focusing state detector can be efficiently operated.

A period for storing a charge (or performing an integral operation) to obtain the first to third series of data is set twice in the above-mentioned embodiments. The lens moving amount is calculated on the basis of data with respect to each of the two periods. The photographing lens is moved by this moving amount to provide a focusing state thereof. However, a defocusing amount may be calculated in the first distance measurement when the first to third series of data are obtained. In this case, after the photographing lens is moved toward a focusing point thereof in accordance with this defocusing amount, a charge is stored in the second and third distance measurements. The photographing lens is again moved on the basis of the first to third series of data such that the photographing lens is finally moved to the focusing point.

A concrete embodiment in this case will next be described in detail with reference to FIGS. 16 and 19 and FIGS. 36 to 40.

When sequential automatic focusing operations are started by pushing a shutter button until a half pushing state thereof, etc., the series of steps P0 to P8 shown in FIG. 19 is executed as in the above-mentioned embodiments and it proceeds to the step P9.

Figure 36:
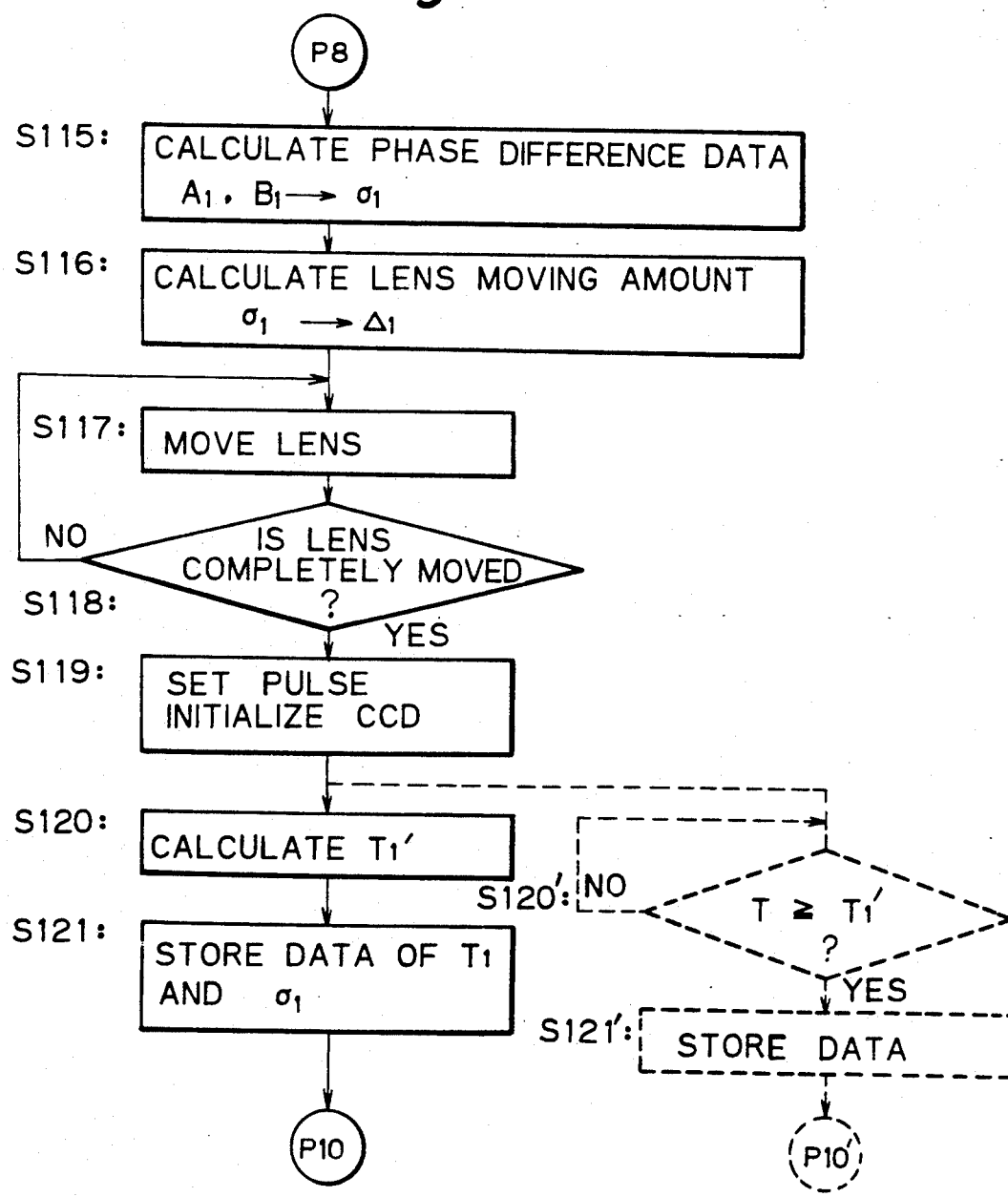
FIG. 36 is a flow chart for explaining another operation of the focusing state detector different from the above operations thereof in the present invention.

FIG. 36 shows detailed processings in this step P9. In a first step S115 in FIG. 36, first phase difference data $\sigma_1$ are provided from picture element data stored to the RAM and detected in the above step P2 and provided in the steps P7 and P8. These picture element data are constructed by a first series of data $A_1$ and a second series of data $B_1$.

In the next step S116, a moving amount $\Delta 1$ of the photographing lens is calculated on the basis of such obtained first phase difference data $\sigma_1$. Further, the photographing lens is moved in the next step S117. In a step S118, it is judged whether or not the photographing lens is completely moved by the lens moving amount $\Delta 1$. When this judgment is NO, it is returned to the step S117 and the photographing lens is continuously moved. In contrast to this, when this judgment in the step S118 is YES, it proceeds to the next step S119. In this step S119, an ST pulse rises so that a voltage level of this pulse is set to a high voltage level. Further, the charge coupled device (CCD) is similarly initialized.

In the next step S120, a time $T_1'$ from a starting time point of distance measurement to a completing time point of the movement of the photographing lens is measured. In the next step S121, data of this time $T_1'$ and the first phase difference data $\sigma_1$ obtained in the above step S115 are stored to a RAM. Thus, the series of steps for moving the photographing lens in the first distance measurement and shown in FIG. 36 is completely executed. Then, the next step P12 (see FIG. 19) for detecting data for moving the photographing lens in the second distance measurement is started.

FIGS. 37 to 40 show detailed processings in this step P12. In a step S122 shown in FIG. 37, a timer is reset and started. In the next step S123, first and third reset pulses $\phi r_1$ and $\phi r_3$ rise so that voltage levels of these reset pulses are set to high voltage levels as shown in FIG. 16. Further, residual charges are cleared from the respective photoelectric converting elements of the first and third photoelectric converting portions 17 and 19 through the first and third reset portions 20 and 24.

In a step S124, the first and third reset pulses $\phi r_1$ and $\phi r_3$ fall so that voltage levels of these reset pulses are set to low voltage levels. Accordingly, an integral operation is started in each of the first and third photoelectric converting portions 17 and 19. Thus, a charge is stored to each of the photoelectric converting elements of the first and third photoelectric converting portions 17 and 19 in accordance with a light intensity distribution of each of the above-mentioned first and third light beams.

Thereafter, in a step S125, an output voltage $V_{agc}$ of the monitor photometric section 30 is compared with a reference voltage $V_{ref}$. When the output voltage $V_{agc}$ is reduced and is lower than the reference voltage $V_{ref}$, it proceeds to a step S126. In the step S126, first and third shift pulses $\phi t_1$ and $\phi t_3$ rise so that voltage levels of these shift pulses are set to high voltage levels.

Thus, data of the first and third photoelectric converting portions 17 and 19 are respectively shifted by the shift register 26 through the first and third shifting portions 21 and 25. Then, it proceeds to a step S127. In the step S127, the counting value N of a shift counter is set to one and it proceeds to the next step S128.

In the step S128, the shift pulse $\phi_1$ rises so that a voltage level of this shift pulse is set to a high voltage level. In contrast to this, the shift pulse $\phi_2$ falls so that a voltage level of this shift pulse is set to a low voltage level. Thus, the picture element data stored to each of the photoelectric converting elements of the first and third photoelectric converting portions 17 and 19 are outputted by a data amount of one picture element as an output $V_{out}$ from the shift register 26. This output $V_{out}$ is A/D-converted and stored to a RAM as data of one picture element.

Such a storing operation is repeatedly performed until the number $N_3$ of picture elements in the third photoelectric converting portion 19. Namely, it is judged in a step S129 whether $N \geq N_3$ is formed or not every time the data of one picture element are stored to the RAM in the step S128. When this judgment is NO, it proceeds to a step S130 and an incremental operation is performed such that value one is added to the number N.

Figure 37:
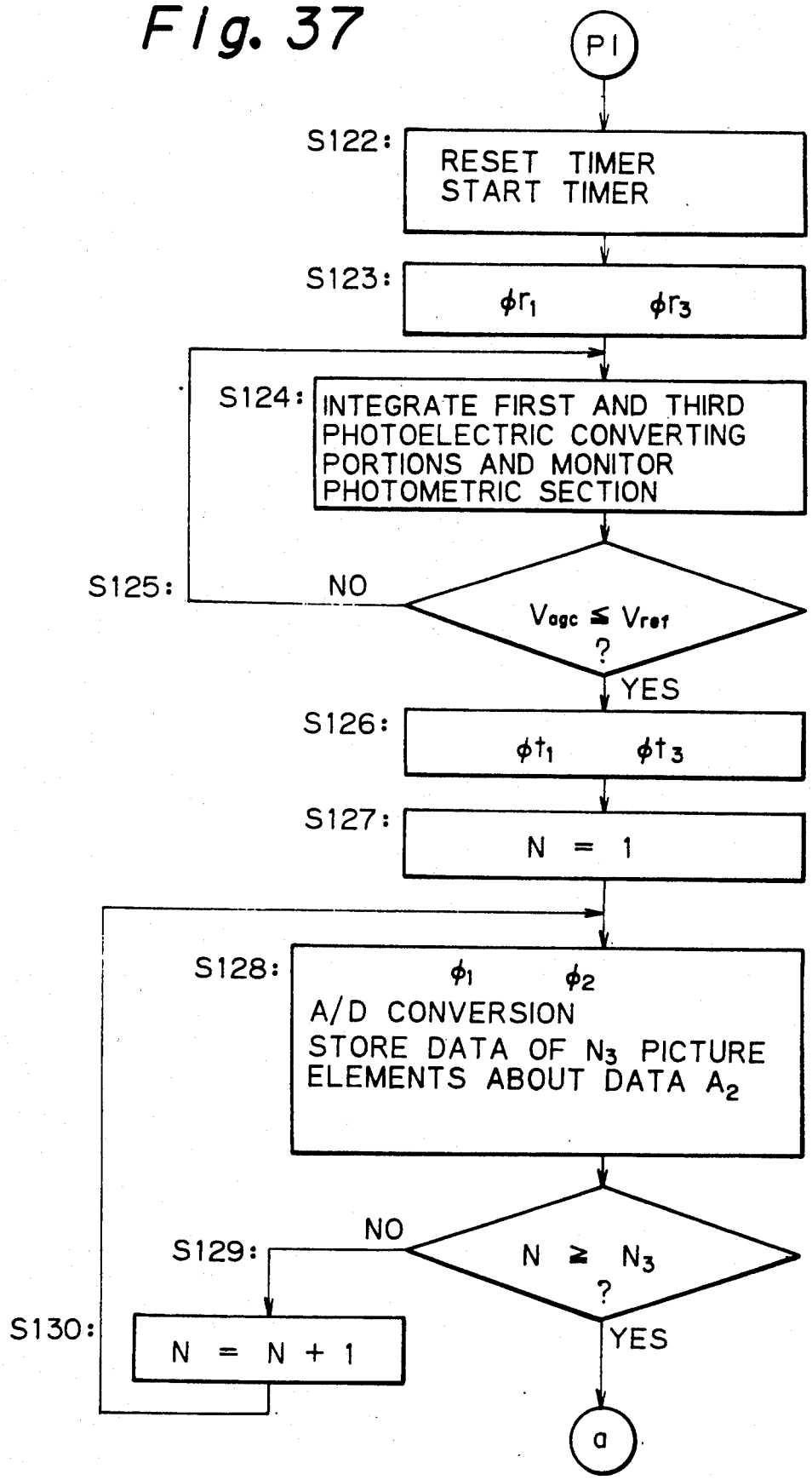
FIG. 37 is a flow chart for explaining another operation of the focusing state detector similar to that shown in FIG. 36.

In contrast to this, when the judgment in the step S129 is YES, the data of $N_3$ picture elements in the third photoelectric converting portion 19 are outputted from the shift register 26. When these data of $N_3$ picture elements are outputted from the shift register 26, a data-outputting operation with respect to the second distance measurement is performed and the series of steps shown in FIG. 37 is completely executed. Then, a data-outputting operation with respect to the third distance measurement is started in accordance with a series of steps shown in FIG. 38. Thus, it proceeds to a step S131 shown in FIG. 38.

Figure 38:
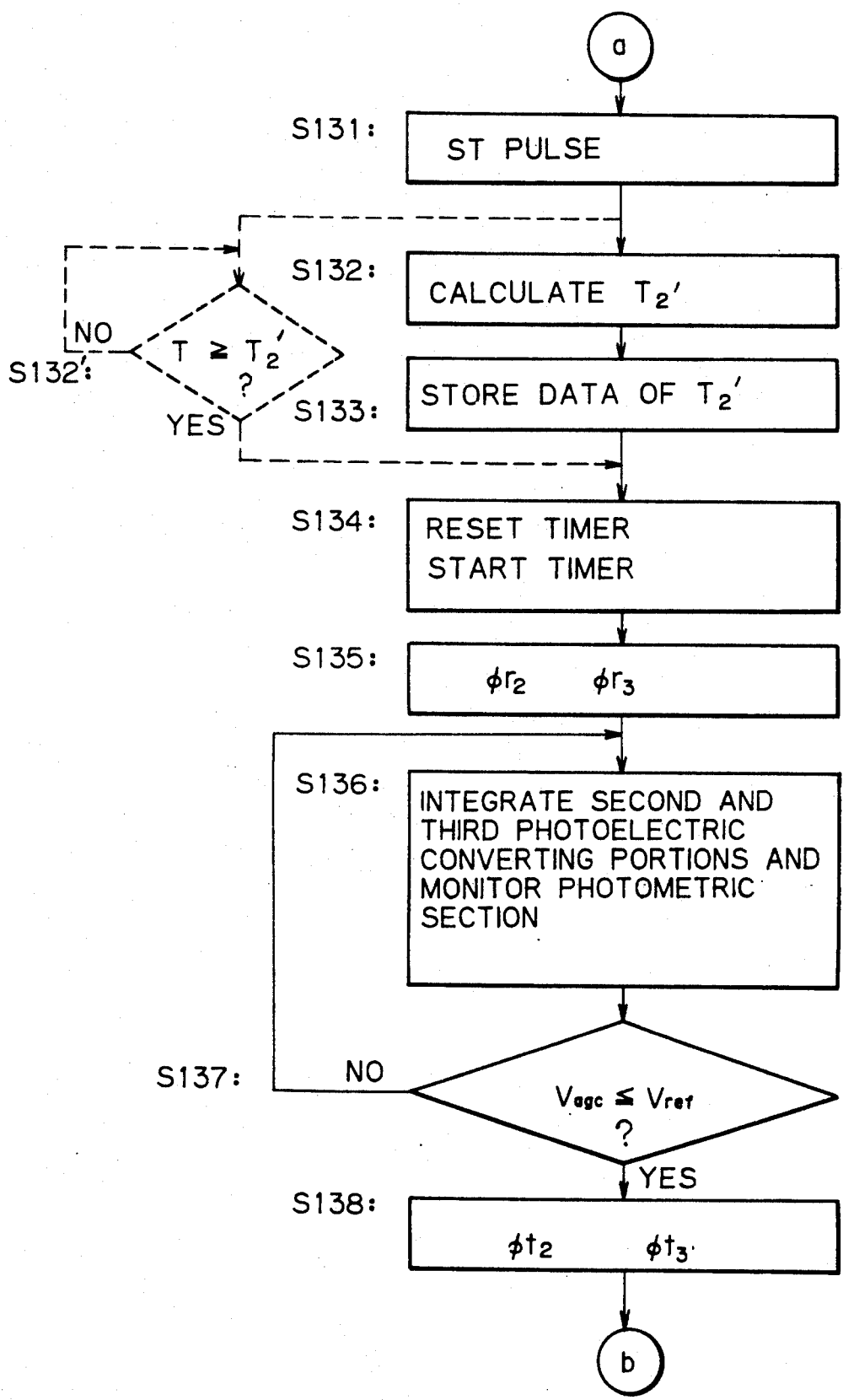
FIG. 38 is a flow chart for explaining another operation of the focusing state detector similar to that shown in FIG. 36.

In the step S131 shown in FIG. 38, an ST pulse rises so that a voltage level of this pulse is set to a high voltage level. Further, the monitor photometric section 30 is charged until a voltage level of this monitor photometric section 30 is equal to a predetermined voltage level, thereby attaining a standby state thereof.

In the next step S132, a time $T_2'$ from a starting time point of the above data output in the second distance measurement to a starting time point of the data output in the third distance measurement is measured by the timer started in the above step S122. This starting time point of the above data output in the second distance measurement is a time point at which the reset pulses $\phi r_1$ and $\phi r_3$ fall so that voltage levels of these reset pulses are set to low voltage levels. The starting time point of the data output in the third distance measurement is a time point at which the reset pulses $\phi r_2$ and $\phi r_3$ rise so that voltage levels of these reset pulses are set to high voltage levels. Data of this time $T_2'$ are stored to a RAM in the next step S133 and the timer is reset and simultaneously started in a step S134.

Simultaneously, it proceeds to a step S135 and the second and third reset pulses $\phi r_2$ and $\phi r_3$ rise so that voltage levels of these reset pulses are set to high voltage levels. Thus, in a step S136, a charge begins to be stored to each of the photoelectric converting elements of the second and third photoelectric converting portions 18 and 19 and the photoelectric converting elements of the monitor photometric section 30.

Thereafter, in a step S137, an output voltage $V_{agc}$ of the monitor photometric section 30 is compared with a reference voltage $V_{ref}$. When the output voltage $V_{agc}$ is reduced and is lower than the reference voltage $V_{ref}$, it proceeds to a step S138. In the step S138, the second and third shift pulses $\phi t_2$ and $\phi t_3$ rise so that voltage leveles of these shift pulses are set to high voltage levels. Thus, the series of steps shown in FIG. 38 is completely executed and a series of steps shown in FIG. 39 is started.

Figure 39:
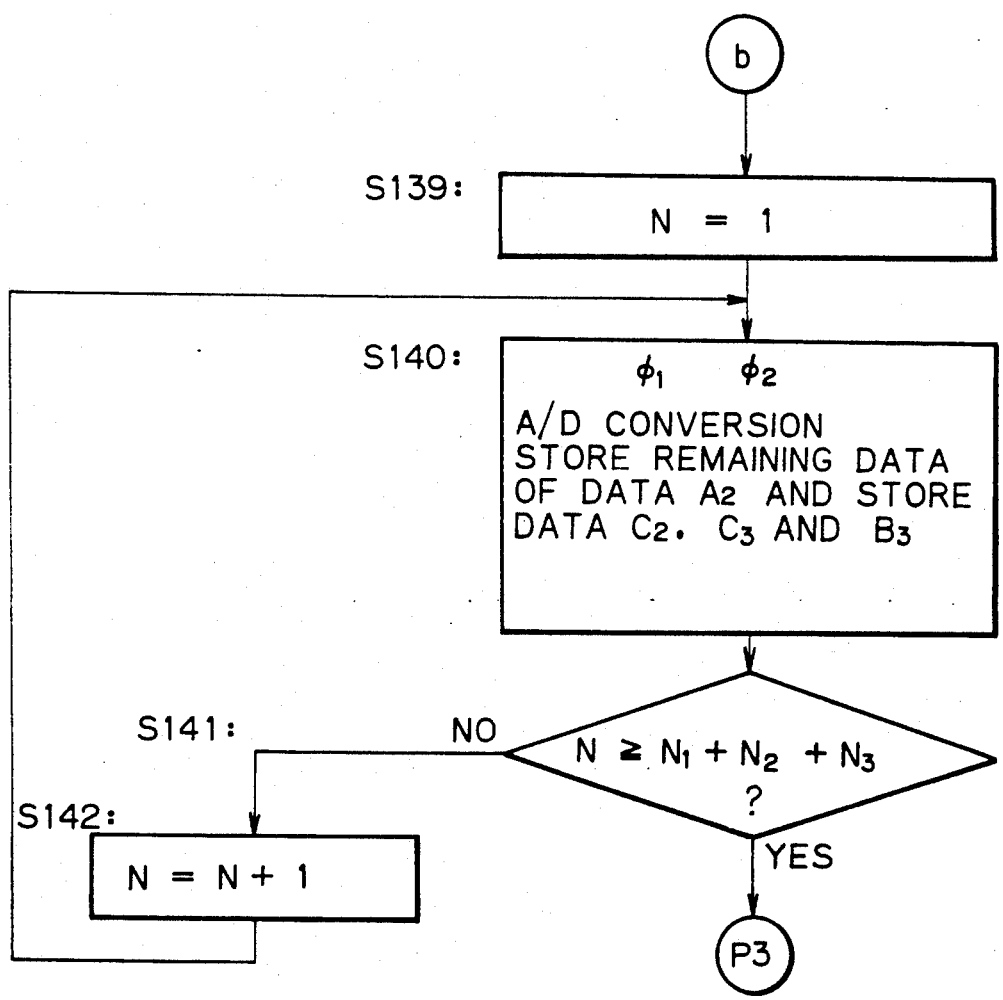
FIG. 39 is a flow chart for explaining another operation of the focusing state detector similar to that shown in FIG. 36.

In a step S139 shown in FIG. 39, the counting value N of a shift counter is set to one and it proceeds to the next step S140.

In the step S140, the shift pulse $\phi_1$ rises so that a voltage level of this shift pulse is set to a high voltage level. In contrast to this, the shift pulse $\phi_2$ falls so that a voltage level of this shift pulse is set to a low voltage level.

Thus, the picture element data stored to each of the photoelectric converting elements of the second and third photoelectric converting portions 18 and 19 are outputted by one clock data amount (a data amount of one picture element) as an output $V_{out}$ from the shift register 26. This output $V_{out}$ is A/D-converted and is stored to a RAM as data of one picture element.

Such a storing operation is performed until data of $(N_1 - N_3)$ picture elements in the second photoelectric converting portion 18, data $C_2$ and $C_3$ obtained in the second and third distance measurements, and data $B_3$ obtained in the third distance measurement are completely shifted.

Namely, it is judged in a step S141 whether $N \geq (N_1 + N_2 + N_3)$ is formed or not every time the data of one picture element are stored to the RAM in the step S140. When this judgment is NO, it proceeds to a step S142 and an incremental operation is performed such that value one is added to the number N. In contrast to this, when the judgment in the step S141 is YES, all the picture element data are stored to the RAM and it proceeds to the next step P3 shown in FIG. 19.

Figure 40:
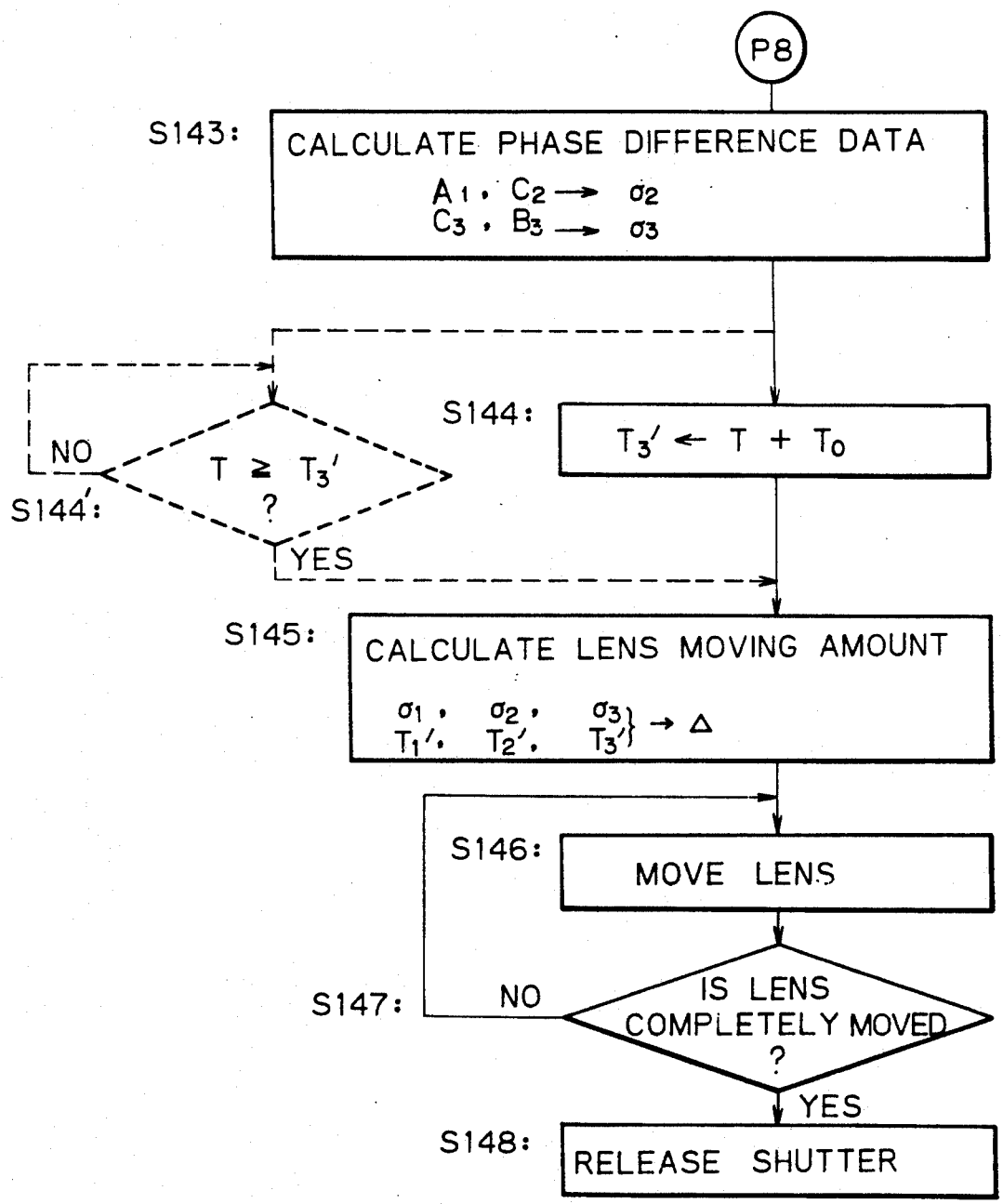
FIG. 40 is a flow chart for explaining another operation of the focusing state detector similar to that shown in FIG. 36.

Operations from the step P3 to the step P8 are similar to those in the above-mentioned embodiments. FIG. 40 shows a subroutine of detailed processings in the next step P9. In a step S143 shown in FIG. 40, second phase difference data $\sigma_2$ are provided by using data obtained in the steps P7 and P8 from the data $A_2$ and $C_2$ stored to the RAM in the above step S140. Further, third phase difference data $\sigma_3$ are provided by using data obtained in the steps P7 and P8 from the data $C_3$ and $B_3$.

In the next step S144, the releasing time of a shutter is added to an elapsed time T of the timer started in the above step S134. This releasing time is a time $T_0$ required for calculations, upward movement of a mirror, diaphragm, etc. from a time point of the complete execution of the step S143. The added time is provided as time $T_3'$ and it proceeds to the next step S145.

In the step S145, a moving amount $\Delta$ of the photographing lens is calculated on the basis of a total of six kinds of data composed of the first phase difference data $\sigma_1$ already obtained in the first distance measurement, the second and third phase difference data $\sigma_2$ and $\sigma_3$ obtained in the step S143, the times $T_1'$ and $T_2'$ already obtained in the respective first and second distance measurements, and the time $T_3'$ obtained in the step S144.

For example, this lens moving amount $\Delta$ is set in accordance with the number of driving pulses of a photo-interrupter operated in association with the rotation of a focusing drive ring. In a step S146, the photographing lens is moved in accordance with this number of drive pulses. In a step S147, it is judged whether or not the number of driving pulses has reached a set pulse number. In other words, it is judged whether the subtracting value of a subtracting counter is equal to zero or not. When this judgment in the step S147 is YES, the photographing lens is completely moved by the lens moving amount $\Delta$ so that it proceeds to the next step S148. In the step S148, the shutter is released to suitably expose a film.

In this embodiment, the times $T_1'$, $T_2'$ and $T_3'$ are respectively provided in the steps S120, S132 and S144 shown in FIGS. 36, 38 and 40 and showing the series of sequential automatic focusing operations. These times $T_1'$, $T_2'$ and $T_3'$ are not set to fixed values, but are values read from timer circuits. However, these times $T_1'$, $T_2'$ and $T_3'$ may be set to values experientially determined on the basis of many real photographing data of the photographed object.

In this case, the flow charts shown in FIGS. 36, 38 and 40 are partially replaced with those shown by broken lines.

Namely, the steps S120 and S121 shown by solid lines are replaced with steps S120' and S121' shown by broken lines. Similarly, the two steps S132 and S133 are replaced with a step S132' and the step S144 is replaced with a step S144'. In the other portions of the flow charts, operations similar to the above-mentioned operations are performed.

Accordingly, after the respective photoelectric converting portions 17 to 19 are initialized in the step S119, it is judged whether or not the present time has reached the time $T_1'$ in the step S120'. When this judgment is YES, first phase difference data $\sigma_1$ obtained in the above step S115 are stored to the RAM and subsequent operations are similar to the above-mentioned operations until the step S131.

In the step S131, an ST pulse rises so that a voltage level of this pulse is set to a high voltage level. Next, it is judged whether or not the present time has reached the time $T_2'$ in the step S132'. When this judgment is YES, it proceeds to the step S134 and the timer is reset and is simultaneously started.

Further, subsequent operations are similar to the above-mentioned operations until the step S143. In the step S143, second and third phase difference data $\sigma_2$ and $\sigma_3$ are provided. In the next step S144', it is judged whether or not the present time T has reached the time $T_3'$. When this judgment is YES, it proceeds to the next step S145 and a moving amount of the photographing lens is calculated in this step. Subsequent operations are similar to the above-mentioned operations.

In this embodiment, when the photographing lens is finally moved to perform a focusing operation thereof, the photographing lens is first moved to a focusing point by the first distance measurement. The photographing lens is again moved by the second and third distance measurements. Accordingly, it is possible to reduce a total of focusing times for moving the photographing lens.

Further, with respect to picture element data outputted in advance before the output of phase difference data in each of the distance measurements, first to third picture element data are outputted in the first distance measurement. Second picture element data are partially outputted in the second distance measurement. The remaining second picture element data and the first and third picture element data are outputted in the third distance measurement. Accordingly, it is possible to reduce a time for outputting the picture element data.

In this embodiment, when the phase difference data are obtained in advance before a moving amount of the photographing lens is finally calculated, a reference area with respect to the first or second image data is set with the third image data as a reference. The phase difference data are provided with respect to only data within this reference area so that it is possible to reduce a calculating time for obtaining the phase difference data.

The present invention is not limited to the above-mentioned embodiments, but can be changed in various kinds of modifications within the scope of the features of the present invention.

For example, in each of the above-mentioned embodiments, the phase difference data for finally moving and focusing the photographing lens are provided in a picture element unit. However, data used before and after the phase difference data may be added to these phase difference data and an average of these data or a weighted mean thereof may be calculated to improve an accuracy in operation of the focusing state detector.

The number of picture elements in the first to third photoelectric converting portions and the number of picture elements in various kinds of small blocks may be arbitrarily set.

Further, the number of small blocks and the number of picture elements thereof may be also arbitrarily set. Further, the number of reblocked small picture element blocks and the number of picture elements therein may be also arbitrarily set.

As mentioned above, in a focusing state detector having first to third structures of the present invention, three light beams are constructed by two light beams in two regions symmetrically arranged with respect to the optical axis of a lens system about a light beam from a photographed object, and is constructed by a light beam in a region including this optical axis. When picture element data are detected, these three light beams are not detected in all distance measurements, and data with respect to at least two light beams are selectively detected. Phase difference data are provided on the basis of these detected data to finally move a photographing lens so that a total operating time of the focusing state detector can be reduced.

Further, image data are corrected by detecting an integral time in each of the distance measurements. Accordingly, it is possible to cope with a rapid change in brightness or brightness distribution of the photographed object caused by a movement thereof in a direction of the above optical axis or a Accordingly, the image data can be conformed to each other in each of the distance measurements. Therefore, this correction of the image data is especially effective to improve a focusing accuracy in the case of many distance measurements or plural distance measurements for fulfilling a function for predicting the movement of a moving body.

In a focusing state detector having a fourth structure of the present invention, three light beams are constructed by two light beams in two regions symmetrically arranged with respect to the optical axis of a lens system about a light beam from a photographed object, and is constructed by a light beam in a region including this optical axis. When picture element data are detected, these three light beams are not detected in all distance measurements, and data with respect to at least two light beams are selectively detected. Phase difference data are provided on the basis of these detected data to finally move a photographing lens so that total operating time of the focusing state detector can be reduced.

In this fourth structure of the present invention, a reference area is determined with third image data as a reference unchanged by the movement of the photographed object in the direction of the above optical axis. A conformity degree is calculated by using only an area portion of first or second image data corresponding to this reference area. In other words, the phase difference data are provided by using only this area portion so that it is possible to efficiently perform a conformity degree operation.

In other words, only an area portion required to provide the phase difference data is extracted and the conformity degree operation is performed with respect to only this extracted area portion. Accordingly, no useless operations are performed so that the conformity degree operation can be very efficiently performed. Further, in such a structure, it is possible to reduce the memory capacity of an arithmetic circuit.

Further, in the fourth structure of the present invention, data corresponding to an address in a preset block are stored as data in an initial block into picture elements forming the third image data substantially unchanged irrespective of the movement of the photographed object in the direction of the above optical axis. A reference area with respect to the first or second image data is set by using these data corresponding to the above address. The first and second image data in this reference area are shifted in one picture element unit and are compared with each other to obtain the phase difference data for moving and focusing the photographing lens. Accordingly, the efficiency of operations of the focusing state detector can be greatly improved so that it is possible to reduce the memory capacity of an arithmetic circuit.

Accordingly, it is possible to greatly reduce a space of the focusing state detector prepared for a plurality of detections of the image data and provide an excellent focusing responsibility.

Such an advantageous structure is especially effective to improve a focusing accuracy in the case of many distance measurements of plural distance measurements for fulfilling a function for predicting the movement of a moving body.

In a focusing state detector having fifth and sixth structures of the present invention, similar to the above first to fourth structures, three light beams are constructed by two light beams in two regions symmetrically arranged with respect to the optical axis of a lens system about a light beam from a photographed object, and is constructed by a light beam in a region including this optical axis. When picture element data are detected, these three light beams are not detected in all distance measurements, and data with respect to at least two light beams are selectively detected. Phase difference data are provided on the basis of these detected data to finally move a photographing lens so that a total operating time of the focusing state detector can be reduced.

Further, a reference area is determined with third image data as a reference unchanged by the movement of the photographed object in the direction of the above optical axis. A conformity degree is calculated by using only an area portion of first or second image data corresponding to this reference area. In other words, the phase difference data are provided by using only this area portion so that it is possible to efficiently perform a conformity degree operation. In other words, only an area portion required to provide the phase difference data is extracted and the conformity degree operation is performed with respect to only this extracted area portion. Accordingly, no useless operations are performed so that the conformity degree operation can be efficiently performed. Further, in such a structure, it is possible to reduce the memory capacity of an arithmetic circuit.

Further, in the fifth and sixth structures of the present invention, the third image data in the present and preceding distance measurements substantially unchanged irrespective of the movement of the photographed object in the direction of the above optical axis are shifted in one picture element unit within a preset area and are compared with each other to obtain a time series of phase differences. A reference area with respect to the first or second image data is determined on the basis of data of the time series of phase differences. The phase difference data for moving and focusing the photographing lens are obtained by using only data within this reference area, thereby greatly improving the efficiency of operations of the focusing state detector. Therefore, it is possible to greatly reduce a space of the focusing state detector prepared for a plurality of detections of the image data and provide an excellent focusing responsibility.

Such an advantageous structure is especially effective to improve a focusing accuracy in the case of many distance measurements or plural distance measurements for fulfilling a function for predicting the movement of a moving body.

Many widely different embodiments of the present invention may be constructed without departing from the spirit and scope of the present invention. It should be understood that the present invention is not limited to the specific embodiments described in the specification, except as defined in the appended claims.

What is claimed is:

1. A focus state detection device comprising:
   a first optical conversional system for introducing an optical flux of a region in a view field frame to be photographed to one of two symmetric positions with respect to an optical axis of said optical flux;
   a second optical conversional system for introducing an optical flux of said region to the other of said two symmetric positions;
   a third optical conversional system for introducing an optical flux of said region to a position including said optical axis;
   first and second photoelectric converting portions for respectively receiving two light beams formed by said first and second optical conversional systems in a region in which a plurality of photoelectric converting elements of a charge storing type are arranged in line;

a third photoelectric converting portion for receiving a light beam formed by said third optical conversional system in a region in which a plurality of photoelectric converting elements of a charge storing type are arranged in line;

a charge clearing section for clearing a charge stored to each of said first, second and third photoelectric converting portions;

a charge transfer section for transferring data indicative of an amount of the charge stored to each of the photoelectric converting elements in said first, second and third photoelectric converting portions to a data memory section;

control means for selectively generating a clearing signal in said charge clearing section and a transfer signal in said charge transfer section to respectively obtain three image data by said first, second and third photoelectric converting portions at a plurality of time points;

a monitor photometric section arranged in the vicinity of at least one of said first, second and third photoelectric converting portions;

monitor control means for making an average of the stored charge amount in said photoelectric converting portions constant on the basis of an output of the monitor photometric section;

integral time memory means for providing data of an integral time at a plurality of time points from the generation of the clearing signal in said charge clearing section to the generation of the transfer signal in said charge transfer section, and for storing the integral time data thereto;

correction coefficient calculating means for calculating a correction coefficient corresponding to a ratio of integral times at preceding and present times with respect to the data of integral times obtained by the integral time memory means at the plural time points;

correction calculating means for correcting image data at the present or preceding time with respect to the image data obtained by said first, second and third photoelectric converting portions at the plural time points, on the basis of data of the correction coefficient obtained by said correction coefficient calculation means; and phase difference calculating means for providing phase difference data based on the image data at preceding or present time and phase difference data based on the image data corrected by said correction calculating means at the present or preceding time.

2. A focus state detection device as claimed in claim 1, wherein the monitor photometric section is arranged in the vicinity of the third photoelectric converting portion.

3. A focus state detection device comprising:

a first optical conversional system for introducing an optical flux of a region in a view field frame to be photographed to one of two symmetric positions with respect to an optical axis of said optical flux;

a second optical conversional system for introducing an optical flux of said region to the other of said two symmetric positions;

a third optical conversional system for introducing an optical flux of said region to a position including said optical axis;

first and second photoelectric converting portions for respectively receiving two light beams formed by said first and second optical conversional systems in a region in which a plurality of photoelectric converting elements of a charge storing type are arranged in line;

a third photoelectric converting portion for receiving a light beam formed by said third optical conversional system in a region in which a plurality of photoelectric converting elements of a charge storing type are arranged in line;

a charge clearing section for clearing a charge stored to each of said first, second and third photoelectric converting portions;

a charge transfer section for transferring data indicative of an amount of the charge stored to each of the photoelectric converting elements in said first, second and third photoelectric converting portions to a data memory section;

control means for selectively generation a clearing signal in said charge clearing section and a transfer signal in said charge transfer section to respectively obtain three image data by said first, second and third photoelectric converting portions at a plurality of time points;

a monitor photometric section arranged in the vicinity of at least one of said first, second and third photoelectric converting portions;

monitor control means for making an average of the stored charge amount in said photoelectric converting portions constant on the basis of an output of the monitor photometric section;

integral time memory means for providing data of an integral time at a plurality of time points from the generation of the clearing signal in said charge clearing section to the generation of the transfer signal in said charge transfer section, and for storing the integral time data thereto;

correction coefficient calculating means for calculating a correction coefficient corresponding to the integral time obtained by the integral time memory means at each of the time points;

correction calculating means for correcting image data obtained by said first, second and third photoelectric converting portions at each of the plural time points, on the basis of data of the correction coefficient obtained by said correction coefficient calculating means at each of the plural time points; and phase difference calculating means for providing phase difference data based on the image data corrected by said correction calculating means.

4. A focus state detection device as claimed in claim 3, wherein the monitor photometric section is arranged in the vicinity of the third photoelectric converting portion.

5. A focus state detection device comprising:

a first optical conversional system for introducing an optical flux of a region in a view field frame to be photographed to one of two symmetric positions with respect to an optical axis of said optical flux;

a second optical conversional for introducing an optical flux of said region to the other of said two symmetric positions;

a third optical conversional system for introducing an optical flux of said region to a position including said optical axis;

first and second photoelectric converting means for respectively receiving two light beams formed by said first and second optical conversional systems in a region in which picture elements composed of a plurality of photoelectric converting elements are arranged in line, and for providing first and second image data as an electric signal corresponding to a light intensity distribution of an image of each of the received light beams; and third photoelectric converting means for receiving a light beam formed by said third optical conversional system in a region in which picture elements composed of a plurality of photoelectric converting elements are arranged in line, and for providing third image data as an electric signal corresponding to a light intensity distribution of an image of the received light beam;

said focus state detection device selectively detecting the first to third image data obtained by said first to third photoelectric converting means at a plurality of time points to detect a beam focusing state;

said focus state detection device further comprising:

initial block memory means for storing said third image data corresponding to an address in a preset block of the plural picture elements in said third photoelectric converting means;

time series phase difference calculating means for dividing the third image data obtained at a preceding or present time into a plurality of small blocks in which the number of picture elements is equal to or smaller than the number of picture elements forming the third image data, said time series phase difference calculating means shifting each of the plural small blocks in a picture element unit with respect to the third image data obtained at the present or preceding time, said time series phase difference calculating means comparing the shifted small blocks with each other to calculate a changing amount of a phase difference in data;

area block forming means for reblocking the small blocks based on the changing amount of the phase difference obtained by the time series phase difference calculating means at every small block;

block determining means for selecting one of the small blocks reblocked by the area block forming means, said one of the small blocks being used as phase difference data for detecting the focusing state;

block predicting means for predicting a block at a next time based on the blocks determined by the block determining means at the preceding and present times; and block judging means for judging whether or not a reference block used at the present time is obtained from any one of said initial block memory means, said block determining means and said block predicting means.

6. A focus state detection device as claimed in claim 5, wherein the block determining means comprises means for weighing each of the blocks and the block judging means judges one of the weighted blocks to be selected.

7. A focus state detection device comprising:

a first optical conversional system for introducing an optical flux of a region in a view field frame to be photographed to one of two symmetric positions with respect to an optical axis of said optical flux;

a second optical conversional system for introducing an optical flux of said region to the other of said two symmetric positions;

a third optical conversional system for introducing an optical flux of said region to a position including said optical axis;

first and second photoelectric converting means for respectively receiving two light beams formed by said first and second optical conversional systems in a region in which picture elements composed of a plurality of photoelectric converting elements are arranged in line, and for providing first and second image data as an electric signal corresponding to a light intensity distribution of an image of each of the received light beams; and third photoelectric converting means for receiving said light beam formed by said third optical conversional system in a region in which picture elements composed of a plurality of photoelectric converting elements are arranged in line, and for providing third image data as an electric signal corresponding to a light intensity distribution of an image of the received light beam;

said focus state detection device selectively detecting the first to third image data obtained by said first to third photoelectric converting means at a plurality of time points to detect a beam focusing state;

said focus state detection device further comprising:

time series phase difference calculating means for dividing the third image data obtained at a preceding or present time into a plurality of small blocks in which the number os picture elements is equal to or smaller than the number of picture elements forming the third image data, said time series phase difference calculating means shifting each of the plural small blocks in a picture element unit with respect to the third image data obtained at the present or preceding time, said time series phase difference calculating means comprising the shifted small blocks with each other to calculate a changing amount of a phase difference in data;

area block forming means for reblocking the small blocks based on the changing amount of the phase difference obtained by the time series phase difference calculating means at every small block;

block determining means for selecting one of the small block reblocked by the area block forming means, said one of the small block being used as phase difference data for detecting the focusing state;

first conformity degree evaluating means for shifting said first or second image data in a picture element unit with respect to the block selected by the block determining means at the present time, and for evaluating a conformity degree of the first or second image data with respect to this selected block;

reference data area determining means for determining an area of said first or second image data evaluated as a highest conformity degree by the first conformity degree evaluating means, and for setting this determined area as a reference data area; and second conformity degree evaluating means for shifting reference data within said first or second image data in the reference data area determined by the reference data area determining means, said second conformity degree evaluating means shifting said reference data in a picture element unit with respect to the second or first image data and evaluating a conformity degree of the second or first image data with respect to the reference data.

8. A focus state detection device as claimed in claim 7, wherein the block determining means comprises means for weighting each of the blocks and block judging means for judging one of the weighted blocks to be selected.

* * * * *